(12) United States Patent
Schüle et al.

(10) Patent No.: US 12,516,024 B2
(45) Date of Patent: Jan. 6, 2026

(54) KDM4 INHIBITORS

(71) Applicants: ALBERT-LUDWIGS-UNIVERSITY FREIBURG, Freiburg (DE); CELGENE QUANTICEL RESEARCH, INC., San Diego, CA (US)

(72) Inventors: Roland Schüle, Freiburg (DE); Eric Metzger, Freiburg (DE)

(73) Assignees: ALBERT-LUDWIGS-UNIVERSITY FREIBURG, Freiburg (DE); CELGENE QUANTICEL RESEARCH, INC., San Diego, CA (US)

( * ) Notice: Subject to any disclaimer, the term of this patent is extended or adjusted under 35 U.S.C. 154(b) by 0 days.

(21) Appl. No.: 17/749,233

(22) Filed: May 20, 2022

(65) Prior Publication Data
US 2024/0076271 A1    Mar. 7, 2024

Related U.S. Application Data

(63) Continuation of application No. 16/498,714, filed as application No. PCT/US2018/024624 on Mar. 27, 2018, now abandoned.

(60) Provisional application No. 62/513,875, filed on Jun. 1, 2017, provisional application No. 62/478,785, filed on Mar. 30, 2017.

(51) Int. Cl.
*C07D 213/79* (2006.01)
*A61K 9/20* (2006.01)
*A61K 31/44* (2006.01)
*A61P 35/00* (2006.01)
*G01N 33/50* (2006.01)

(52) U.S. Cl.
CPC .......... *C07D 213/79* (2013.01); *A61K 9/2013* (2013.01); *A61K 9/2054* (2013.01); *A61K 31/44* (2013.01); *A61P 35/00* (2018.01); *G01N 33/5011* (2013.01)

(58) Field of Classification Search
CPC ..... C07D 213/79; A61P 35/00; A61K 9/2013; A61K 9/2054; A61K 31/44; G01N 33/5011
See application file for complete search history.

(56) References Cited

U.S. PATENT DOCUMENTS

| | | | |
|---|---|---|---|
| 3,773,919 | A | 11/1973 | Boswell et al. |
| 7,897,612 | B2 | 3/2011 | Fitch et al. |
| 7,898,712 | B2 | 3/2011 | Adams et al. |
| 8,034,811 | B2 | 10/2011 | Fensholdt et al. |
| 8,952,151 | B2 | 2/2015 | Chen et al. |
| 9,034,900 | B2 | 5/2015 | Bennett et al. |
| 9,085,534 | B2 | 7/2015 | Chen et al. |
| 9,242,968 | B2 * | 1/2016 | Boloor .................. C07D 403/12 |
| 9,255,097 | B2 | 2/2016 | Chen et al. |
| 9,447,046 | B2 | 9/2016 | Boloor et al. |
| 9,586,902 | B2 * | 3/2017 | Boloor .................. C07D 213/79 |
| 9,815,828 | B2 | 11/2017 | Boloor et al. |
| 9,994,561 | B2 | 6/2018 | Boloor et al. |
| 10,106,534 | B2 | 10/2018 | Boloor et al. |
| 10,385,047 | B2 | 8/2019 | Boloor et al. |
| 11,316,018 | B2 | 4/2022 | Narukawa et al. |
| 2004/0106599 | A1 | 6/2004 | Delorme et al. |
| 2006/0204975 | A1 | 9/2006 | Green et al. |
| 2014/0080802 | A1 | 3/2014 | Holson et al. |
| 2014/0171432 | A1 | 6/2014 | Kanouni et al. |
| 2015/0111885 | A1 | 4/2015 | Bennett et al. |
| 2015/0267241 | A1 | 9/2015 | Wang et al. |
| 2015/0291529 | A1 | 10/2015 | Chen et al. |
| 2015/0376169 | A1 | 12/2015 | Boloor et al. |
| 2016/0039821 | A1 | 2/2016 | Fidanze et al. |
| 2016/0332970 | A1 | 11/2016 | Boloor et al. |
| 2018/0290977 | A1 | 10/2018 | Schule et al. |
| 2020/0039938 | A1 | 2/2020 | Schüle et al. |
| 2020/0079770 | A1 | 3/2020 | Hinklin et al. |
| 2025/0025451 | A1 | 1/2025 | Perabo et al. |

FOREIGN PATENT DOCUMENTS

| | | | | |
|---|---|---|---|---|
| WO | WO-2006002383 | A2 | 1/2006 | |
| WO | WO-2012052390 | A1 | 4/2012 | |
| WO | WO-2012107499 | A1 * | 8/2012 | .......... C07D 241/04 |
| WO | WO-2013143597 | A1 | 10/2013 | |
| WO | WO-2014089364 | A1 | 6/2014 | |

(Continued)

OTHER PUBLICATIONS

Berry et al, Stimulation of î²-Catenin and Colon Cancer Cell Growth by the KDM4B Histone Demethylase, International Journal of Oncology, 33: 1341-1348, 2014 (Year: 2014).*
Cheung et al, Targeting Aberrant Epigenetic Networks Mediated by PMRT1 and KDM4C in Acute Myeloid Leukemia, Cancer Cell, vol. 29, Issue 1, Jan. 11, 2016, 32-48 (Year: 2016).*
Berry, International Journal of Oncology, 33, 1341-1348, 2014 (Year: 2014).*
Cheung, Cancer Cell, vol. 29, Issue 1, Jan. 11, 2016, 32-48 (Year: 2016).*

(Continued)

*Primary Examiner* — John S Kenyon
*Assistant Examiner* — Phillip Matthew Rzeczycki
(74) *Attorney, Agent, or Firm* — WILSON SONSINI GOODRICH & ROSATI

(57) ABSTRACT

The present disclosure relates generally to compounds and methods for inhibiting the enzymatic activity of lysine demethylase 4 (KDM4) and treating cancer. Provided herein are substituted pyridine derivative compounds and pharmaceutical compositions comprising said compounds. The subject compounds and compositions are useful for inhibiting lysine demethylase 4. Furthermore, the subject compounds and compositions are useful for the treatment of breast cancer and the like.

2 Claims, 21 Drawing Sheets
Specification includes a Sequence Listing.

(56) References Cited

FOREIGN PATENT DOCUMENTS

| | | | |
|---|---|---|---|
| WO | WO-2014089368 A1 | 6/2014 | |
| WO | WO-2014100818 A1 | 6/2014 | |
| WO | WO-2015058160 A1 | 4/2015 | |
| WO | WO-2015153498 A1 * | 10/2015 | .............. A61P 43/00 |
| WO | WO-2015200709 A1 | 12/2015 | |
| WO | WO-2017117154 A1 | 7/2017 | |
| WO | WO-2018183370 A2 | 10/2018 | |
| WO | WO-2019083594 A1 | 5/2019 | |
| WO | WO-2022217100 A1 | 10/2022 | |
| WO | WO-2023023112 A1 | 2/2023 | |

OTHER PUBLICATIONS

American Cancer Society. Breast Cancer Risk and Prevention. (2018). Accessed Sep. 2, 2018. Available from: https://www.cancer.org/cancer/breast-cancer/risk-and-prevention.html. (2018).
Ansieau. EMT in Breast Cancer Stem Cell Generation. Cancer Letters 338:63-68 (2013).
Arrowsmith et al. Epigenetic Protein Families: A New Frontier for Drug Discovery. Nature Reviews. Drug Discovery 11:384-400 (2012).
Berge et al. Pharmaceutical Salts. Journal of Pharmaceutical Sciences 66(1):1-19 (Jan. 1977).
Berry et al. KDM4/JMJD2 Histone Demethylases: Epigenetic Regulators in Cancer Cells. Cancer Research 73(10):2936-2942 (2013).
Bundgaard et al. Design of Prodrugs pp. 7-9, 21-24 (1985).
Bundgard, H. Design of Prodrugs. 1985; pp. 7-9, 21-24 (Elsevier, Amsterdam).
Chaidos et al. Inhibition Of Bromodomain And Extra-terminal Proteins (BET) as a Potential Therapeutic Approach n Haematological Malignancies: Emerging Preclinical and Clinical Evidence. Therapeutic Advances in Hematology 6(3):128-141 (2015).
Chen et al. Design of KDM4 Inhibitors with Antiproliferative Effects in Cancer Models. ACS Medicinal Chemistry Letters 8:869-874 (2017).
Chu et al. KDM4B as a Target for Prostate Cancer: Structural Analysis and Selective Inhibition by a Novel Inhibitor. J Med Chem 57(14):5975-5985 (2014).
Dave et al. Treatment Resistance in Stem Cells and Breast Cancer. Journal of Mammary Gland Biology and Neoplasia 14:79-82 (2009).
Dunning et al. Beadarray: R Classes and Methods for Illumina Bead-Based Data. Bioinformatics Applications Vote 23(16):2183-2184 (2007).
Frank et al. The Therapeutic Promise of the Cancer Stem Cell Concept. J Clin Invest 120:41-50 (2010).
Garcia et al. KDM4C Activity Modulates Cell Proliferation and Chromosome Segregation in Triple-Negative Breast Dancer. Breast Cancer (Auckl) 10:169-175 (2016).
Goldhirsch et al., Personalizing The Treatment Of Women With Early Breast Cancer: Highlights Of The St Gallen International Expert Consensus On The Primary Therapy Of Early Breast Cancer 2013. Ann Oncol 24(9):2206-2223 (2013).
Heinz, et al. Simple combinations of lineage-determining transcription factors prime cis-regulatory elements required for macrophage and B cell identities. Mol Cell. 38(4):576-589 (2010).
Higuchi et al. Pro-drugs as Novel Delivery Systems. A.C.S. Symposium Series vol. 14 (129 pgs.) (1975).
Hoffmann et al. The role of histone demethylases in cancer therapy. Molecular Oncology 6:683-703 (2012).
Hsu et al. The Role of HER2, EGFR, and Other Receptor Tyrosine Kinases in Breast Cancer. Cancer and Metastasis Reviews 35(4):575-588 (2016).
Klose et al. JmjC-domain-containing proteins and histone demethylation. Nature Reviews Genetics 7:715-727 (Sep. 2006).
Labbe et al.Histone Lysine Demethylase (KDM) Subfamily 4: Structures, Functions and Therapeutic Potential Am J Transl Res 6(1):1-15 (2013).
Lachner et al. An epigenetic road map for histone lysine methylation. Journal of Cell Science 116:2117-2124 (Jun. 1, 2003).
Langmead et al. Ultrafast and memory-efficient alignment of short DNA sequences to the human genome. Genome biology 10:R25 (10 pgs) (2009).
Lin et al. Loss of the retinoblastoma binding protein 2 (RBP2) histone demethylase supresses tumorigenesis in mice lacking RB1 or Men1.PNAS108(33):13379-13386 (2011).
Mangueron et al. The key to development: interpreting the histone code? Current Opinion Genet. Dev.15:163-176 (2005).
Metzger et al. Assembly of Methylated KDM1A and CHD1 Drives Androgen Receptor-Dependent Transcription and Translocation. Nat Struct Mil Biol 23(2):132-139 (2016).
Metzger et al. KDM4 Inhibition Targets Breast Cancer Stem-Like Cells, American Association for Cancer Research (AACR). Cancer Research 77(21):5900-5912 (2017).
Metzger et al. LSD1 Demethylates Repressive Histone Marks to Promote Androgen-Receptor-Dependent Transcription. Nature 437:436-439 (2005).
National Cancer Institute. Cancers by Body Location System. (Jul. 17, 2010). Accessed Sep. 2, 2018. Available from: https://www.cancer.gov/types/by-body-location. (2010).
Pattabiraman et al. Targeting the Epithelial-to-Mesenchymal Transition: The Case for Differentiation-Based Therapy. , Cold Spring Harb Symp Quant Biol 81:11-19 (2016).
PCT/US2013/077539 International Search Report and Written Opinion dated Apr. 28, 2014.
PCT/US2015/37812 International Search Report and Written Opinion dated Sep. 30, 2015.
PCT/US2018/024624 International Search Report and Written Opinion dated Nov. 7, 2018.
Qiu et al. KDM4B and KDM4A Promote Endometrial Cancer Progression by Regulating Androgen Receptor, C-myc, and P27kip1. Oncotarget 6(31):31702-31720 (2015).
Sharma et al. Induction of CXCR2 Ligands, Stem Cell-Like Phenotype, and Metastasis in Chemotherapy-Resistant Breast Cancer Cells. Cancer Letters 372(2):192-200 (2016).
Soini et al. KDM4A, KDM4B and KDM4C in Non-Small Cell Lung Cancer. Int J Clin Exp Pathol 8(10):12922-12928 (2015).
Thorvaldsdottir et al. Integrative GenomicsViewer (IGV): High-Performance Genomics Data Visualization and Exploration. Brief Bioinform 14(2:):178-192 (2012).
U.S. Appl. No. 15/321,702 Office Action dated Feb. 6, 2018.
U.S. Appl. No. 15/321,702 Office Action dated Sep. 17, 2018.
U.S. Appl. No. 15/402,100 Office Action dated Feb. 10, 2017.
U.S. Appl. No. 15/402,100 Office Action dated Mar. 23, 2017.
U.S. Appl. No. 15/936,811 Office Action dated Feb. 11, 2019.
U.S. Appl. No. 16/498,714 Office Action dated Apr. 27, 2021.
World Health Organization. Cancer prevention. (Mar. 10, 2011). Accessed Aug. 19, 2018. Available from: https://web.archive.org/web/20110310043106/ http://www.whoint/cancer/prevention/en/ . (2011).
Ye et al. Genetic Alterations Of KDM4 Subfamily And Therapeutic Effect of Novel Demethylase Inhibitor in Breast Cancer. Am J Cancer Res 5(4):1519-1530 (2015).
Zhang et al. Model-Based Analysis of ChIP-Seq (MACS). Genom Biol 9(9):R137 (2008).
Zhang et al. The Cellular Origin and Evolution of Breast Cancer. Cold Spring Harb Perspect Med 7(3):a027128 (2017).
Bourhill et al. Enzastaurin: A lesson in drug development. Crit Rev Oncol Hematol 112:72-79 (2017).
Dalerba et al. Single-cell dissection of transcriptional heterogeneity in human colon tumors. Nat Biotechnol. 29(12):1120-7 (2011).
Dean, Dennis C. Recent Advances in the Synthesis and Applications of Radiolabeled Compounds for Drug Discovery and Development. Current Pharmaceutical Design 6:1-2 (2000).
Evans, Anthony E. Synthesis of Radiolabeled Compounds. Journal of Radioanalytical and Nuclear Chemistry 64(1-2):9-32 (1981).
Garrido-Ramos. Satellite DNA: An Evolving Topic. Genes 8(9):230 (2017).
Kabalka, George W. et al. The Synthesis of Radiolabeled Compounds via Organometallic Intermediates. Tetrahedron 45(21):6601-6621 (1989).

(56) References Cited

OTHER PUBLICATIONS

Kang et al. Knockdown of PSCA induces EMT and decreases metastatic potentials of the human prostate cancer DU145 cells. Cancer Cell Int 16:20 (2016).

PCT/US2022/024087 International Search Report and Written Opinion dated Jun. 30, 2022.

Wu, Qiong et al. Recent Advances with KDM4 Inhibitors and Potential Applications. J Med Chem 65(14):9564-9579 (2022).

* cited by examiner 3D sphere-forming capacity /
BCSC1 cells

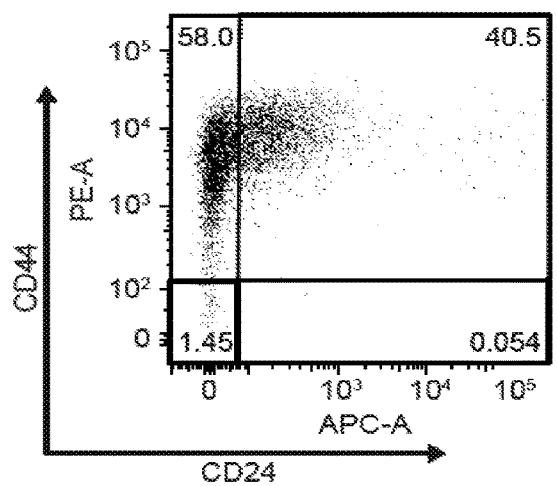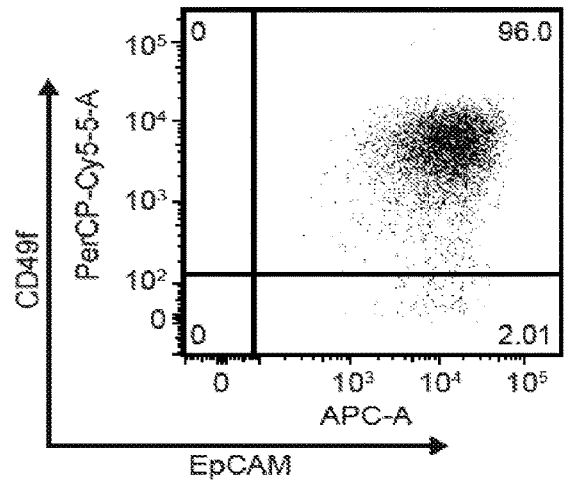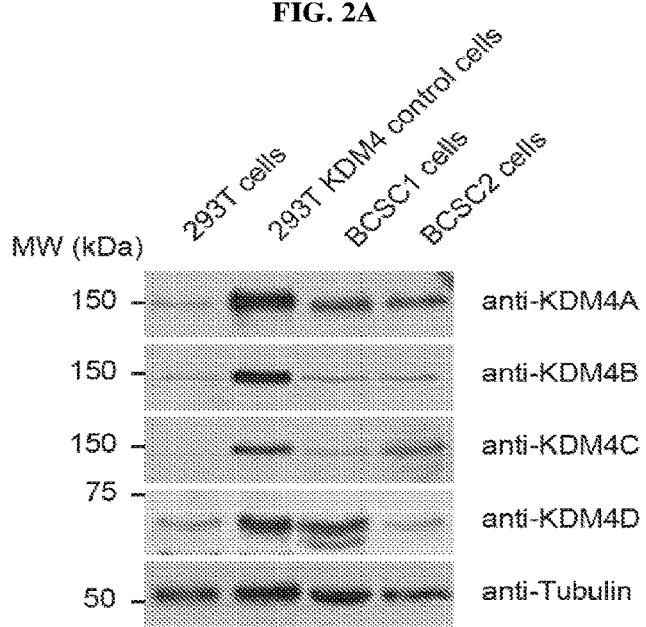

Compound I $EC_{50}$ = 3.4 nM

Genes with KDM4A present at the promoter (16792 genes)   Transcriptome +vs- KDM4(i) (580 genes, p<1e-5)

Tumor xenografts / BCSC1

Xenograft BCSC1

Tumor weights

Xenograft BCSC1 / 3D tumor model

Tumor volumes BCSC1

Expression analysis / BCSC1 xenograft

Cellular phenotype / BCSC2 cells

Proliferation assay / BCSC1 cells

Proliferation assay / BCSC2 cells

Dose-response BCSC1 cells $EC_{50}$ = 181 nM

SEQUENCE LISTING

<160> NUMBER OF SEQ ID NOS: 14

<210> SEQ ID NO 1
<211> LENGTH: 20
<212> TYPE: DNA
<213> ORGANISM: Homo sapiens

<400> SEQUENCE: 1
actgtggatg gggttgtgtt        20

<210> SEQ ID NO 2
<211> LENGTH: 20
<212> TYPE: DNA
<213> ORGANISM: Homo sapiens

<400> SEQUENCE: 2
ctgcgtcaca ctgctcaaat        20

<210> SEQ ID NO 3
<211> LENGTH: 20
<212> TYPE: DNA
<213> ORGANISM: Homo sapiens

<400> SEQUENCE: 3
cgggacaaga ttcgcttcta                                                      20

<210> SEQ ID NO 4
<211> LENGTH: 20
<212> TYPE: DNA
<213> ORGANISM: Homo sapiens

<400> SEQUENCE: 4
agcgcatcct ctagcttcac                                                      20

<210> SEQ ID NO 5
<211> LENGTH: 20
<212> TYPE: DNA
<213> ORGANISM: Homo sapiens

<400> SEQUENCE: 5
ccaacaacag caaggaggat                                                      20

<210> SEQ ID NO 6
<211> LENGTH: 20
<212> TYPE: DNA
<213> ORGANISM: Homo sapiens

<400> SEQUENCE: 6
gtgtcatcca acgtggtcag                                                      20

<210> SEQ ID NO 7
<211> LENGTH: 20
<212> TYPE: DNA
<213> ORGANISM: Homo sapiens

<400> SEQUENCE: 7
tgaccgcaga gtcttttcct                                                      20

<210> SEQ ID NO 8
<211> LENGTH: 20
<212> TYPE: DNA
<213> ORGANISM: Homo sapiens

<400> SEQUENCE: 8
cacaaggtgt tgccactgtt                                                      20

<210> SEQ ID NO 9
<211> LENGTH: 20
<212> TYPE: DNA
<213> ORGANISM: Homo sapiens

<400> SEQUENCE: 9
ggaaaaccta ccgcaatgaa                                                      20

<210> SEQ ID NO 10
<211> LENGTH: 20
<212> TYPE: DNA
<213> ORGANISM: Homo sapiens

<400> SEQUENCE: 10
gagctgcctg gacagaaaac                                                      20

<210> SEQ ID NO 11
<211> LENGTH: 20
<212> TYPE: DNA
<213> ORGANISM: Homo sapiens

<400> SEQUENCE: 11

```
ccaaccaagc tctcttgagg                                            20

<210> SEQ ID NO 12
<211> LENGTH: 20
<212> TYPE: DNA
<213> ORGANISM: Homo sapiens

<400> SEQUENCE: 12
gctttcggag atgttgcttc                                            20

<210> SEQ ID NO 13
<211> LENGTH: 20
<212> TYPE: DNA
<213> ORGANISM: Homo sapiens

<400> SEQUENCE: 13
cactgccttt aaccctcagc                                            20

<210> SEQ ID NO 14
<211> LENGTH: 20
<212> TYPE: DNA
<213> ORGANISM: Homo sapiens

<400> SEQUENCE: 14
acagaaggag aggcaatgga                                            20
```

KDM4 INHIBITORS

RELATED APPLICATIONS

This application is a continuation of Ser. No. 16/498,714, filed Sep. 27, 2019, which is a § 371 U.S. National Stage Entry of International Application No. PCT/US2018/024624, filed Mar. 27, 2018, which claims priority benefit of U.S. Provisional Application No. 62/478,785, filed Mar. 30, 2017, and U.S. Provisional Application No. 62/513,875, filed Jun. 1, 2017, all of which are incorporated entirely herein for all purpose.

SEQUENCE LISTING

The instant application contains a Sequence Listing which has been submitted electronically in txt format and is hereby incorporated by reference in its entirety. Said txt copy, created on Feb. 21, 2023, is named 55685-703_301_SL.txt and is 2,413 bytes in size.

FIELD

The embodiments described herein relate to compounds and methods for inhibiting the activity of the enzyme lysine demethylase 4 (KDM4).

BACKGROUND

There remains a need for compounds and methods for treating cancers.

SUMMARY

The present embodiments provide compounds and methods for inhibiting the enzymatic activity of KDM4 and treating cancers. More specifically, an aspect of the present embodiments provides substituted pyridine derivatives that inhibit KDM4 ("KDM4(i)") and exhibit unique preclinical characteristics. At least one embodiment provides a potent pan-KDM4(i), Compound I, that specifically blocks the demethylase activity of KDM4A, 4B, 4C, and 4D, but not that of other KDM family members. KDM4(i) anti-tumor properties were validated under conditions recapitulating patient tumors.

Another aspect of the present embodiments provides a method to screen KDM4(i) in triple-negative breast cancer stem-cells (BCSCs) prepared from individual patient tumors after neoadjuvant chemotherapy and propagated in vitro. Limiting dilution orthotopic xenografts of these BCSCs faithfully regenerated original patient tumor histology and gene expression. In at least one embodiment, KDM4(i) as described herein blocks proliferation, sphere formation, and xenograft tumor growth of BCSCs prepared according to the method.

In another embodiment, KDM4(i) compounds abrogate expression of EGFR, a driver of therapy-resistant, triple-negative breast tumor cells via inhibition of the KDM4A demethylase activity. This activity is particularly relevant in the context of BCSC from triple-negative tumors.

The present embodiments provide a unique BCSC culture system as a basis for therapeutic compound identification, and demonstrate that KDM4 inhibition is a therapeutic strategy for the treatment of cancers including triple-negative breast cancer.

DESCRIPTION OF THE DRAWINGS

FIG. 1A to FIG. 1H present data related to characterization of breast cancer stem cells (BCSC), and cell lines and xenografts derived therefrom. FIG. 1A shows representative growth data for a limiting-dilution assay of BCSC1 cell xenografts in immunocompromised mice. FIG. 1B shows immunohistochemical analysis of the original BCSC1 patient tumor and the BCSC1 xenograft tumor comprising hematoxylin and eosin (H&E), anti-CK8, anti-Ki67, anti-E-cadherin, and anti-vimentin staining. Scale bar: 100 μm. FIG. 1C shows anti-ER, anti-PR and HER2 immunohistochemical staining of the original BCSC1 patient tumor, the BCSC1 xenograft tumor, and positive control sample. ER: estrogen receptor; PR: progesterone receptor; HER2: human epidermal growth factor 2; scale bar: 100 m. FIG. 1D provides an unsupervised hierarchical cluster analysis of RNA microarray data presented as a cluster dendrogram. Samples are original patient tumors BCSC1, BCSC2, BCSC3, and BCSC4; derived BCSC1-4 lines; and BCSC1-4 xenograft tumors derived from the BCSC lines 1-4. FIG. 1E is representative pictures showing the cellular phenotype of BCSC1 cells cultured in 3D (top panel) and 2D (bottom panel) conditions. Scale bar, 100 μm. FIG. 1F demonstrates the sphere-forming capacity of BCSC1 cells in a methylcellulose assay (n=3). Comparisons were made using a one-way ANOVA. Data represent means±s.e.m. *$P<0.05$, $P<0.01$, *$P<0.001$. FIG. 1G and FIG. 1H show representative expression patterns of cancer stem cell markers in BCSC1 cells, as analyzed by FACS (n=3). FIG. 1G shows expression of CD24 and CD44 markers; FIG. 1H shows expression of CD49f and EpCAM markers.

FIG. 2A to FIG. 2F demonstrate that KDM4 inhibitors ("KDM4(i)") are potent inhibitors of BCSC1 cells. FIG. 2A shows anti-KDM4A, antiKDM4B, anti-KDM4C, anti-KDM4D, and anti-tubulin western blots. Samples are lysates from HEK293T; HEK293T transfected with expression plasmids expressing KDM4A, KDM4B, KDM4C, or KDM4D; BCSC1; and BCSC2 cells. FIG. 2B illustrates the formula/structure of a particular embodiment of KDM4(i), Compound I. FIG. 2C shows a representative cell proliferation assay of BCSC1 cells cultured in absence and presence of Compound I (n=3). •: vehicle; ■: 10 nM Compound I; ▲: 50 nM Compound I: data represent means±s.d. FIG. 2D is a representative dose-response curve for KDM4(i) on BCSC1 cells (n=3). Data represent means±s.d. FIG. 2E shows the 3D sphere-forming capacity of BCSC1 in an anchorage-independent growth assay in absence and presence of the indicated concentrations of a KDM4(i) (n=3); 0: vehicle; 10: 10 nM Compound I; 50: 50 nM Compound I. FIG. 2F shows primary (1° spheres) and secondary (2° spheres) sphere-forming capacity of BCSC1 cells in Matrigel (n=3); 10: 10 nM Compound I; 50: 50 nM Compound I; comparisons made using one-way ANOVA; data represent means±s.e.m.*$P<0.05$, $P<0.01$, *$P<0.001$.

FIG. 3A is a pie chart displaying the number of genes that are differentially regulated in BCSC1 cells upon treatment with a KDM4(i): the transcriptome of BCSC1 cells with or without KDM(i) exposure (580 genes, $p<1e-5$): 254 upregulated genes and 326 downregulated genes. FIG. 3B is a pie chart showing genomic distribution of KDM4A in BCSC1 cells as determined by ChIP-seq analysis: KDM4A peaks (172,692 peaks): 12.5% promoter; 40.5% intergenic; 41.0% intron; 3.3% exon; and 2.7% 3'UTR. FIG. 3C is a Venn diagram showing the intersection and number of genes where KDM4A is present on the promoter region with genes that are differentially regulated in BCSC1 cells upon treatment with a KDM4(i). A hypergeometric test calculated significance of overlaps (c; $p<10-50$). FIG. 3D illustrates KEGG pathways analyses (pathway enrichment analysis/common pathways) (pathways enriched for the set of 419 genes depicted in FIG. 3C). FIG. 3E reflects mRNA level analysis, more specifically a heat-map representing the mRNA levels found in BCSC1 cells cultured in absence (−) and presence (+) of a KDM4(i). The 37 direct target genes of KDM4A represent a gene signature common for all the pathways represented in FIG. 3D. FIG. 3F is a bar graph of expression analyses in samples obtained from BCSC1 cells cultured in the absence (black bars) and presence (gray bars) of KDM4 (i) (n=3). Data represent means±s.d. * p<0.0001;  p<0.001 by two-tailed Student's test. FIG. 3G and FIG. 3H are photos of anti-EGFR, anti-KDM4A, and anti-tubulin western blots generated from lysates of BCSC1 cells in the absence (−) and presence (+) of a KDM4(i) (FIG. 3G); or BCSC1 cells treated with shRNA control (Ctrl) or anti-KDM4A shRNA (FIG. 3H). FIG. 3I is a graph showing meta-analysis of sequencing read density based on H3K9me3 ChIPseqs around KDM4A peaks in BCSC1 cells cultured in the presence (gray) or absence (black) of a KDM4(i). A hypergeometric test was done to calculate the significance of the overlaps; p<10-50). FIG. 3J shows BCSC1 cells ChIP-Seq tracks analysis in the absence (dark) or presence (light) of a KDM4(i). Normalized levels of H3K9me3 tracks at the EGFR promoter.

FIG. 4A is a photo of representative xenograft BCSC1 tumors isolated from individual animals after 21 day of treatment. FIG. 4B is a graph depicting development of tumors, measured in $mm^3$, over time (n=11) (vehicle); (n=12) (a KDM4(i) treatment)). Data represent means±s.e.m. FIG. 4C shows tumor weight at the end of experiment (n=11 (vehicle); n=12 (KDM4(i)-treated)). Comparisons via one-way ANOVA. Data=means±s.e.m.*P<0.05, P<0.01, *P<0.001. FIG. 4D shows representative images of tumors; and FIG. 4E is a bar graph of volume size of tumor, in which data was obtained by ultrasound imagery at the start of treatment (Day 0) and after 21 days of treatment (Day21) (n=11 (vehicle), n=12 (KDM4(i) treatment)). Comparisons were made using a one-way ANOVA. Data represent means±s.e.m.*P<0.05, P<0.01, *P<0.001. FIG. 4F is a bar graph showing expression analyses of BCSC1 xenografts. Samples were obtained from BCSC1 xenograft tumors of mice treated with vehicle (−) or a KDM4i (+KDM4(i)). Error bars, s.d.; biological replicates (n=3). * p<0.0001;  p<0.001 by two-tailed Student's test.

FIG. 5A graphs representative growth curves for a limiting-dilution/BCSC2 xenograft formation assay of BCSC2 cells using BCSC2 xenografts in an immunocompromised mouse model. FIG. 5B shows photos of hematoxylin and eosin (H&E), anti-CK8, anti-Ki67, anti-E-cadherin, and anti-vimentin immunohistochemical staining. Samples are the original BCSC2 patient tumor and the BCSC2 xenograft tumor. FIG. 5C shows photos of anti-ER, anti-PR and HER2 immunohistochemical staining of the original BCSC2 patient tumor and the BCSC2 xenograft tumor. ER: estrogen receptor; PR: progesterone receptor; HER2: uuman epidermal growth factor 2; scale bar, 100 μm. FIG. 5D shows representative photos of BCSC2 cells cultured in 3D and 2D conditions. FIG. 5E is a bar graph showing sphere-forming capacity of BCSC2 cells in methylcellulose assay (n=3). Comparisons via one-way ANOVA; data represent means±s.e.m.; *P<0.05, P<0.01, *P<0.001. FIG. 5F and FIG. 5G are representative expression patterns of CSC markers CD24 and CD44 (FIG. 5F); and CD49f and EpCAM (FIG. 5G) in BCSC2 cells analyzed by FACS (n=3).

FIG. 6A is a graph reflecting a cell proliferation assay in which BCSC2 cells were culture in the absence (•) or presence of 10 nm (■) or 50 nm (▲) KDM4(i). FIG. 6B is a graph depicting a representative dose-response curve for a KDM4(i) on BCSC2 cells (n=3). Data represent means±s.e.m. FIG. 6C is a bar graph of BCSC2 sphere-formation in anchorage-independent growth assay, in absence (left bar) or presence of 10 nM (middle bar) or 50 nM (right bar) of a KDM4(i) (n=3). FIG. 6D is a bar graph of primary and secondary sphere-forming capacity of BCSC2 cells in Matrigel. For the primary week, cells were culture in absence (−) and presence (50 nM) of a KDM4(i). Comparisons via one-way ANOVA. Data represent means±s.e.m.*P<0.05, P<0.01, *P<0.001. FIG. 6E and FIG. 6F are graphs representative of apoptosis assays of BCSC1 cells (FIG. 6E) and BCSC2 cells (FIG. 6F) in absence (Vehicle) or presence of a KDM4(i), as analyzed by FACS (n=3). Data represent means±s.e.m.

FIG. 7A is a Venn diagram of BCSC1 cells and KDM4A locations, displaying the number of locations in control BCSC1 cells (Ctrl (172,639)) and BCSC1 cells infected with an adenovirus expressing an shRNA against KDM4A (KDM4A KD (3,215)) showing an overlap of 1110 locations. FIG. 7B and FIG. 7C show data of proliferation assays of BCSC cells, more specifically representative proliferation of BCSC1 (FIG. 7B) and BCSC2 (FIG. 7C) cells in absence (Vehicle) and presence of 10 μM Erlotinib (n=3). Data represent means±s.e.m. FIG. 7D and FIG. 7E are representative dose-response graphs of erlotinib exposure on BCSC1 cells (FIG. 7D) and BCSC2 cells (FIG. 7E) (n=3). Data represent means±s.e.m. FIG. 7F and FIG. 7G show BCSC1 (FIG. 7F) and BCSC2 (FIG. 7G) 3D sphere-forming capacity in anchorage-independent growth assay in the absence (left bar) and the presence of 1 μM (middle bar) or 10 μM (right bar) Erlotinib. Comparisons via one-way ANOVA; means±s.e.m.*P<0.05, P<0.01, *P<0.001. FIG. 7H and FIG. 7I show anti-EGFR, anti KDM4A, and anti-tubulin western blots. Samples are lysates from BCSC2 cells cultured in the absence and presence of a KDM4(i) (FIG. 7H); or treated with an shRNA control (Ctrl) or shRNA against KDM4A (FIG. 7I). FIG. 7J are two pie charts displaying genomic distribution of H3K9me3 in BCSC1 cells in the absence (H3K9me3 peaks: 141,722 peaks) or presence of KDM4(i) (H3K9me3 peaks: 144,266 peaks) as determined by ChIP-seq analysis: Vehicle: 6.2% promoter; 47.3% intergenic; 41.2% intron; 2.8% exon; 2.4% 3'UTR; +KDM4(i): 6.2% promoter; 47.7% intergenic; 40.7% intron; 2.9/6 exon; 2.4% 3'UTR. FIG. 7K is a Venn diagram showing number and intersection of KDM4A and H3K9me3 locations in BCSC1 cells cultured in the absence or presence of a KDM4(i). A hypergeometric test was done to calculate the significance of the overlaps (i; $p<10^{-50}$).

FIG. 8A is photos of representative xenograft BCSC2 tumors isolated from individual animals after 21 day of treatment. FIG. 8B is a graph showing development of tumors (measured in $mm^3$) (n=6). Data represent means±s.e.m. FIG. 8C is a bar graph of tumor weights at the end of the 21-day experiment (n=6). Comparisons via one-way ANOVA; data represent means±s.e.m. *P<0.05, P<0.01, *P<0.001. FIG. 8D shows representative images of tumors; and FIG. 8E is a bar graph of volume quantification of all tumors obtained by ultrasound imagery at the start of treatment (Day 0) and after 21 days of treatment (Day21) (n=6). Comparisons via one-way ANOVA; data represent means±s.e.m. *P<0.05, P<0.01, *P<0.001. FIG. 8F and FIG. 8G show body weight of mice bearing BCSC1 xenograft tumors (FIG. 8F) or BCSC2 xenograft tumors (FIG. 8G) over the treatment time-span of 21 consecutive days with either vehicle or a KDM4(i). Data represent means±s.e.m.

DETAILED DESCRIPTION

Figure 1A:
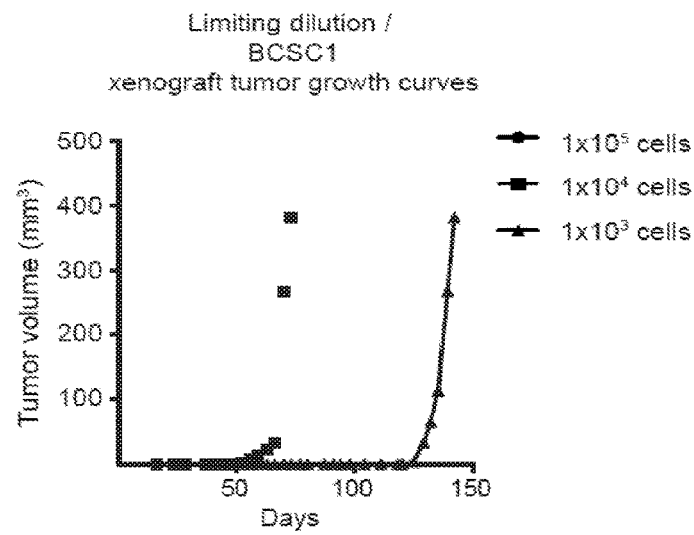

All patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

As used herein and in the claims, the singular forms include the plural reference and vice versa unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers. The term "or" is inclusive unless modified, for example, by "either." When ranges are used herein for physical properties, such as molecular weight, or chemical properties, such as chemical formulae, all combinations and sub-combinations of ranges and specific embodiments therein are intended to be included. Other than in the operating examples, or where otherwise indicated, all numbers expressing quantities of ingredients or reaction conditions used herein should be understood as modified in all instances by the term "about." The term "about" when referring to a number or a numerical range means that the number or numerical range referred to is an approximation within experimental variability (or within statistical experimental error), and thus the number or numerical range may vary between 1% and 15% of the stated number or numerical range, as will be readily recognized by context.

Unless otherwise defined, scientific and technical terms used in connection with the formulations described herein shall have the meanings that are commonly understood by those of ordinary skill in the art. The terminology used herein is for the purpose of describing particular embodiments only, and is not intended to limit the scope of the present invention, which is defined solely by the claims.

The embodiments described herein provide therapy particularly indicated when the disease state of the subject (e.g., cancer or neoplastic disease) is associated with epigenetics or the epigenetic state of the subject.

By way of background, epigenetics is the study of heritable changes in gene expression caused by mechanisms other than the underlying DNA sequence. Molecular mechanisms that play a role in epigenetic regulation include DNA methylation and chromatin/histone modifications. The genomes of eukaryotic organisms are highly organized within the nucleus of the cell. Tremendous compaction is required to package the 3 billion nucleotides of the human genome into the nucleus of a cell. Chromatin is the complex of DNA and protein that makes up chromosomes. Histones are the major protein component of chromatin, acting as spools around which DNA winds. There are six classes of histones (HI, H2A, H2B, H3, H4, and H5) organized into two groups: core histones (H2A, H2B, H3, and H4) and linker histones (H1 and H5). The basic unit of chromatin is the nucleosome, which consists of about 147 base pairs of DNA wrapped around the core histone octamer, consisting of two copies each of the core histones H2A, H2B, H3, and H4. Changes in chromatin structure are affected by covalent modifications of histone proteins and by non-histone binding proteins. For example, DNA methylation, acetylation, and other post-translational modifications of the nucleosome histone proteins alter chromatin organization and gene expression without altering the underlying DNA sequence. Thus, alterations in the cellular epigenetic environment, and not only primary genetic mutations, play an important role in tumor formation, progression and resistance to treatment, because epigenetic modification may influence if, when, or where specific genes are expressed. Chaidos et al., 6 Ther. Adv. Hematol. 128 (2015). Epigenetic modification is a dynamic and reversible process that is written, erased, and read by various enzyme families. Several classes of enzymes are known which modify histones at various sites. Arrowsmith et al., 11 Nature Rev. Drug Discov. 384 (2012). See also, U.S. Pat. No. 9,255,097.

Histone "demethylases" are enzymes that remove at least one methyl group from a polypeptide, and particular demethylases may demethylate either a mono-, di- or a tri-methylated substrate. Histone demethylases can act on a substrate including methylated core histones, mononucleosomes, dinucleosomes, oligonucleosomes, peptides, or chromatin (e.g., in a cell-based assay). Example lysine-specific demethylases include lysine-specific demethylase 1 (LSD1 or KDM1), that demethylates both mono- and di-methylated H3K4 or H3K9 using flavin as a cofactor; and a family of demethylases characterized by a ~150 amino acid-long Jumonji C (JmjC) domain (e.g., jumonji domain-containing histone demethylase 1 [JHDM1/KDM2A]). See, e.g., U.S. Pat. No. 9,255,097; WO 2015/200709.

Figure 9:
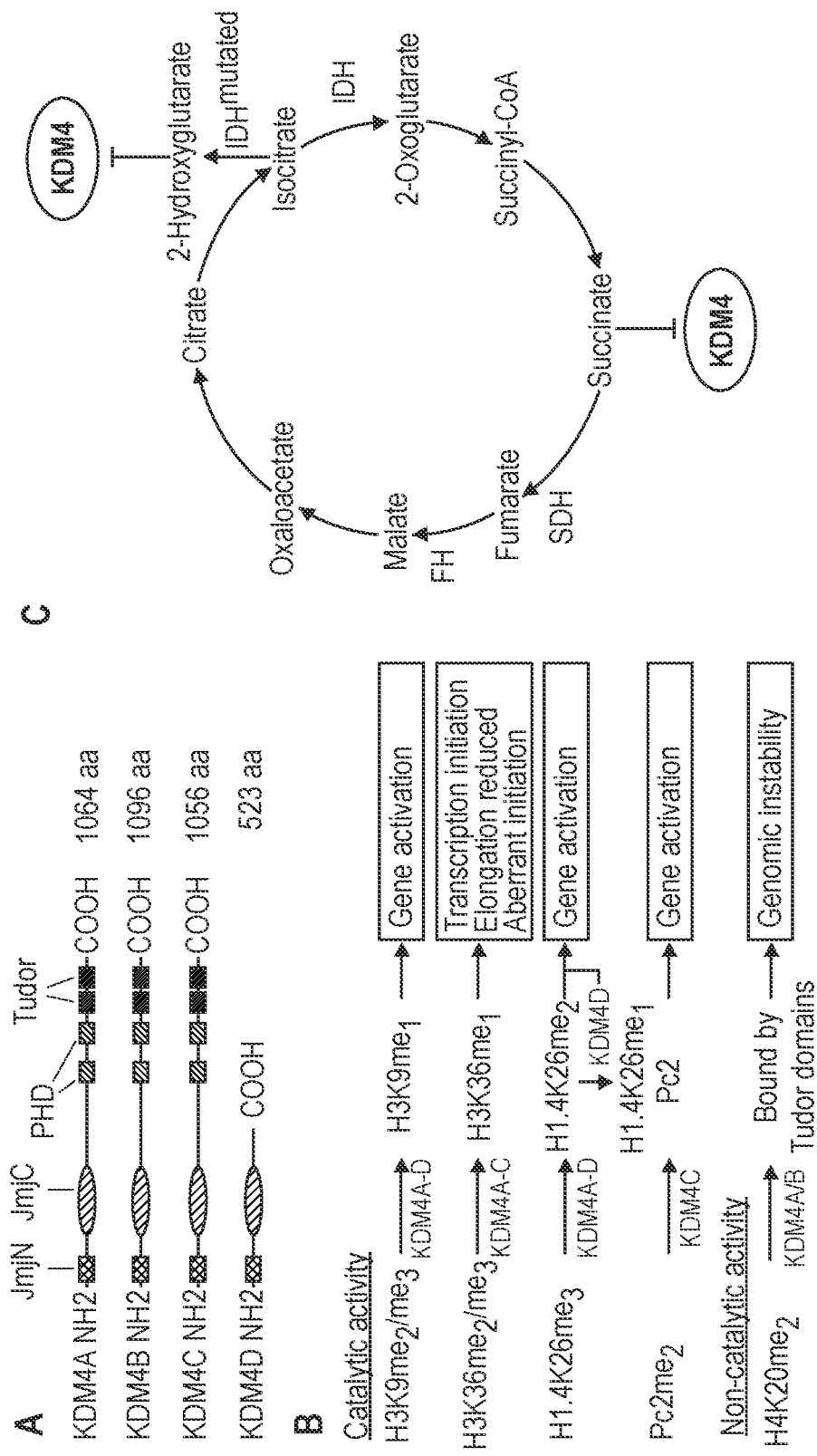
FIG. 9 presents a series of illustrations related to KGM4 structure and function. (A) is a schematic structure of four KDM4 proteins. The JmjN domain is required for the activity of the JmjC catalytic center. (B) shows modes of KDM4 function as demethylases or independent of enzymatic activity. (C) shows SDH, FH and IDH in the Krebs cycle. Succinate accumulates upon SDH or FH mutation, while neomorphic IDH mutations lead to 2-hydroxyglutarate production. This figure is reproduced from Berry & Janknecht, *KDM4/JMJD2 Histone Demethlyases: Epigenetic Regulators in Cancer Cells,* 73(10) Cancer Res. 2936 (2013).

More specifically, human LSD1 and its paralog, LSD2, demethylate both mono- and di-methylated histone H3 lysine 4 (H3K4) and H3K9 via a FAD-dependent amine oxidation reaction. Unlike the FAD-dependent mechanism of LSD1/2, the Jumonji C domain-containing (JMJD) proteins act through a dioxygenase reaction mechanism that requires $Fe^{2+}$, $O_2$, and 2-oxoglutarate to demethylate histones. The JMJD catalytic step is the hydroxylation of a lysine methyl group, which converts it to a hydroxymethyl moiety that spontaneously leaves the nitrogen center of the lysine and releases formaldehyde. This reaction allows JMJD proteins, in principle, to demethylate tri-, di- and mono-methylated lysine residues, whereas LSD1/2 cannot attack trimethylated lysine residues due to the requirement of a free electron pair on the methylated nitrogen. Most of the JMJD proteins demethylate H3K4, H3K9, H3K27, H3K36, or H4K20, but the enzymatic activity of several JMJD proteins remains unknown, some JMJD demethylases may have methyl-arginine demethylase activity, and some other JMJD proteins may have no catalytic activity at all. See Berry & Janknecht, *KDM4/JMID2 Histone Demethylases: Epigenetic Regulators in Cancer Cells*, 73(10) Cancer Res. 2936 (2013); see also FIG. 9. In addition to JHDM1/KDM2A mentioned above, JMJD proteins include some thirty human members phylogenetically clustered into seven subfamilies: JMJD2, JHDM1, JHDM2, JHDM3, JARID, PHF2/PHF8, UTX/UTY, and JmjC domain only. See, e.g., U.S. Pat. No. 9,447,046.

One of the largest JMJD subfamilies, the JMJD2A-E protein family, is preferentially called KDM4 for K (lysine) demethylase 4. The KDM4 subfamily includes KDM4A, B, C, and D. KDM4 can recognize di- and tri-methylated H3K9 and H3K36, as well as trimethylated H1.4K26, as substrates. Berry & Janknecht, 2013. For example, ectopic expression of KDM4 family members dramatically decreased levels of tri- and di-methylated H3K9, and increased levels of mono-methylated H3K9, which then delocalized heterochromatin protein 1 and reduced overall levels of heterochromatin in vivo. Importantly, KDM4 demethylases catalyze the demethylation of both the repressive H3K9me3 mark and the H3K36me3 mark, the latter linked to transcriptional elongation. Frank et al., *Therapeutic promise of cancer stem cell concept*, 120 J. Clin. Invest. 41 (2010).

The present embodiments provide use of substituted pyridine derivative compounds for inhibiting the enzymatic activity of KDM4, and advantageously treating cancer. In particular, an embodiment of KDM4(i) described herein as Compound I exhibited striking selectivity and efficacy in inhibiting breast cancer tumors, importantly, tumors of triple-negative breast cancer.

Breast cancer is the worldwide leading cause of cancer death among women. Ferlay et al., GLOBOCAN 2012 v1.0, Cancer Incidence & Mortality Worldwide: IARC Cancer Base No. 11 (2013). Cancer progression is associated with alterations of epigenetic regulators such as histone-lysine demethylase 4 (KDM4). Dave & Chang, *Treatment resistance in stem cells & breast cancer*, 14 J. Mamm. Gland Biol. Neoplasia 79 (2009); Frank et al., *Therapeutic promise of cancer stem cell concept*, 120 J. Clin. Invest. 41 (2010); Pattabiraman & Weinberg, *Targeting Epithelial-to-Mesenchymal Transition: Case for Differentiation-Based Therapy*, Cold Spring Harbor Sympos. Quantitat. Biol. (2017); Sharma et al., *Induction of CXCR2 ligands, stem cell-like phenotype, & metastasis in chemotherapy-resistant breast cancer cells*, 372 Cancer Lett. 192 (2016).

During breast cancer therapy, classical treatments fail to address resistant cancer stem-cell populations, and targeting KDM protein or function is emerging as a possible route for treatment. Zhang et al., *Cellular orig. & evol. breast cancer*, Cold Spring Harbor Perspect. Med. (2017); Chu et al., *KDM4B as target for prostate cancer: structural analysis & selective inhibition by novel inhibitor*, 57 J. Med. Chem. 5975 (2014); Labbe et al., *Histone lysine demethylase (KDM) subfamily 4: structures, functions & therapeutic potential*, 6 Am. J. Transl. Res. 1 (2013); Qiu et al., *KDM4B & KDM4A promote endometrial cancer progression by regulating androgen receptor, c-myc, & p27kip1*, 6 Oncotarget 31702 (2015); Soini et al., *KDM4A, KDM4B & KDM4C in non-small cell lung cancer*, 8 Int'l J. Clin. Exper. Pathol. 12922 (2015).

The present embodiments provide a KDM4 inhibitor with unique preclinical characteristics. This KDM4(i) is a highly potent pan-KDM4 inhibitor that specifically blocks the demethylase activity of KDM4A, B, C, and D but not that of the other members of the KDM family. The KDM4(i) anti-tumor properties were validated under conditions recapitulating patient tumors.

Another aspect of the present embodiments provides a method to isolate and grow triple-negative breast cancer stem-cells (BCSCs) from individual patient tumors after neoadjuvant chemotherapy. Limiting dilution orthotopic xenografts of these BCSCs faithfully regenerated original patient tumor histology and gene expression. KDM4(i) blocks proliferation, sphere formation and xenograft tumor growth of BCSCs. Importantly, KDM4(i) abrogates expression of EGFR, a driver of therapy-resistant, triple-negative breast tumor cells via inhibition of the KDM4A demethylase activity. Hsu & Hung, *Role of HER2, EGFR, & other receptor tyrosine kinases in breast cancer*, 35 Cancer Metast. Rev. 575 (2016). The present embodiments provide a unique BCSC culture system as a basis for therapeutic compound identification and demonstrate that KDM4 inhibition is a new therapeutic strategy for the treatment of triple-negative breast cancer.

Dysregulation of the KDM4 demethylases has been documented in a variety of cancers including breast cancer. Berry & Janknecht, 2013. It has been shown that KDM4 controls tumor cell proliferation, particularly in aggressive breast cancers. Ye et al., *Genetic alterations of KDM4 subfamily & therapeutic effect of novel demethylase inhibitor in breast cancer*, 5 Am. J. Cancer. Res. 1519 (2015). Therapy resistance and metastatic dissemination are the main problems faced during breast cancer treatment. Breast cancer stem-cells have been suggested to be responsible for both therapy resistance and metastatic dissemination. Chu et al., 2014; Ansieau, *EMT in breast cancer stem cell generation*, 338 Cancer Lett. 63 (2013). These resistant cancer stem-cell (CSC) populations have only been poorly characterized, however, and targeted therapeutics have yet to be identified. Because KDM4 demethylases may provide effective therapeutic targets for the treatment of cancer, a screen was developed to identify novel KDM4 inhibitors. In order to validate inhibitors under conditions that mimic cancer stem-cell populations, a new 3D cultivation method was developed as described herein, using defined serum-free conditions and a low oxygen environment to enrich BCSCs from individual patient tumors after neoadjuvant chemotherapy.

As shown in Table 1, below, cultures of four different BCSC lines (BCSC1, 2, 3, and 4) were established. All lines originated from primary breast tumors that were Triple-negative. estrogen receptor (ER), progesterone receptor (PR), and human epidermal growth factor receptor 2 (HER2) negative; all xenograft tumors established from these lines were triple-negative.

TABLE 1

BCSC1-4 patient original tumor, BCSC1-4
cell lines, and BCSC1-4 xenografts

| | Patient Tumor | | Xenograft Tumor | |
|---|---|---|---|---|
| ID | Primary Diagnosis | Neoadjuvantly administered chemotherapeutic drugs | Classification | Tumor formation |
| BCSC1 | IC | FEC, FAC, TAC, TC, Cisplatin | Triple-negative | 36/38 |
| BCSC2 | IDC | Taxol, Myocet | Triple-negative | 30/43 |
| BCSC3 | IDC | EC, Taxotere | Triple-negative | 7/7 |
| BCSC4 | MC | AC, Taxol, GemCa | Triple-negative | 2/2 |

BCSC1-4: breast cancer stem-cells 1-4; IC: invasive carcinoma; IDC: invasive ductal carcinoma; MC: metaplastic carcinoma; FEC: 5FU/epi-rubicin/cyclophosphamide; FAC: 5FU/doxorubicin/cyclophosphamide; TAC: docetaxel/doxo-rubicin/cyclophosphamide; TC: docetaxel/cyclophosphamide; EC: epirubicin/cyclophosphamide; AC: doxorubicin/cyclophosphamide; GemCa: carboplatin/gemcitabine.

The estimated frequency of cancer stem-cells in the BCSC cultures was determined (by limiting dilution cell number transplantation) to range from 0.26 to 179 in $1 \times 10^5$ cells, as reflected in Table 2:

TABLE 2

Limiting dilution/xenograft tumor formation

| Number of cells | $1 \times 10^5$ | $1 \times 10^4$ | $1 \times 10^3$ | Stem-cells/$1 \times 10^5$ |
|---|---|---|---|---|
| BCSC1 | 36/38 | 8/8 | 3/4 | 5.1 |
| BCSC2 | 30/42 | 3/4 | 2/2 | 1.5 |
| BCSC3 | 6/6 | 6/6 | 6/6 | 179 |
| BCSC4 | 5/6 | 3/6 | 0/6 | 0.26 |

Figure 1B:
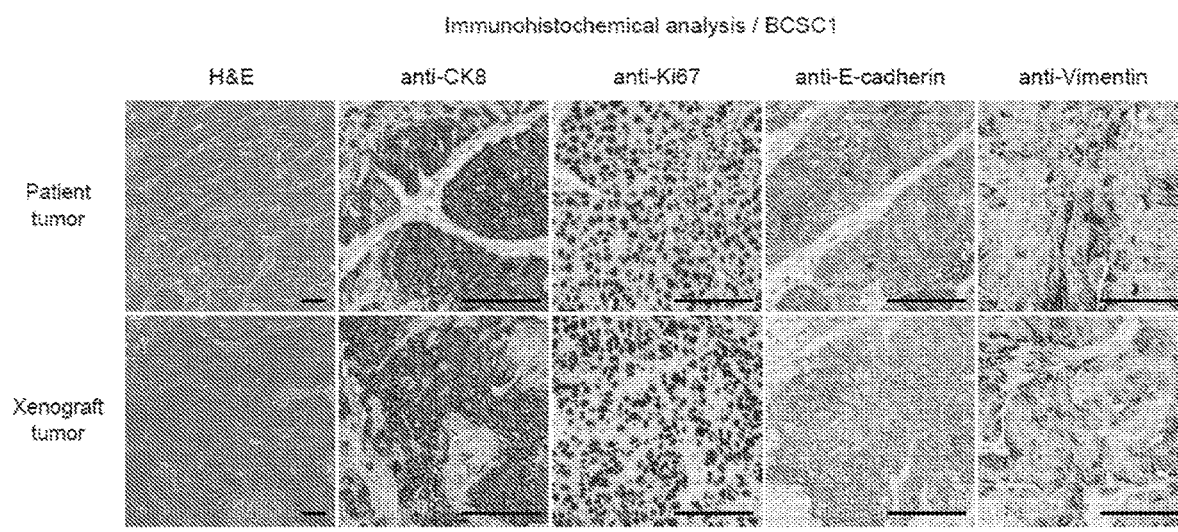
Figure 1C:
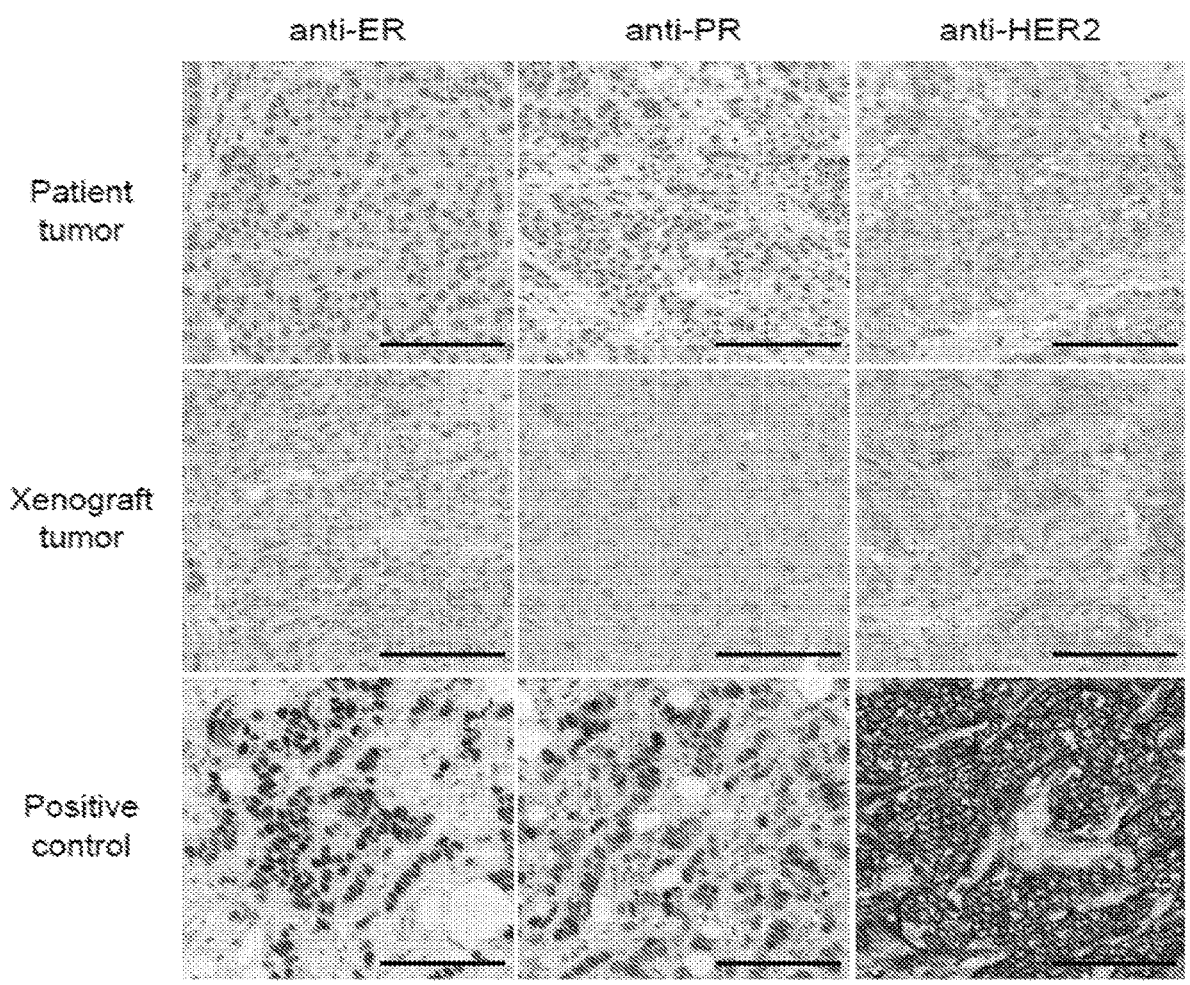
Figure 5A:
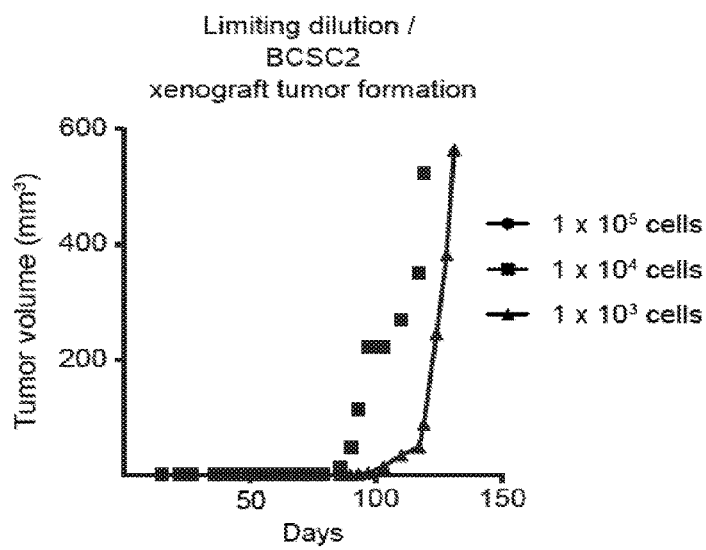
FIG. 5A to FIG. 5G demonstrates that BCSC2 cells and xenograft recapitulate the original tumor patient.
Figure 5B:
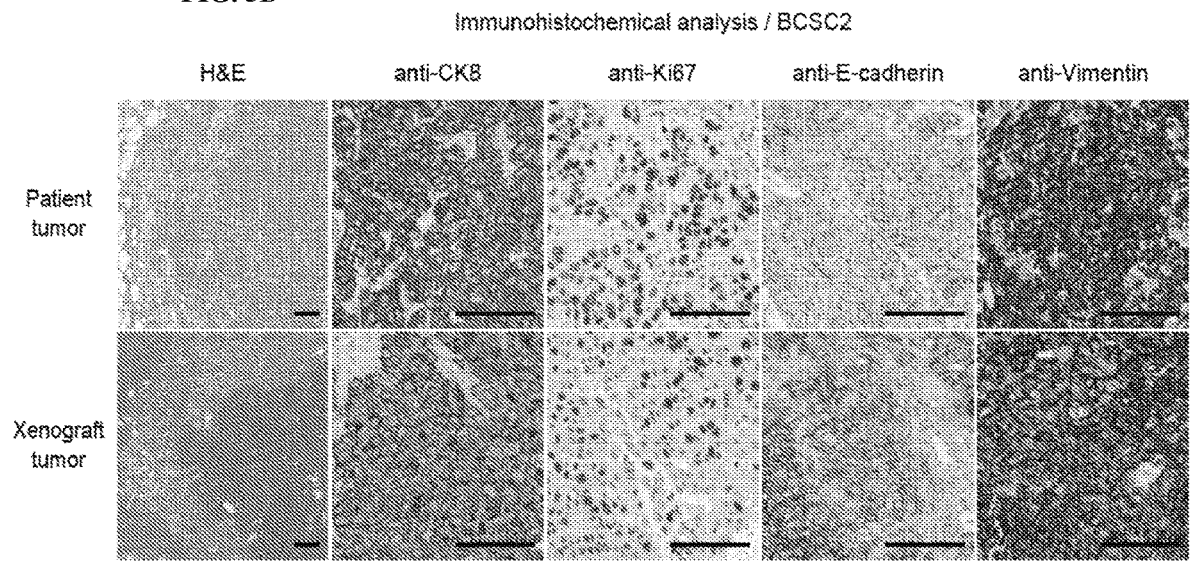
Figure 5C:
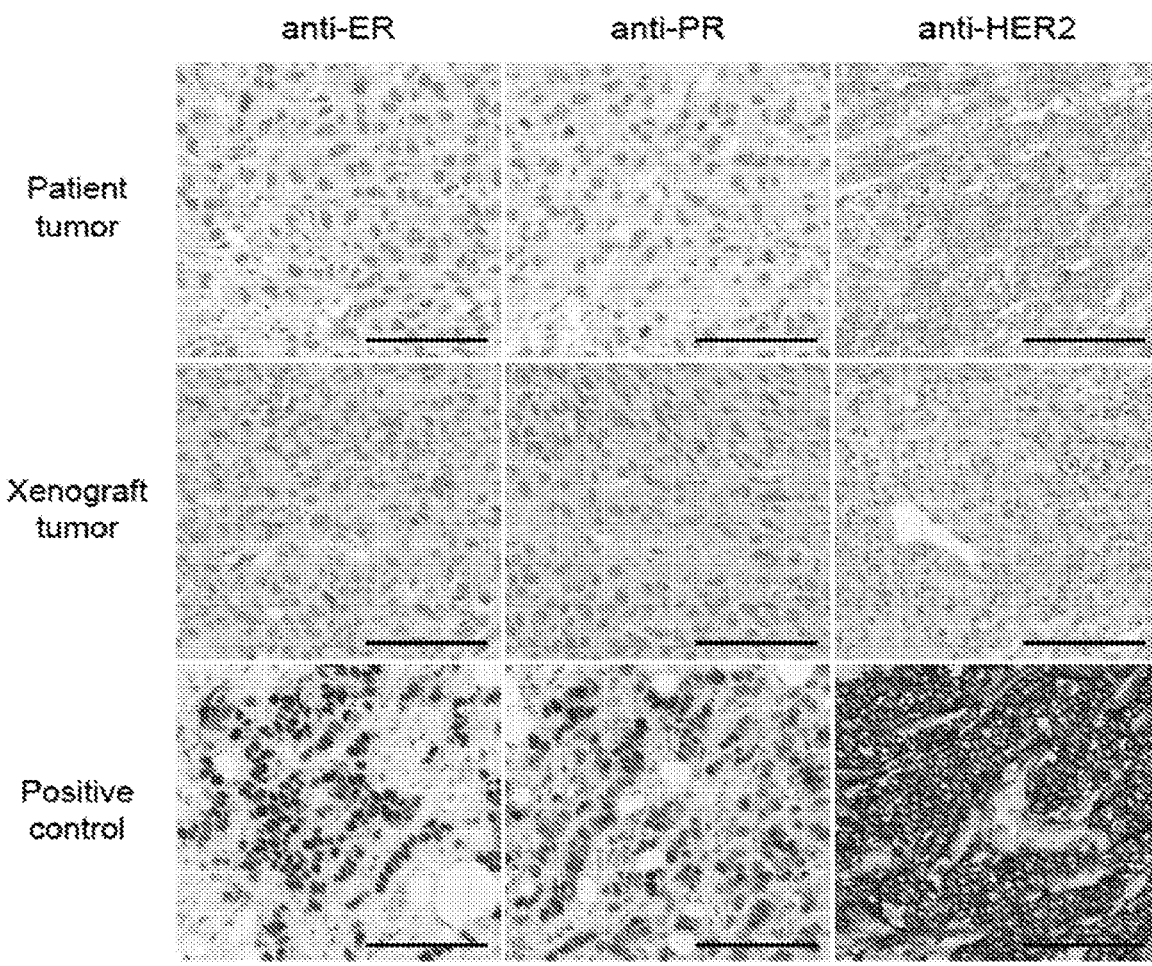

Limiting dilution orthotopic xenografts of these triple-negative BCSCs in immuno-compromised NOD/SCID mice yielded triple-negative tumors that closely match the patient's primary tumor both morphologically and phenotypically. Tables 1 and 2; FIG. 1C; FIG. 5A. Immunohistochemical analyses of the mammary epithelial markers cytokeratin 8, E-cadherin, and vimentin, as well as analyses of the proliferation marker Ki67 of BCSC1 and BCSC2 xenograft tumors, showed that the xenograft tumors share a similar pattern with parental patient tumors. FIG. 1B; FIG. 5B. Indeed, matching the parental tumor, the BCSC xenografts were negative for expression of ER, PR, and HER2 proteins expression. Table 1, FIG. 1C; FIG. 5C.

Figure 1D:
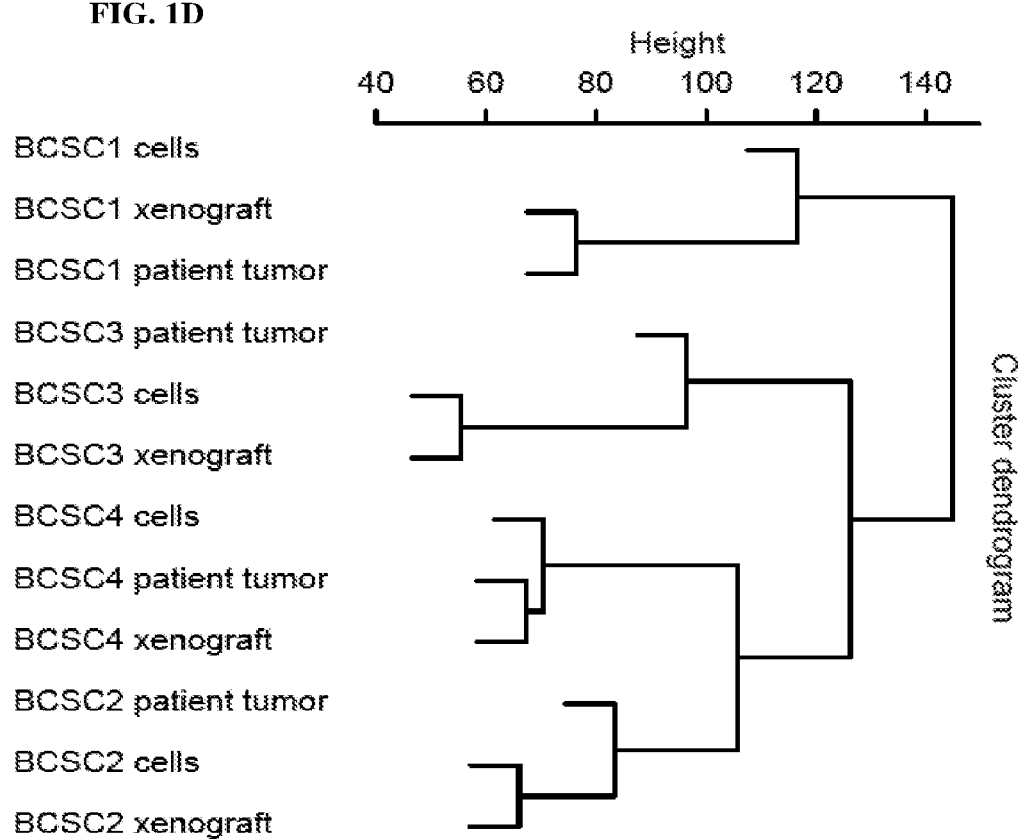

Additionally, unsupervised hierarchical clustering analysis of RNA microarray data showed that the tumor xenografts share a close profile with the parental tumors, indicating a preservation of the respective molecular tumor subtype. FIG. 1D. The BCSC lines clustered separately from host tumor and xenograft, specifying the unique properties of these cells. Nevertheless, they clustered within the host tumor subtype depicting a close correlation between the three entities. FIG. 1D.

Figure 1E:
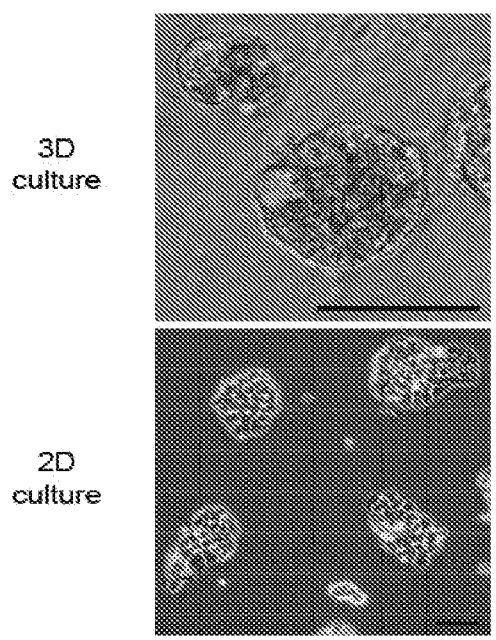
Figure 1F:
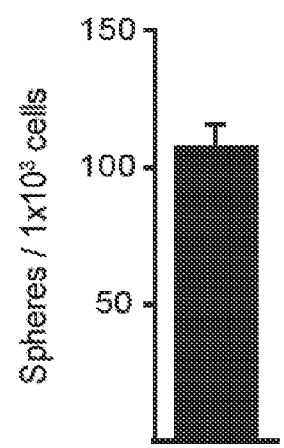
Figure 5D:
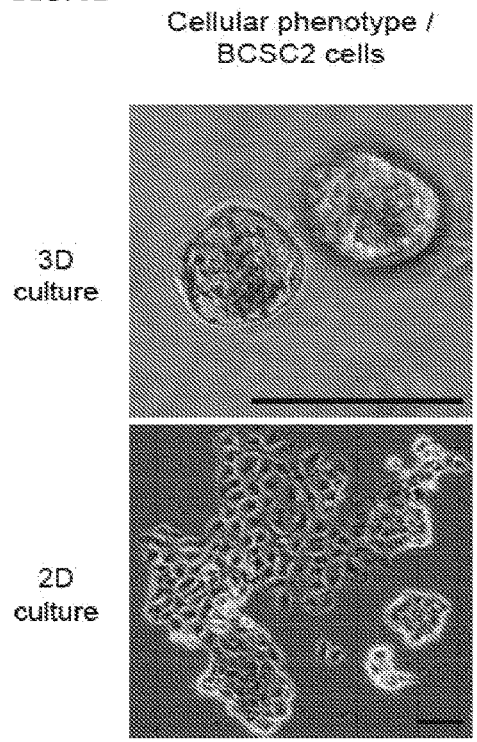
Figure 5E:
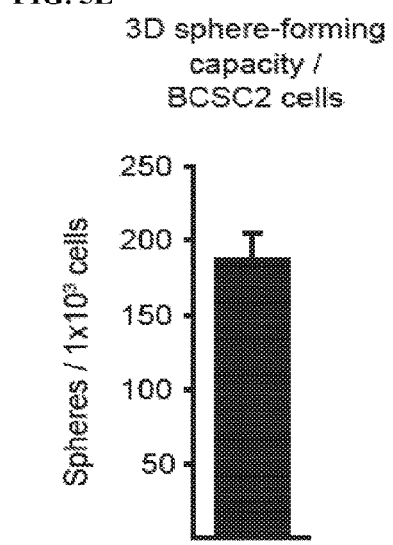
Figure 5F:
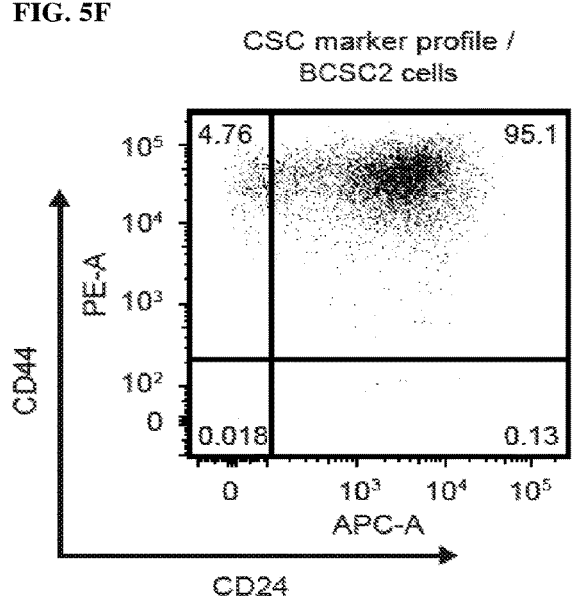
Figure 5G:
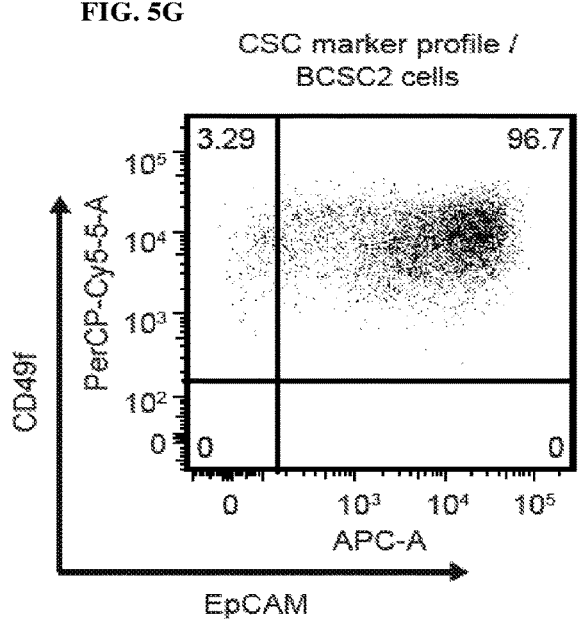

The BCSCs were also cultivated in a 3D and 2D environment, growing as spheroids and mainly epithelial clusters, respectively. FIG. 1E: FIG. 5D. When challenged in an anchorage-independent growth assay, BCSC1 and BCSC2 cells demonstrated a sphere-forming capacity of 11% and 17%, respectively. FIG. 1F; FIG. 5E. Unsorted BCSCs, isolated and cultivated as described above, expressed to varying degrees the well-known CSC markers such as CD24/CD44 (FIG. 1G; FIG. 5I) and CD49f/EpCAM (FIG. 1H; FIG. 5J). Taken together, the data show that BCSCs from triple-negative breast tumors can be isolated and cultivated directly from patient tissue to provide an in vitro cellular platform representing this disease. This allows for the identification and validation of novel cancer targeting strategies in vitro and in vivo.

Figure 2B:
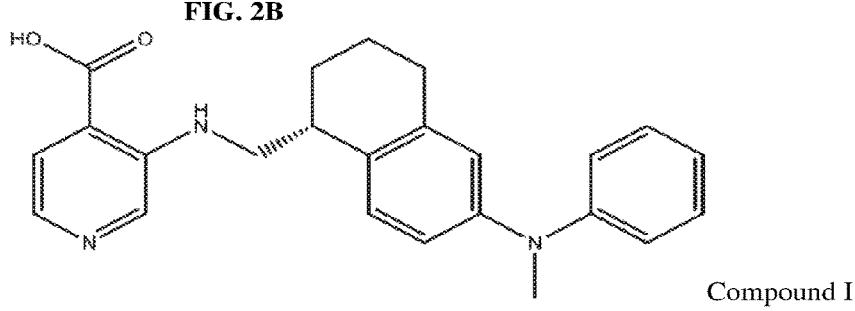

The expression levels in the BCSC cells of the various KDM4 family members were evaluated by western blot analysis. Metzger et al., *LSD1 demethylates repressive histone marks to promote and rogen receptor-dependent transcription*, 437 Nature 436 (2005). As shown in FIG. 2A, KDM4A was expressed at high levels in both BCSC1 and BCSC2 cells. These cells also exhibited heterogeneous expression levels of KDM4B, KDM4C, and KDM4D. These observations indicate that KDM4 are therapeutic targets for treatment of BCSC populations. Accordingly, a screen to characterize KDM4(i) was performed to explore compounds suitable for treating cancers, in particular cancers such as therapy resistant clonal BCSC-originating tumors. This screen confirmed the efficacy of a particular KDM4(i) shown in FIG. 2B (Compound I). Importantly, this KDM4(i) specifically blocked the demethylase activities of KDM4A, 4B, 4C, and 4D ($IC_{50} < 105$ nM) but did not affect the demethylase activity of the other KDMs. Of note, KDM4(i) exhibited a weak effect on the demethylase activity of KDM5B. Table 3 shows the half-maximal inhibitory concentration ($IC_{50}$) of a Compound I against KDM demethylases:

TABLE 3

KDM4(i) $IC_{50}$ per KDM4 member

| KDM4 family member | Compound I $IC_{50}$ (μM) |
|---|---|
| KDM4A | 0.104 |
| KDM4B | 0.056 |
| KDM4C | 0.035 |
| KDM4D | 0.104 |
| KDM2A | >10 |
| KDM2B | >10 |
| KDM5B | 0.750 |
| KDM6A | >10 |
| KDM6B | >10 |

Moreover, KDM4(i) strongly inhibited proliferation of several types of cancer cell lines, including the triple-negative breast cancer cells: MDA-MB-231. Table 4 shows the half-maximal effective concentration ($EC_{50}$) of Compound I on various cancer cell lines as shown in a 7-day cell MTS assay:

TABLE 4

KDM4(i) $EC_{50}$ per cancer cell line

| Cell line | Compound I $EC_{50}$ (nM) |
|---|---|
| Jurkat | 1.1 |
| Kyse-150 | 5.1 |
| MDA-MB-231 | 5.9 |
| PC-3 | 8.2 |
| HCT-116 | 11 |
| Raji | 12 |
| DU-145 | 13 |
| HCC-70 | 27 |
| Kasumi | 34 |
| HL-60 | 43 |
| NCI-H1792 | 65 |
| NCI-H460 | 68 |
| U-87 | >10,000 |
| IR-90 | >10,000 |
| ZR-75-1 | >10,000 |

Furthermore, pharmacokinetic studies indicated that KDM4(i) such as Compound I has properties that demonstrate its suitability for use in the clinic. Example pharmacokinetic data is shown in Table 5:

TABLE 5

| KDM4(i) PK parameters | |
|---|---|
| Dose iv/po (mg/kg) | 5/10 |
| po ½ (hr) | 2.57 |
| AUC po (µg hr/mL) | 10.4 |
| Vz (mL/kg) | 666 |
| F % | 30.4 |

AUC: Area Under the Curve (plasma concentration-time curve);
iv: intravenous;
po: by mouth;
Vz: apparent volume of distribution during terminal phase;
F %: bioavailability (systemic availability of administered dose)

Figure 2C:
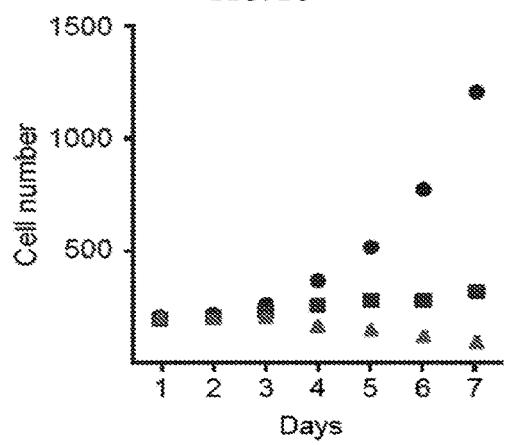
Figure 2D:
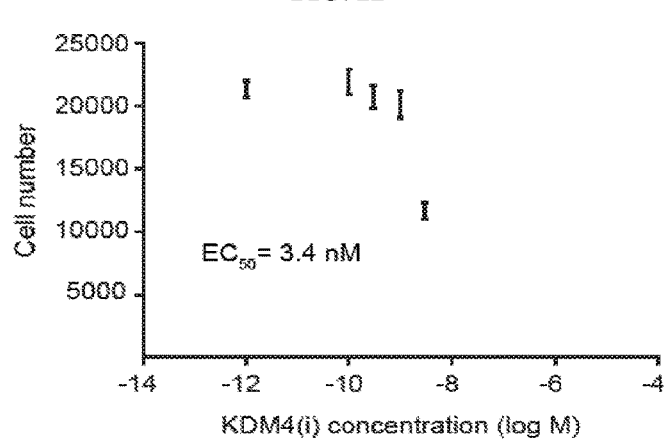
Figure 2E:
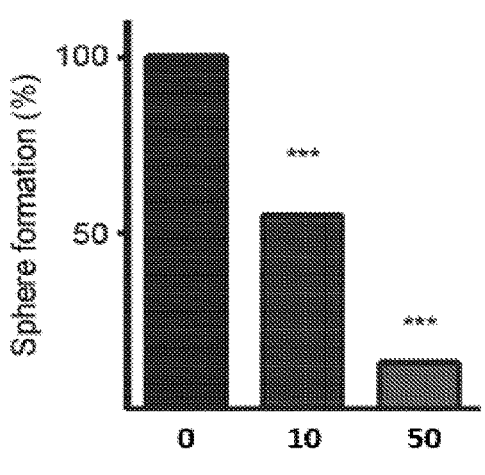
Figure 2F:
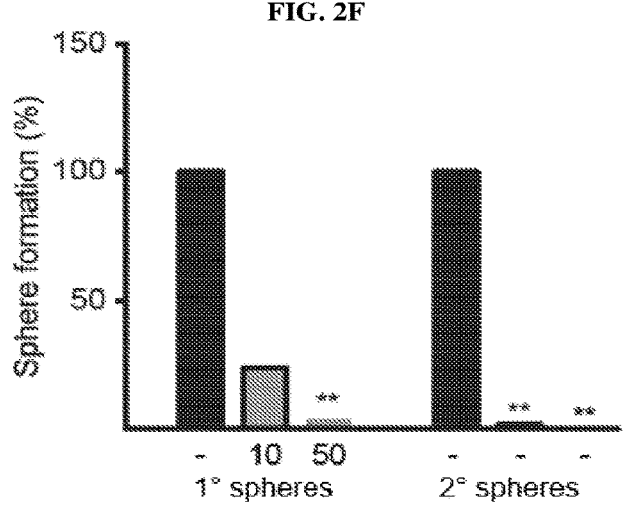
Figure 6A:
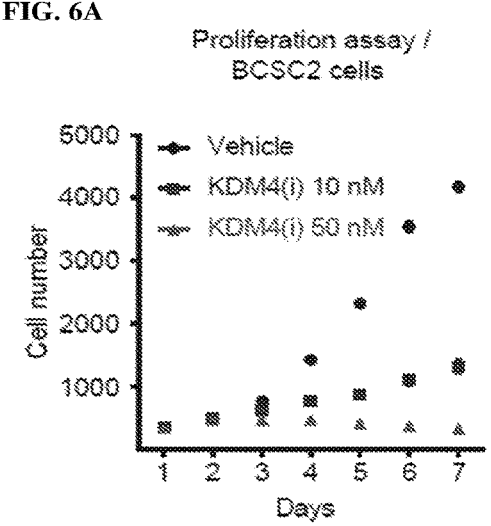
FIG. 6A to FIG. 6F show that a KDM4(i) is a potent inhibitor of BCSC2 cells.
Figure 6B:
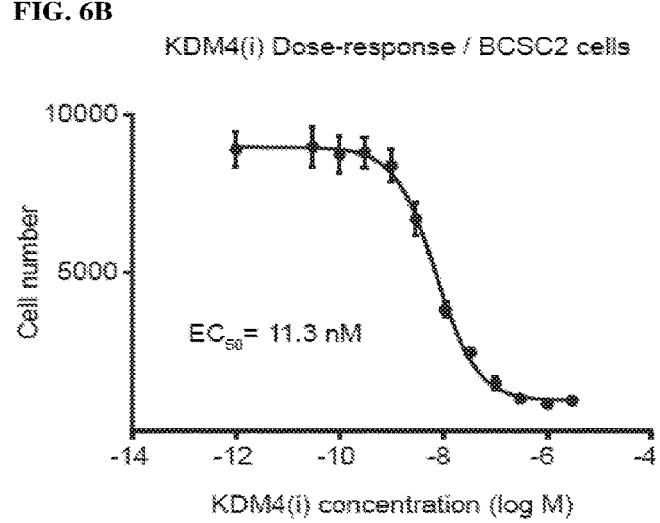
Figure 6C:
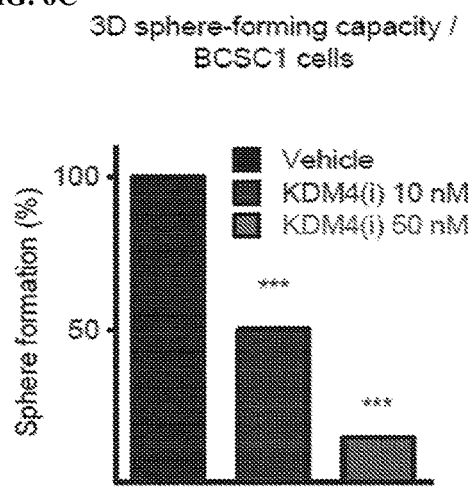
Figure 6D:
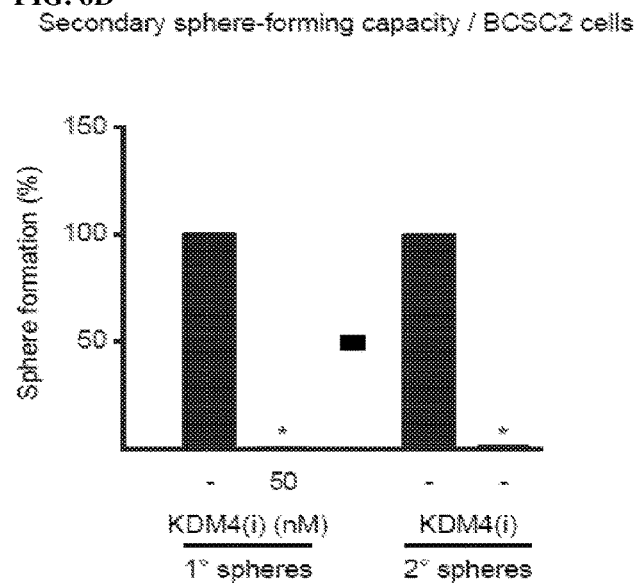
Figure 6E:
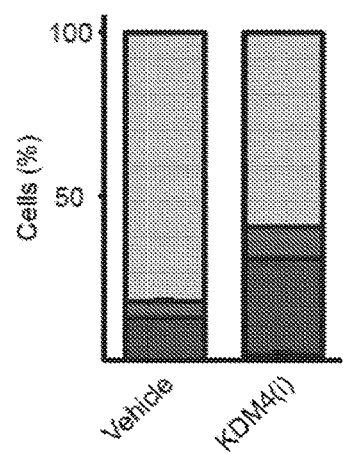
Figure 6F:
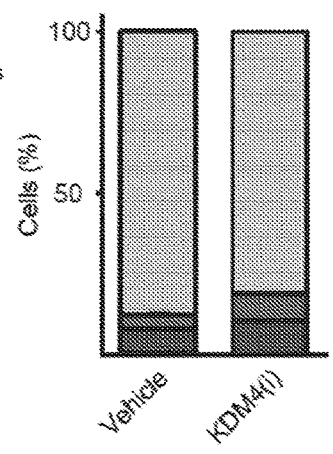

Regarding the efficacy of KDM4(i) on BCSC proliferation, concentrations as low as 10 nM KDM4(i) (Compound I) inhibited BCSC1 and BCSC2 proliferation, and 50 nM KDM4(i) strongly inhibited survival of BCSC1 and BCSC2. FIG. 2C, FIG. 2D; FIG. 6A, FIG. 6B. This inhibitory effect was even more evident in an anchorage-independent sphere formation assay in which KDM4(i) dramatically reduced the sphere-forming capacity of both BCSC1 and BCSC2 cells. FIG. 2E; FIG. 6C. Furthermore, when seeded under KDM4 (i) treatment in MATRIGEL® matrix, sphere formation of BCSC1 cells was diminished significantly in first generation spheres. When reseeded after a week under KDM4(i) treatment, secondary sphere-forming capacity was abolished, even without presence of the inhibitor. FIG. 2F; FIG. 6D. Taken together, the KDM4(i) Compound I exhibited unique pre-clinical features that support its use for the treatment of BCSC-driven tumors.

Figure 3A:
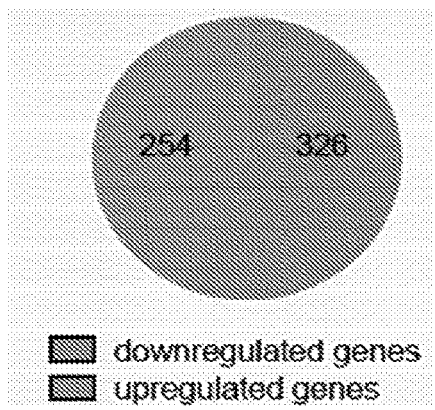
FIG. 3A to FIG. 3J shows that a KDM4(i) can target BCSC through EGFR regulation.
Figure 3B:
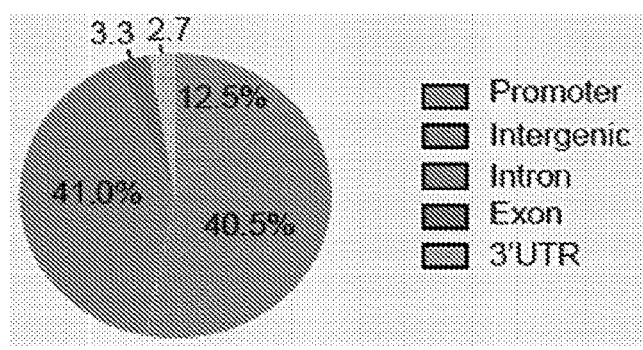
Figure 3C:
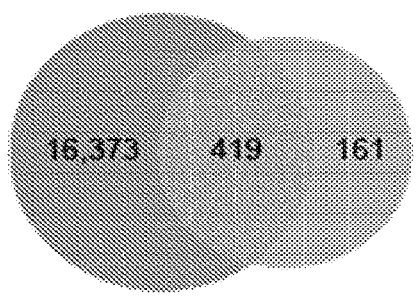
Figure 3D:
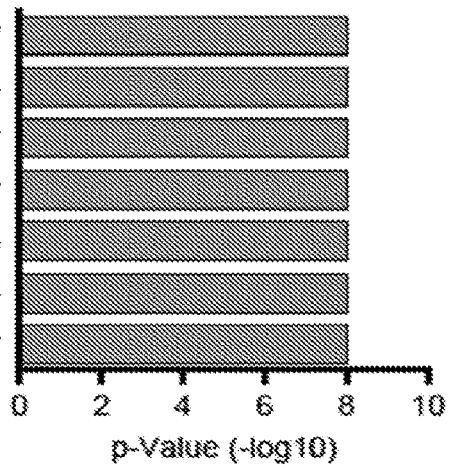
Figure 3E:
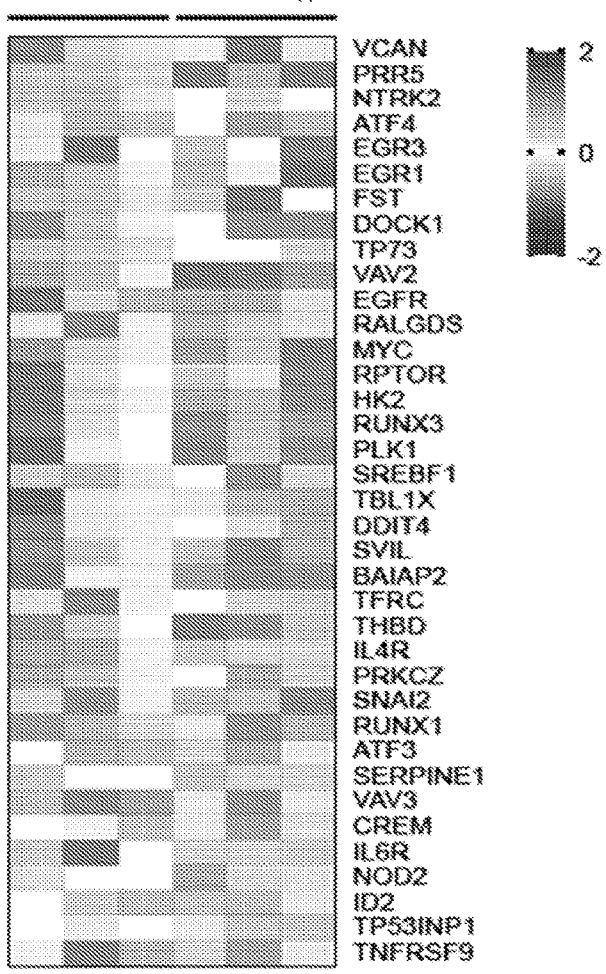
Figure 3G:
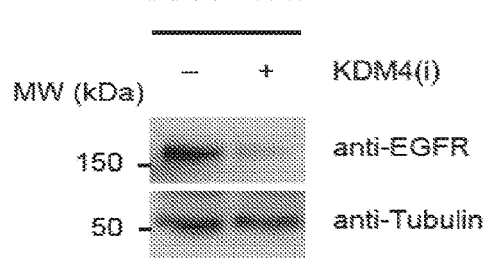
Figure 3H:
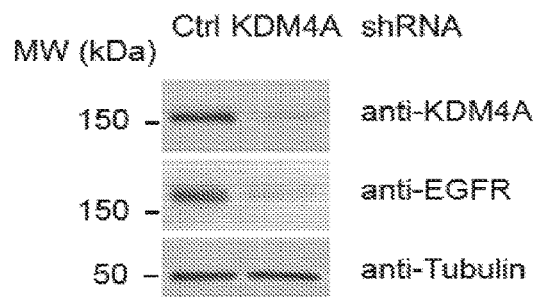
Figure 3F:
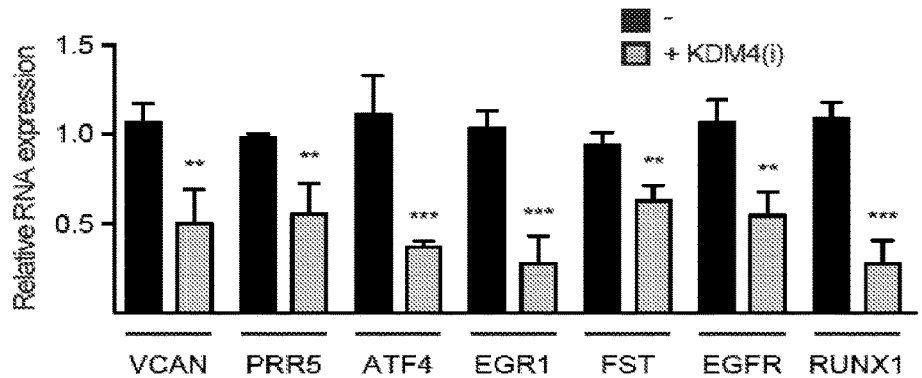
Figure 7A:
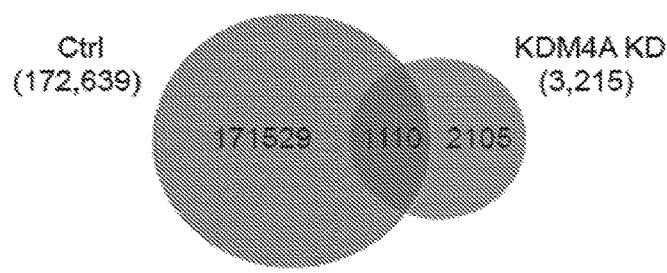
FIG. 7A to FIG. 7K demonstrate that an embodiment of a KDM4(i) targets BCSC2 through EGFR regulation.
Figure 7B:
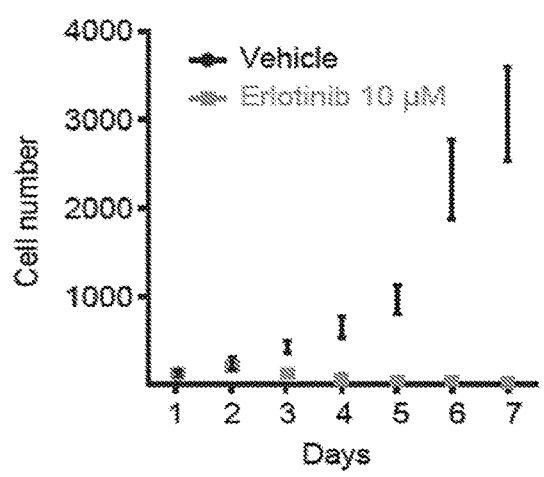
Figure 7C:
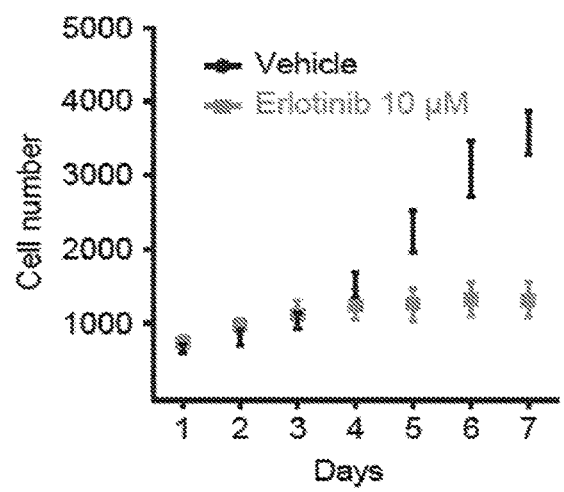
Figure 7D:
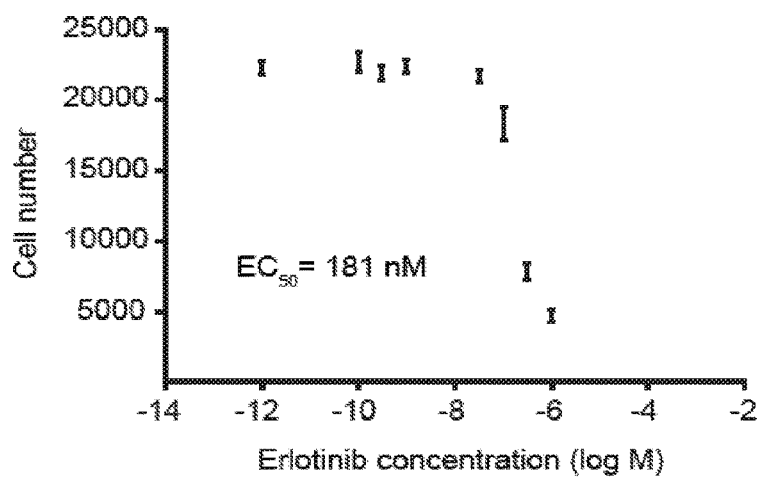
Figure 7E:
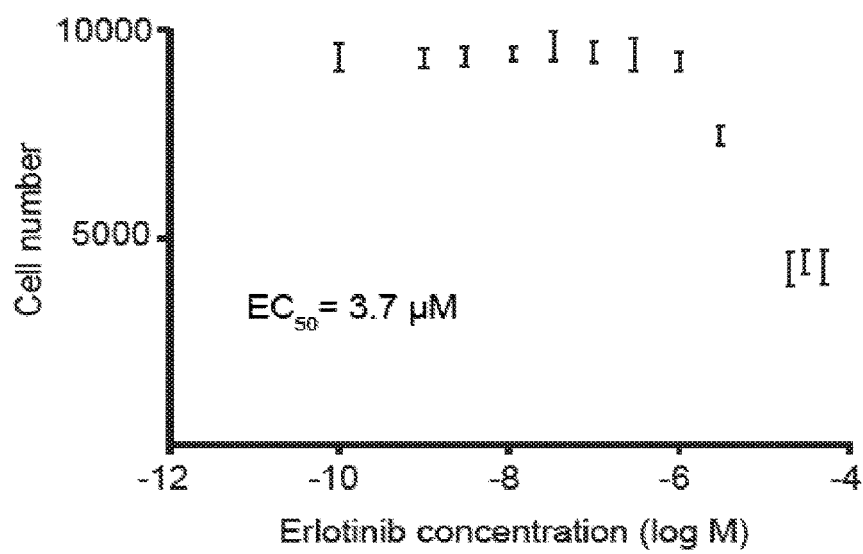

The molecular mechanism of KDM4(i) inhibition was explored further using transcriptome analysis that identified the genes differentially regulated upon KDM4(i) treatment. More specifically, BCSC1 cells cultivated in the presence and absence of KDM4(i) were analyzed by RNA-seq, which indicated that upon treatment with a KDM4(i), a total of 580 genes were differentially regulated. Among them, 254 genes were upregulated and 326 genes were down-regulated. FIG. 3A. Whether these genes are direct KDM4A targets was analyzed by ChIP-seq in BCSC1 cells with an anti-KDM4A antibody. The analyses, shown in FIG. 3B, identified 172, 692 high-confidence KDM4A peaks. Only 3215 (1.8%) KDM4A locations were observed in BCSC2 cells treated with siRNA against KDM4A, thus confirming specificity of the KDM4A antibody. FIG. 7A. This finding prompted the characterization of the KDM4A cistrome intersection with the KDM4(i) transcriptome. Among the 580 genes differentially regulated upon treatment with KDM4(i), KDM4A was present at the promoter of 419 genes (72%). FIG. 3C. Pathway analysis for these genes revealed an 'EGF receptor signaling pathway' among the top scoring pathways. FIG. 3D. Importantly, the top scoring pathways share a common gene signature of 37 direct KDM4A target genes that are differentially regulated upon treatment with KDM4(i). FIG. 3E. Further, qRT-PCR analysis verified that treatment with KDM4(i) genes reduced the expression levels of genes, such as VCAN, PRR5, ATF4, EGR1, FST, RUNX1, and, importantly, EGFR. FIG. 3F.

Figure 7F:
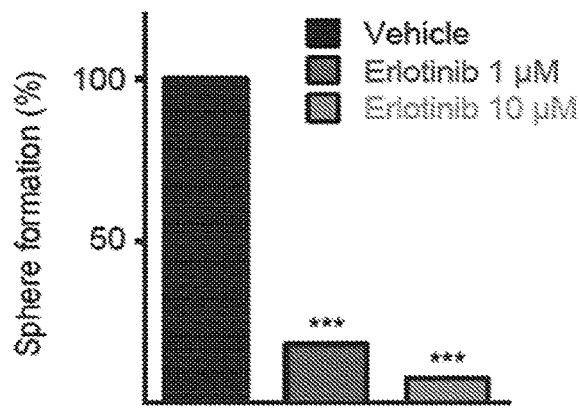
Figure 7G:
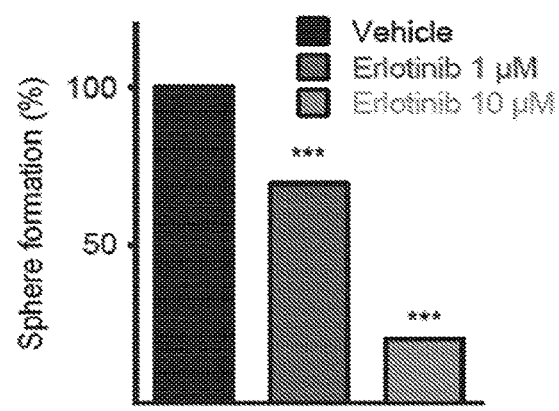
Figure 7H:
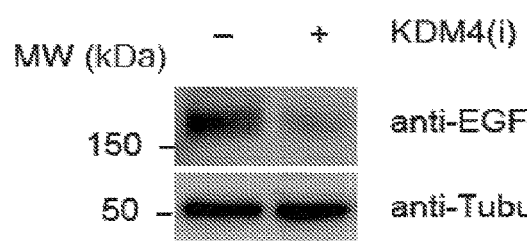
Figure 7I:
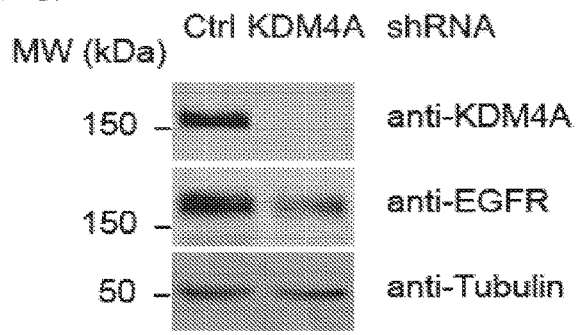

EGFR is an emerging therapeutic target associated with poor clinical outcome of triple-negative breast cancer. Hsu & Hung, 2016. To unravel the importance of EGFR signaling in growth of BCSC cells, BCSC1 and BCSC2 cells were treated with a specific EGFR inhibitor: erlotinib. Treatment with erlotinib blocked proliferation of both BCSC1 and BCSC2 cells. FIG. 7B-FIG. 7E. Furthermore, the 3D-colony forming capacity of both BCSC1 and BCSC2 cells was dramatically reduced upon treatment with erlotinib. FIG. 7F, FIG. 7G. Together, these data demonstrated that EGFR controls growth of BCSC cells. Importantly, as shown by western blot analysis, the protein levels of EGFR were dramatically reduced in both BCSC1 and BCSC2 cells upon treatment with KDM4(i). FIG. 3G; FIG. 7I. Because EGFR is a direct KDM4A target, whether knockdown of KDM4A affects EGFR protein levels was determined. As shown, adenoviral-mediated knockdown of KDM4A lead to reduced levels of EGFR in both BCSC1 and BCSC2 cells. FIG. 3H; FIG. 7I. These data indicate that in BCSCs, KDM4(i) inhibition of KDM4A blocks EGFR expression.

Figure 3I:
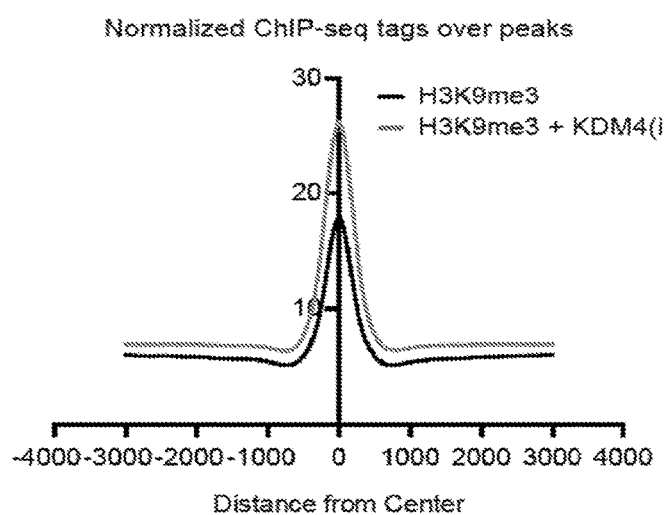
Figure 3J:
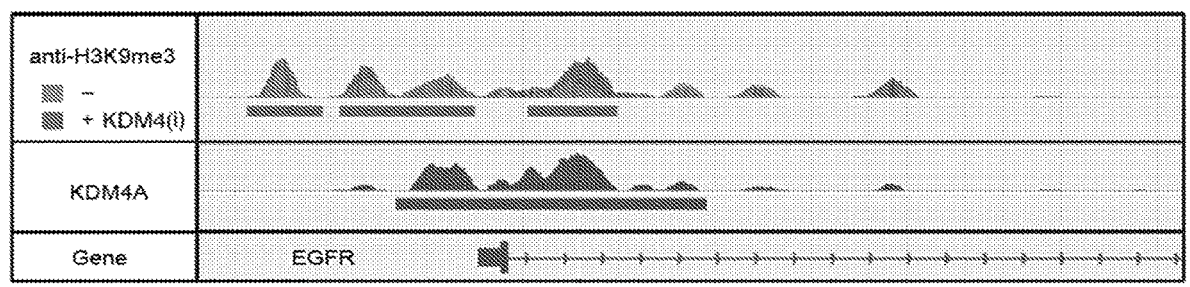
Figure 7J:
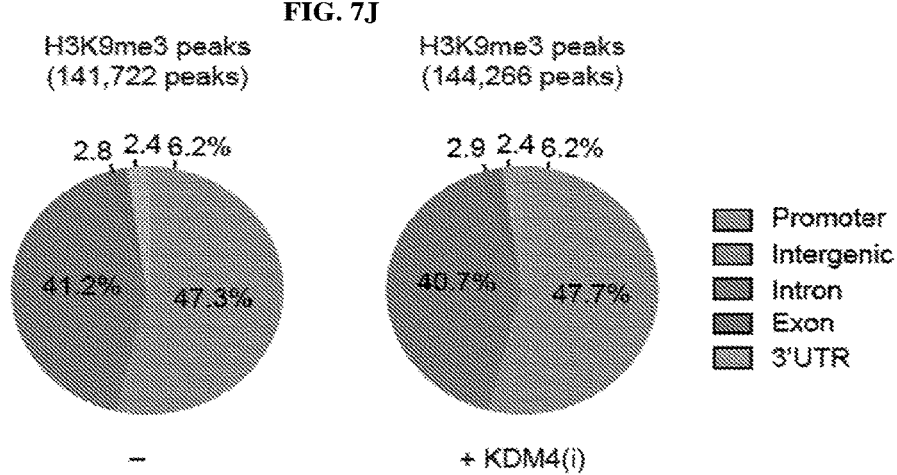
Figure 7K:
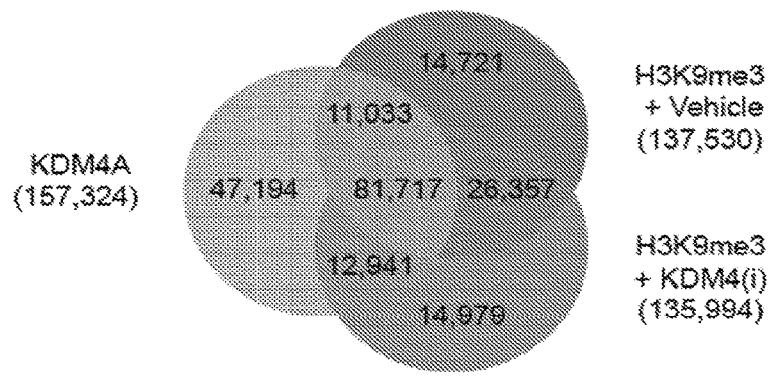

Because KDM4A is a demethylase of the repressive H3K9me3 mark, upon inactivation of KDM4A by KDM4(i) an increase in H3K9me3 might be observed. A ChIP-seq assay using an anti-H3K9me3 antibody identified 141,722 high-confidence H3K9me3 peaks in untreated cells and 144,266 peaks in KDM4(i)-treated cells. FIG. 7J. Overlap of KDM4A locations with H3K9me3 locations in presence and absence of KDM4(i) revealed that 81,717 locations were co-occupied. FIG. 7K. A global increase of the H3K9me3 reads over the KDM4A peaks was observed. FIG. 3I. Similarly, on the EGFR promoter, an increase of the repressive H3K9me3 mark over the KDM4A peak was observed subsequent to inactivation by KDM4(i). FIG. 3J. These data correlate with the transcriptional repression that is observed upon KDM4(i) treatment. FIG. 3F. In summary, treating BCSCs with KDM4(i) targets EGFR, a main driver of therapy-resistant triple-negative breast tumor cells, by inhibiting KDM4A demethylase activity.

Figure 4A:
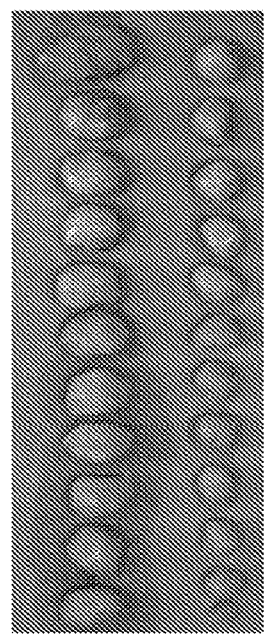
FIG. 4A to FIG. 4F show that KDM4(i) inhibits xenograft tumor growth from BCSC1 cells. Mice bearing BCSC1 xenograft tumors were treated for 21 consecutive days with either vehicle or a KDM4(i).
Figure 4B:
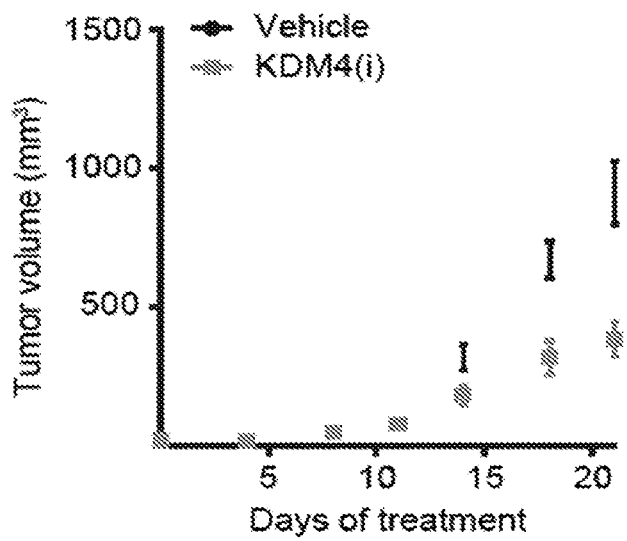
Figure 4C:
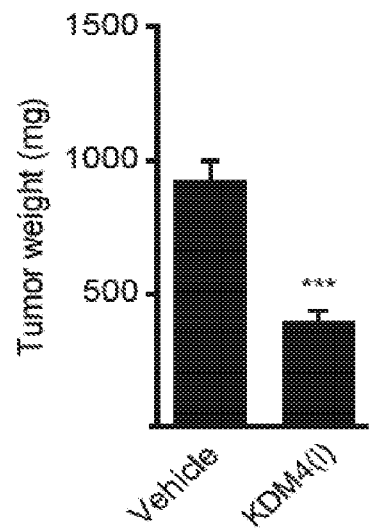
Figure 4D:
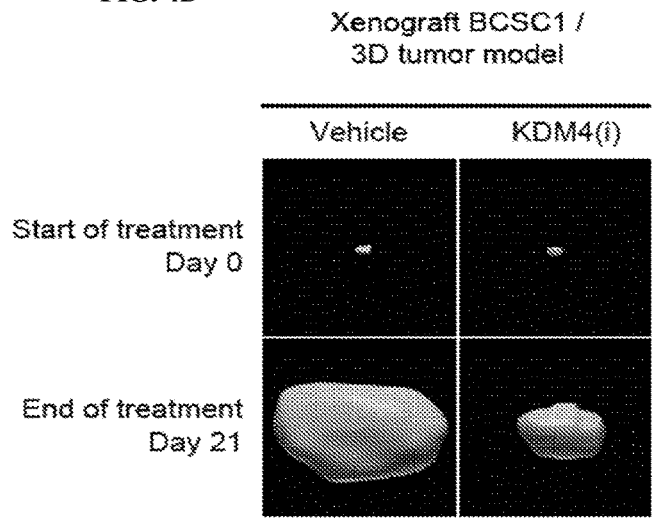
Figure 4E:
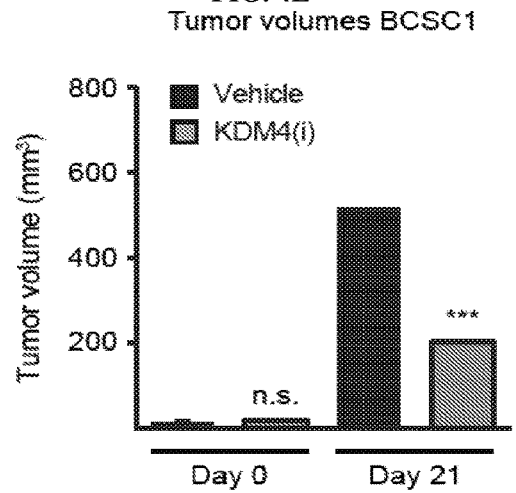
Figure 4F:
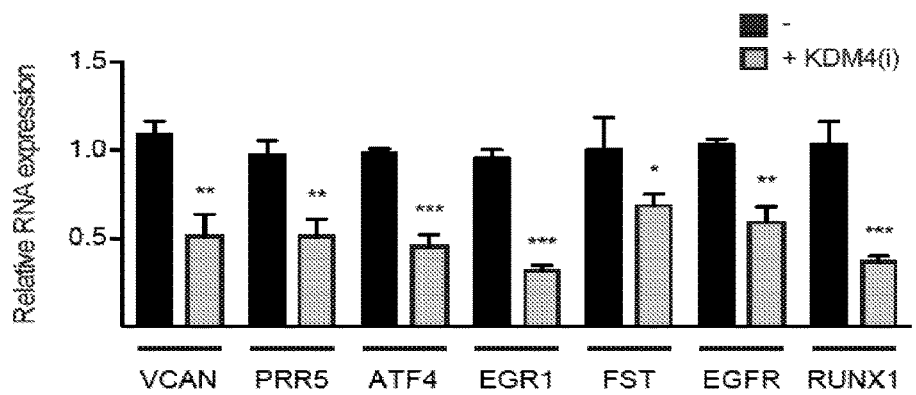
Figure 8A:
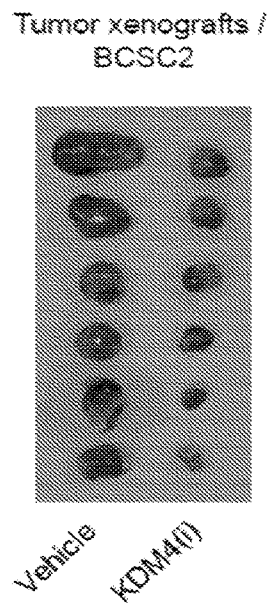
FIG. 8A to FIG. 8G demonstrate that a KDM4(i) inhibits xenograft tumor growth in mice bearing BCSC2 xenograft tumors treated for 21 consecutive days with either vehicle or a KDM4(i).
Figure 8B:
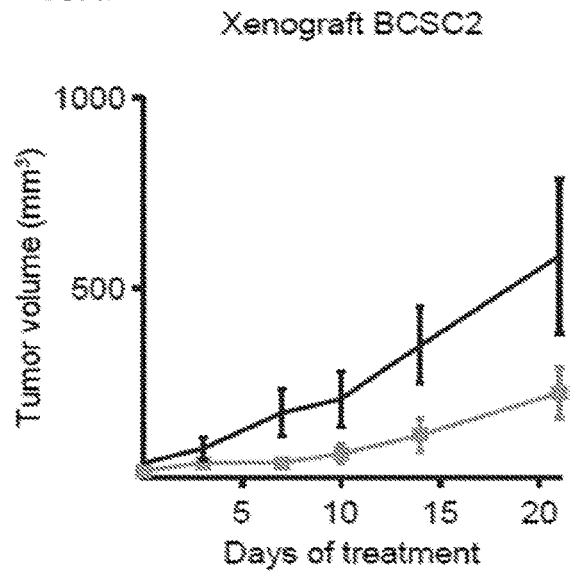
Figure 8C:
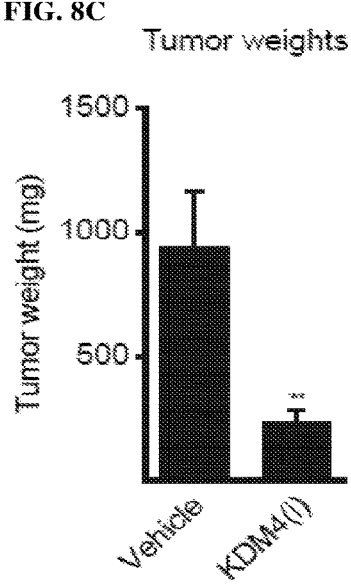
Figure 8D:
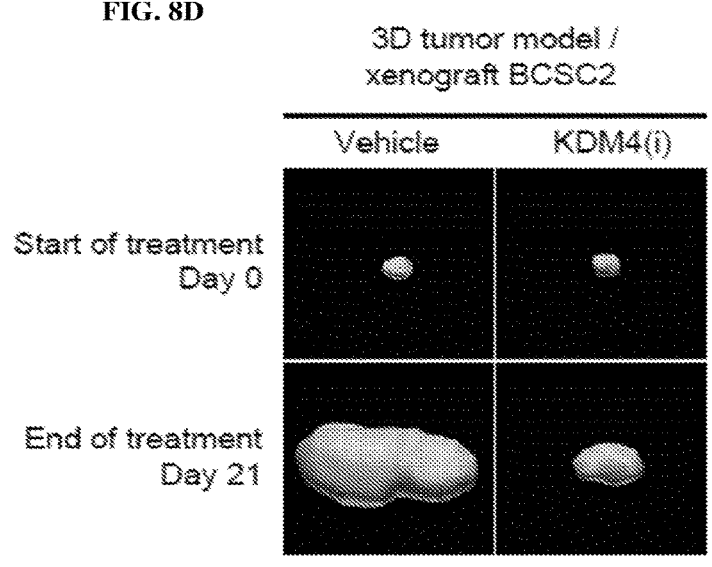
Figure 8E:
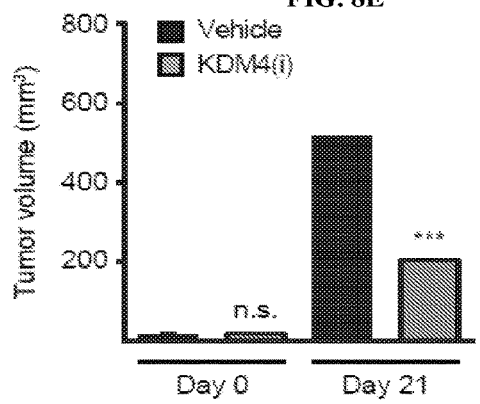
Figure 8F:
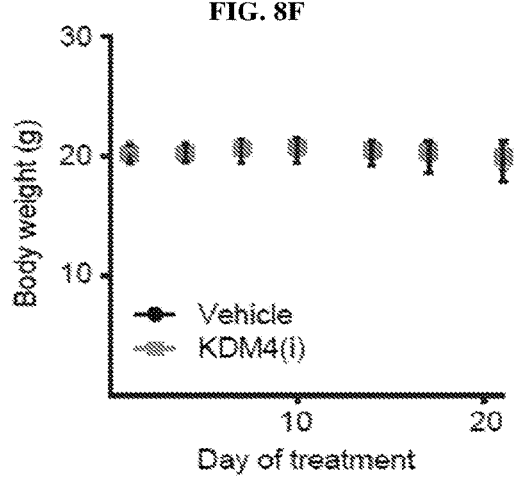
Figure 8G:
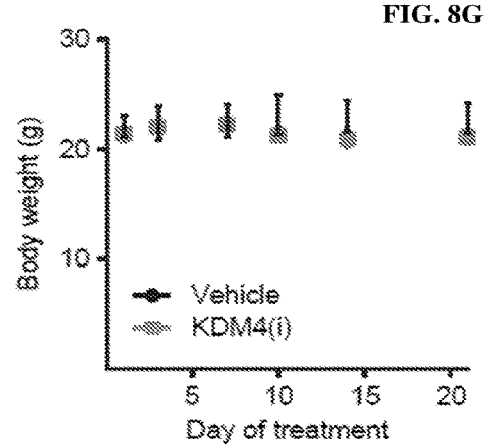

Additionally, the impact of KDM4(i) on the growth of BCSC1 and BCSC2 tumor xenografts was studied in immunocompromised NOD/SCID mice carrying budding xenograft tumors following 21 days of treatment with KDM4(i). Treatment with KDM4(i) strongly affected tumor growth and final tumor weight of both BCSC1 and BCSC2 xenografts. FIG. 4A-FIG. 4E; FIG. 8A-FIG. 8E. Importantly, treatment with KDM4(i) never affected the total weight of the mice. FIG. 8F, FIG. 8G. Furthermore, treatment of KDM4(i) affected expression of KDM4A target genes in a similar way as observed in cell culture. FIG. 3F. As shown in FIG. 4F, expression of PRR5, ATF4, EGR1, FST, RUNX1, and EGFR, was affected in BCSC1 xenograft tumors of mice treated with KDM4(i). Taken together, treatment with KDM4(i) blocked tumor growth in the BCSC xenograft model.

In summary, the present embodiments establish a novel culture method that allows for isolation and growth of BCSC lines isolated from individual patient tumors after neoadjuvant chemotherapy. Limiting dilution BCSC xenografts faithfully recapitulate parental patient tumors and BCSCs, BCSC xenografts, and the parental tumors share a highly similar transcriptome profile. Therefore, these models are ideal tools for identification and validation of novel therapeutics.

At least one embodiment establishes a method of screening KDM4 inhibitory activity of a KDM4 inhibitory compound in primary breast cancer stem cells comprising the steps of: (1) obtaining breast tumor material; (2) mechanically dissociating the tumor material; (3) treating the tumor material with at least one DNAse, dispase, or thermolysin; (4) diluting the tumor material in buffer; (5) straining the dissociated treated tumor material to obtain tumor cells; (6)

optionally removing red blood cells with lysis buffer; (7) washing the tumor cells in cell culture media; (8) culturing the washed tumor cells in a stem cell enrichment medium comprising a 1:1 ratio of (a) liquid medium and (b) solid matrix, wherein (a) comprises: mammary epithelial basal medium, serum-free supplement, amphotericin, penicillin-streptomycin, epidermal growth factor, fibroblast growth factor, heparin, gentamicin, and Rho kinase inhibitor; (9) incubating the stem cell enrichment culture at 37° C. under low oxygen until the enriched cells proliferate as spheres; (10) expanding the population of cells that proliferated as spheres in an expansion medium comprising (a) and (b) at a 98:2 ratio, to obtain expanded breast cancer stem cells; (11) reculturing expanded breast cancer stem cells in stem cell enrichment medium comprising a KDM4 inhibitor, wherein the KDM4 inhibitor inhibits the ability of breast cancer stem cells to proliferate as spheres in comparison with breast cancer stem cells recultured without a KDM inhibitor.

Further, the present embodiments not only support the pursuit of KDM4 family members as novel therapeutic targets, but provide at least one novel KDM4 inhibitor with unique preclinical characteristics that blocks proliferation of BCSCs in vitro and in vivo by targeting the EGFR pathway. Thus, modulation of KDM4 activity is a promising therapeutic strategy for the treatment of cancers such as, in particular, chemotherapy-resistant breast cancer. Compound I, 3-([[(1R)-6-[methyl(phenyl)amino]-1,2,3,4-tetrahydronaphthalen-1-yl]methyl]amino)pyridine-4-carboxylic acid, is a specific example of a substituted pyridine derivative compound comprising a disubstituted pyridine ring bearing at the 4-position a carboxylic acid, and at the 3-position a substituted amino group. This and related substituted pyridine derivatives are provided in WO 2015/200709.

At least one embodiment provides a KDM4(i) compound having the structure of Formula I:

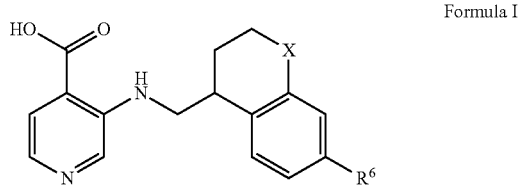

Formula I wherein said compound includes stereoisomers and pharmaceutically acceptable salts thereof,
and wherein
X is O or $CH_2$, and
$R^6$ is $N(R^1)(R^2)$ or $O(R^2)$, in which
$R^1$ is H or $C_1$-$C_6$ alkyl, and
$R^2$ is optionally substituted aryl, heteroaryl, cyclyl, or heterocyclyl.

In at least one embodiment, the compound is the R stereoisomer.

In at least one embodiment, $R^1$ is methyl or ethyl.

In at least one embodiment, $R^2$ is heteroaryl such as pyridine.

In at least one embodiment, $R^2$ is substituted heteroaryl, such as pyridine substituted with alkyl such as methyl, ethyl, or cyclopropyl.

In at least one embodiment, $R^2$ is aryl such as phenyl.

In at least one embodiment, $R^2$ is substituted aryl, such as phenyl, substituted with halo, such as fluoro or chloro; or substituted with alkyl, such as methyl, propanyl, or cyclopropyl; or substituted with both halo and alkyl, such as fluoro and methyl; or substituted with an amino or N-containing group such as dimethylamino, azetidinyl; or substituted with a alkoxy such as ethoxy, cyclopropylmethoxy, methoxymethyl, difluoromethoxy, or trifluoromethoxy; or substituted with heterocyclyl such as oxanyl.

In at least one embodiment, $R^2$ is an indane moiety such as 2,3dihydro-1H-indenyl.

In at least one embodiment, X is $CH_2$ and $R^1$ is $N(R^1)(R^2)$, in which $R^1$ is methyl, and $R^2$ is phenyl or pyridinyl. In a specific embodiment, KDM4(i) is 3-([[(1R)-6-[methyl(phenyl) amino]-1,2,3,4-tetrahydronaphthalen-1-yl]methyl] amino)pyridine-4-carboxylic acid. In a specific embodiment, the KDM4(i) is 3-([[(1R)-6-[methyl(pyridin-2-yl) amino]-1,2,3,4-tetrahydro-naphthalen-1-yl]methyl]amino) pyridine-4-carboxylic acid.

In at least one embodiment, X is $CH_2$ and $R^6$ is $N(R^1)(R^2)$, in which $R^1$ is methyl, and $R^2$ is phenyl substituted with methyl. In a specific embodiment, the KDM4(i) is 3-([[(1R)-6-[methyl(4-methylphenyl)amino]-1,2,3,4-tetrahydronaphthalen-1-yl]methyl]amino)pyridine-4-carboxylic acid.

In at least one embodiment, X is $CH_2$ and $R^6$ is $N(R^1)(R^2)$, in which $R^1$ is methyl, and $R^2$ is phenyl substituted with dimethylamino. In a specific embodiment, the KDM4(i) is 3-([[(1R)-6-[[4-(dimethylamino)phenyl](methyl)amino]-1,2,3,4-tetrahydronaphthalen-1-yl]methyl] amino)pyridine-4-carboxylic acid.

In at least one embodiment, X is $CH_2$ and $R^6$ is $N(R^1)(R^2)$, in which $R^1$ is methyl, and $R^2$ is phenyl substituted with methoxymethyl, ethoxy, or difluoromethoxy. In a specific embodiment, KDM4(i) is 3-([[(1R)-6-[[4-(methoxymethyl) phenyl](methyl)amino]-1,2,3,4-tetrahydro-naphthalen-1-yl] methyl]amino) pyridine-4-carboxylic acid. In a specific embodiment, KDM4(i) is 3-([[(1R)-6-[[4-(difluoromethoxy)phenyl](methyl)amino]-1,2,3,4-tetrahydronaphthalen-1-yl]-methyl]amino) pyridine-4-carboxylic acid. In a specific embodiment, the KDM4(i) is 3 ([[(1R)-6-[(4-ethoxyphenyl)(methyl)amino]-1,2,3,4-tetrahydronaphthalen-1-yl]methyl]amino) pyridine-4-carboxylic acid.

In at least one embodiment, X is $CH_2$ and $R^6$ is $N(R^1)(R^2)$, in which $R^1$ is methyl, and $R^2$ is pyridinyl substituted with methyl. In a specific embodiment, KDM4(i) is 3-([[(1R)-6-[methyl-[5-methylpyridin-2-yl) amino]-1,2,3,4-tetrahydronaphthalen-1-yl]methyl]amino)pyridine-4-carboxylic acid. In another specific embodiment, KDM4(i) is 3-([[(1R)-6-[methyl[6-methylpyridin-2-yl)amino]-1,2,3,4-tetrahydronaphthalen-1-yl]methyl]amino)pyridine-4-carboxylic acid.

In at least one embodiment, X is O and $R^6$ is $N(R^1)(R^2)$, in which $R^1$ is ethyl, and $R^2$ is phenyl. In a specific embodiment, KDM4(i) is 3-([[(4R)-7-[ethyl(phenyl)amino]-3,4-dihydro-2H-1-benzopyran-4-yl]methyl]amino)pyridine-4-carboxylic acid.

In at least one embodiment, X is O and $R^6$ is $N(R^1)(R^2)$, in which $R^1$ is methyl, and $R^2$ is substituted phenyl. For example, the phenyl is substituted with chloro or fluoro. In a specific embodiment, KDM4(i) is 3-([[(4R)-7-[3-fluorophenylxmethyl)amino]-3,4-dihydro-2H-1-benzopyran-4-yl] methyl]amino)pyridine-4-carboxylic acid. In another specific embodiment, KDM4(i) is 3-([[(4R)-7-[4-fluorophenyl) (methyl)amino]-3,4-dihydro-2H-1-benzopyran-4-yl]-methyl]amino)pyridine-4-carboxylic acid. In another specific embodiment, the KDM4(i) is 3-([[(4R)-7-[4-chlorophenyl)(methyl)amino]-3,4-dihydro-2H-1-benzopyran-4-yl]methyl]amino) pyridine-4-carboxylic acid.

In at least one embodiment, X is O and $R^6$ is $N(R^1)(R^2)$, in which $R^1$ is methyl, and $R^2$ is substituted phenyl. For example, the phenyl is substituted with methyl, ethyl, propyl, or cyclopropyl. In a specific embodiment, the KDM4(i) is 3-([[(4R)-7-[methyl(4-methylphenyl) amino]-3,4-dihydro-2H-1-benzopyran-4-yl]methyl]amino)pyridine-4-carboxylic acid. In a specific embodiment, the KDM4(i) is 3-([[(4R)-7-[methyl(4-ethylphenyl)amino]-3,4-dihydro-2H-1-benzopyran-4-yl]methyl]amino)pyridine-4-carboxylic acid. In a specific embodiment, the KDM4(i) is 3-([[(4R)-7-[methyl[4-propan-2-yl]phenyl]amino]-3,4-dihydro-2H-1-benzopyran-4-yl]methyl]amino)pyridine-4-carboxylic acid.

In at least one embodiment, X is O and $R^6$ is $N(R^1)(R^2)$, in which $R^1$ is methyl, and $R^2$ is pyridinyl substituted with methyl, ethyl, or cyclopropyl. In a specific embodiment, KDM4(i) is 3-([[(4R)-7-[methyl(5-methylpyridin-2-yl)amino]-2,3-dihydro-2H-1-benzopyran-4-yl]methyl]amino)pyridine-4-carboxylic acid. In a specific embodiment, the KDM4(i) is 3-([[(4R)-7-[methyl (5-methylpyridin-2-yl)amino]-3,4-dihydro-2H-1-benzopyran-4-yl]methyl]amino)pyridine-4-carboxylic acid. In a specific embodiment, the KDM4(i) is 3-([[(4R)-7-[(5-cyclopropylpyridin-2-yl)(methyl)amino]-3,4-dihydro-2H-1-benzopyran-4-yl]methyl]amino) pyridine-4-carboxylic acid. In another specific embodiment, the KDM4(i) is 3-([[(4R)-7-[(4-cyclopropylphenyl)(methyl)amino]-3,4-dihydro-2H-1-benzopyran-4-yl]methyl]amino)pyridine-4-carboxylic acid.

In at least one embodiment, X is O and $R^6$ is $N(R^1)(R^2)$, in which $R^1$ is methyl, and $R^2$ is substituted phenyl. For example, the phenyl is substituted with trifluoroethyl. In a specific embodiment, the KDM4(i) is 3-(([(1R)-6-{[4-(1H-imidazol-1-yl)phenyl](methyl)amino}-1,2,3,4-tetrahydronaphthalen-1-yl]methyl)amino)pyridine-4-carboxylic acid.

In at least one embodiment, X is O and $R^6$ is $N(R^1)(R^2)$, in which $R^1$ is methyl, and $R^2$ is substituted phenyl. For example, phenyl is substituted with trifluoromethoxy, difluoroethoxy, or cyclopropylmethoxy. In a specific embodiment, KDM4(i) is 3-([[(1R)-6-[[4-(tri-fluoromethoxy) phenyl](methyl)amino 3,4-dihydro-2H-1-benzopyran-4-yl] methyl] amino)pyridine-4-carboxylic acid. In a specific embodiment, KDM4(i) is 3-([[(4R)-7-[[4-(difluoromethoxy)phenyl] (methyl)-amino]-3,4-dihydro-2H-1-benzopyran-4-yl]methyl]amino)pyridine-4-carboxylic acid. In a specific embodiment, KDM4(i) is 3-({[(1R)-6-{[4-(cyclo-propylmethoxy)phenyl](methyl)amino}-1,2,3,4-tetrahydronaphthalen-1-yl]methyl}amino)pyridine-4-carboxylic acid.

In at least one embodiment, X is O and $R^6$ is $N(R^1)(R^2)$, in which $R^1$ is methyl, and $R^2$ is substituted phenyl, such as azetidinyl substituted phenyl. In a specific embodiment, the KDM4(i) is 3-([[(4R)-7-[[4-azetidin-1-yl)phenyl](methyl)amino]-3,4-dihydro-2H-1-benzopyran-4-yl]methyl]amino)pyridine-4-carboxylic acid.

In at least one embodiment, X is O and $R^6$ is $N(R^1)(R^2)$, in which $R^1$ is methyl, and $R^2$ is substituted phenyl. For example, the phenyl is substituted with oxanyl. In a specific embodiment, the KDM4(i) is 3-(([(4R)-7-{methyl[4-(oxan-4-yl)phenyl]amino}-3,4-dihydro-2H-1-benzopyran-4-yl]methyl)amino)pyridine-4-carboxylic acid.

In at least one embodiment, X is O and $R^6$ is $N(R^1)(R^2)$, in which $R^1$ is methyl, and $R^2$ is 2,3-dihydro-1H-indenyl. In a specific embodiment, the KDM4(i) is 3-([[(4R)-7-[2,3-dihydro-1H-inden-5-yl)(methyl)amino]-3,4-dihydro-2H-1-benzopyran-4-yl]methyl]amino)pyridine-4-carboxylic acid.

In at least one embodiment, X is $CH_2$ and $R^6$ is $O(R^2)$, in which $R^2$ is phenyl substituted with fluoro and methyl. In a specific embodiment, the KDM4(i) is 3-([[(1R)-6-[2-fluoro-4-methyl-phenoxy)-1,2,3,4-tetrahydronaphthalen-1-yl] methyl]amino)pyridine-4-carboxylic acid.

The substituted pyridine derivative compounds are prepared by the general synthetic routes described below in Schemes 1-3.

Scheme 1

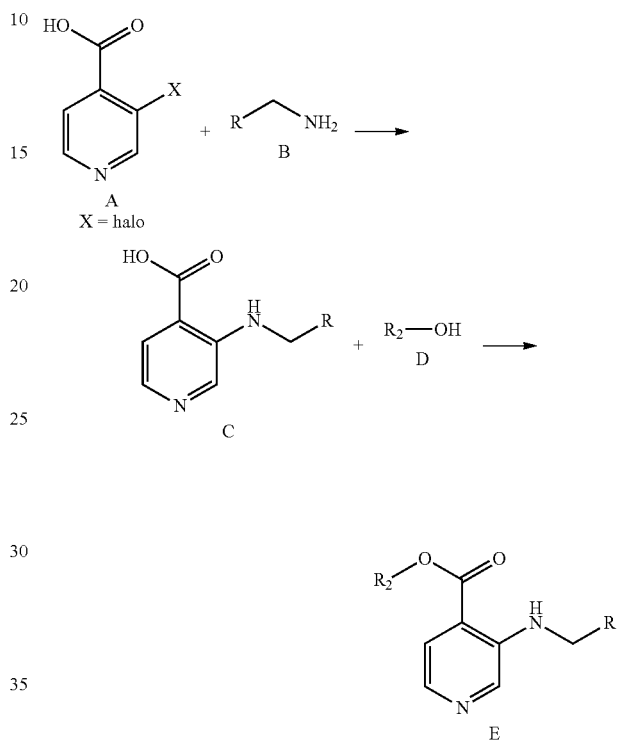

Referring to Scheme 1, above, compound A and an amine compound B are mixed and treated under a variety of conditions to form compound C. For example, the mixture of compound A and an amine B can be subjected to microwave irradiation in an appropriate solvent, at temperatures ranging from 120° C. to 172° C. The ester compound E can be prepared from compound C and an alcohol D using a coupling reagent, such as HATU, in the presence of a base.

Schrme 2

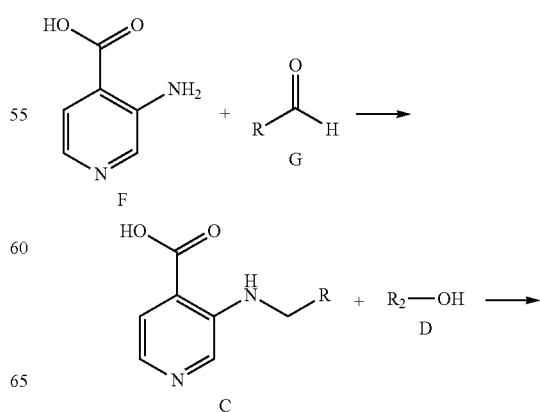

-continued

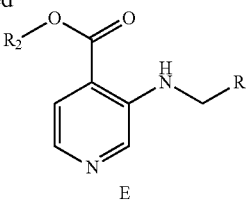

Referring to Scheme 2, above, compound F and an aldehyde compound G are mixed and treated under reductive amination conditions to form compound C. The ester compound E can be prepared from compound C and an alcohol D using a coupling reagent, such as HATU, in the presence of a base.

Scheme 3

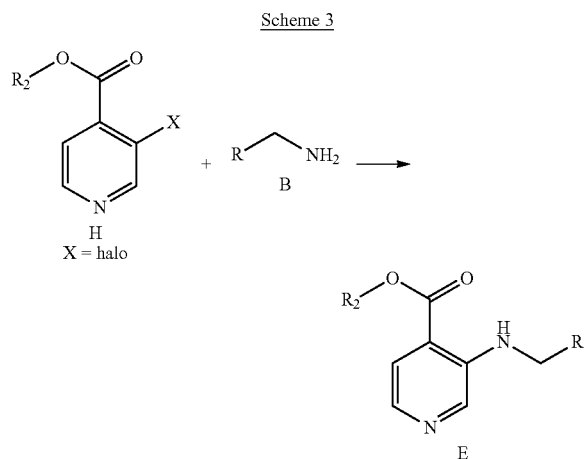

Referring to Scheme 3, above, compound H and an amine compound B are mixed and treated under a variety of conditions to form compound E. For example, the mixture of compound H and an amine B can be subjected to a Buchwald reaction under microwave irradiation in an appropriate solvent, at temperatures ranging from 100° C. to 120° C. The ester compound E can be hydrolyzed to give compound C, using basic conditions such as 1N aqueous NaOH.

The KGM4(i) compounds described herein may be produced or provided as a pharmaceutically acceptable salt. A pharmaceutically acceptable salt of any one of the substituted pyridine derivative KGM4(i) compounds is intended to encompass any and all pharmaceutically suitable salt forms, including pharmaceutically acceptable salts such as acid and base addition salts, as are well-known in the art.

Typically, the substituted pyridine derivative compound exemplified by Compound I is substantially pure, in that it contains less than about 5%, or less than about 1%, or less than about 0.1%, of other organic small molecules, such as unreacted intermediates or synthesis by-products that are created, for example, in one or more of the steps of synthesis.

The KGM4(i) compounds described herein typically contain one or more asymmetric centers and thus give rise to enantiomers, diastereomers, and other stereoisomeric forms that are defined, in terms of absolute stereochemistry, as (R) or (S). Likewise, all possible isomers, as well as their racemic and optically pure forms, and all tautomeric forms are also intended to be included. The term "positional isomer" refers to structural isomers around a central ring, such as ortho-, meta- and para-isomers around a benzene ring. A "stereoisomer" refers to a compound made up of the same atoms bonded by the same bonds but having different three-dimensional structures, which are not interchangeable. Stereoisomers can be separated by means and methods known in the art, such as chiral HPLC. Hence, the KGM4(i) compounds provided herein encompass various stereoisomers and mixtures thereof and includes "enantiomers," which refers to two stereoisomers whose molecular structures are non-superimposable mirror images of one another. Additionally, a "tautomer" refers to a molecule wherein a proton shift from one atom of a molecule to another atom of the same molecule is possible. The KGM4(i) compounds presented herein may, in certain embodiments, exist as tautomers. In circumstances where tautomerization is possible, a chemical equilibrium of the tautomers may exist, but the exact ratio of the tautomers depends on factors such as physical state, temperature, solvent, and pH.

The KGM4(i) described herein may be produced, obtained, or formulated as a "prodrug." Prodrugs are compounds that may be inactive when administered, but are converted under physiological conditions or by hydrolysis (i.e., in vivo) to a biologically active compound; thus prodrugs are pharmaceutically acceptable precursors of a biologically active compound. Prodrug compounds may offer advantages of solubility, tissue compatibility, or delayed release in a subject. Prodrugs also refer to use of covalently bonded carriers that release the active compound in vivo when such prodrug is administered to the subject. Prodrugs of an active compound may be prepared by modifying functional groups present in the active compound in such a way that the modifications are cleaved, either in routine manipulation or in vivo, to the parent active compound. For example, prodrugs include compounds in which a hydroxy, amino, or mercapto group is bonded to any group that, when the prodrug of the active compound is administered to a mammalian subject, cleaves to form a free hydroxy, free amino or free mercapto group, respectively. Examples of prodrugs include acetate, formate, and benzoate derivatives of alcohol or amine functional groups in the active compounds. See, e.g., Bundgard, DESIGN OF PRODRUGS, at 7-9, 21-24 (Elsevier, Amsterdam, 1985); Higuchi et al., Pro drugs as Novel Delivery Systems, 14 A.C.S. Symposium Series; BIOREVERSIBLE CARRIERS IN DRUG DESIGN (Edward B. Roche (Ed.), Am. Pharm. Assoc. & Pergamon Press, 1987).

Accordingly, and as used herein, a reference to KGM4(i), KGM4(i) compound, or Compound I, and the like, includes within that reference a pharmaceutically acceptable salt, hydrate, solvate, N-oxide, stereoisomer, tautomer, or prodrug thereof.

In certain embodiments, the substituted pyridine derivative KGM4(i) compound may be administered as a pure compound. In other embodiments and in general, the KGM4(i) compound is combined with a pharmaceutically acceptable carrier (also referred to herein as a pharmaceutically suitable (or acceptable) excipient, physiologically suitable (or acceptable) excipient, or physiologically suitable (or acceptable) carrier) selected on the basis of a chosen route of administration and standard pharmaceutical practice. See, e.g., REMINGTON: SCIENCE & PRACTICE OF PHARMACY 21$^{st}$ Ed. (Gennaro (Ed.) Mack Pub. Co., Easton, P A, 2005).

Accordingly, provided herein is a pharmaceutical composition comprising at least one substituted pyridine derivative KGM4(i) compound, or a stereoisomer, pharmaceutically acceptable salt, hydrate, solvate, tautomer, or N-oxide thereof, together with one or more pharmaceutically acceptable carriers. The carrier(s) (or excipient(s)) is acceptable or suitable if the carrier is compatible with the other ingredients of the composition and not deleterious to the recipient subject. One embodiment provides a pharmaceutical composition comprising Compound I.

References to "pharmaceutical agent," "therapeutic agent," "pharmaceutically active," "pharmaceutical," "drug," "medicament," "active agent," "active drug" "active pharmaceutical ingredient," and the like, refer in a general sense to substances useful in the medical and scientific arts, including, for example, drugs, biologics, diagnostic agents (e.g, dyes or contrast agents) or other substances used for therapeutic, diagnostic, or preventative (e.g., vaccines), or research purposes. Example pharmaceutical agents include small molecules, chemotherapeutic agents, contrast agents, anesthetics, interfering RNAs, gene vectors, biologics, immunogens, antigens, interferons, polyclonal antibody preparations, monoclonal antibodies, insulins, or combinations of any of these. As noted, a pharmaceutical composition or pharmaceutical formulation may comprise one or more active therapeutic agents, or a combination of active and diagnostic agents, etc., typically further comprising a suitable excipient(s).

Further, a pharmaceutical composition as disclosed here may be formulated to be compatible with its intended route of administration. Examples of routes of administration include parenteral, e.g., intravenous, intradermal, subcutaneous, oral (e.g., inhalation), transdermal (i.e., topical), transmucosal, and rectal administration. Solutions or suspensions used for parenteral, intradermal, or subcutaneous application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfite; chelating agents such as ethylenediaminetetraacetic acid (EDTA); buffers such as acetates, citrates or phosphates, and agents for the adjustment of tonicity such as sodium chloride or dextrose. The pH can be adjusted with acids or bases, such as hydrochloric acid or sodium hydroxide. The parenteral preparation can be enclosed in ampoules, disposable syringes or multiple dose vials made of glass or plastic.

Pharmaceutical compositions suitable for injectable use include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, N.J., US) or phosphate buffered saline (PBS). In all cases, the composition must be sterile and should be fluid to the extent that easy syringeability exists. It must be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as manitol, sorbitol, sodium chloride in the composition. Prolonged absorption of the injectable compositions can be brought about by including in the composition an agent which delays absorption, for example, aluminum monostearate and gelatin.

Sterile injectable solutions can be prepared by incorporating the active compound in the required amount in an appropriate solvent with one or a combination of ingredients enumerated above, as required, followed by filtered sterilization. Generally, dispersions are prepared by incorporating the active compound into a sterile vehicle that contains a basic dispersion medium and the required other ingredients from those enumerated above. In the case of sterile powders for the preparation of sterile injectable solutions, methods of preparation are vacuum drying and freeze-drying that yields a powder of the active ingredient plus any additional desired ingredient from a previously sterile-filtered solution thereof.

For administration by inhalation, the compounds are delivered in the form of an aerosol spray from pressured container or dispenser which contains a suitable propellant, e.g., a gas such as carbon dioxide, or a nebulizer.

Systemic administration can also be by transmucosal or transdermal means. For transmucosal or transdermal administration, penetrants appropriate to the barrier to be permeated are used in the formulation. Such penetrants are generally known in the art, and include, for example, for transmucosal administration, detergents, bile salts, and fusidic acid derivatives. Transmucosal administration can be accomplished through the use of nasal sprays or suppositories. For transdermal administration, the active compounds are formulated into ointments, salves, gels, or creams as generally known in the art. The compounds can also be prepared in the form of suppositories (e.g., with conventional suppository bases such as cocoa butter and other glycerides) or retention enemas for rectal delivery.

In this regard, the KDM4(i) Compound I was effectively administered via oral administration in the Examples described herein. Oral compositions generally include an inert diluent or an edible carrier. They can be enclosed in gelatin capsules or compressed into tablets. For the purpose of oral therapeutic administration, the active compound can be incorporated with excipients and used in the form of tablets, troches, or capsules. Oral compositions can also be prepared using a fluid carrier for use as a mouthwash, wherein the compound in the fluid carrier is applied orally and swished and expectorated or swallowed. Pharmaceutically compatible binding agents, and/or adjuvant materials can be included as part of the composition. The tablets, pills, capsules, troches, and the like, can contain any of the following ingredients or compounds of a similar nature: a binder such as microcrystalline cellulose, tragacanth gum, or gelatin; an excipient such as starch or lactose; a disintegrating agent such as alginic acid, PRIMOJEL® (sodium starch glycolate, DFE pharma), or corn starch; a lubricant such as magnesium stearate, calcium stearate, glyceryl palmitostearate, or glyceryl behenate; a glidant such as colloidal silicon dioxide; a sweetening agent such as sucrose or saccharin; or a flavoring agent such as peppermint, methyl salicylate, or orange flavoring. Therefore, an example pharmaceutical composition can be formulated in suitable oral dosage forms include, for example, tablets, pills, sachets, or capsules of hard or soft gelatin, methylcellulose or of another suitable material easily dissolved in the digestive tract. In some embodiments, suitable nontoxic solid carriers are used which include, for example, pharmaceutical grades of mannitol, lactose, starch, magnesium stearate, sodium saccharin, talcum, cellulose, glucose, sucrose, magnesium carbonate, and the like. See, e.g., REMINGTON, 2005.

For example, a tablet can be prepared by mixing 48% by weigh of Compound I, 45% by weight of microcrystalline cellulose, 5% by weight of low-substituted hydroxypropyl cellulose, and 2% by weight of magnesium stearate. Tablets can be prepared by direct compression. The total weight of this example of compressed tablets is maintained at 250-500 mg. Oral doses may typically range from about 1.0 mg to about 1000 mg, one to four times, or more, per day.

In one embodiment, the KDM4(i) compounds are prepared with carriers that will protect the compound against rapid elimination from the body, such as sustained/controlled release formulations, including implants and microencapsulated delivery systems. Biodegradable, biocompatible polymers can be used, such as ethylene vinyl acetate, polyanhydrides, polyglycolic acid, collagen, polyorthoesters, and polylactic acid. Methods for preparation of such formulations will be apparent to those skilled in the art. For example, the active ingredients can be entrapped in microcapsules prepared, for example, by coacervation techniques or by interfacial polymerization, for example, hydroxymethylcellulose or gelatin-microcapsules and poly-(methylmethacrylate) microcapsules, respectively, in colloidal drug delivery systems (for example, liposomes, albumin microspheres, microemulsions, nano-particles, and nanocapsules) or in macroemulsions.

Sustained-release preparations can be prepared, and suitable examples of sustained-release preparations include semipermeable matrices of solid hydrophobic polymers containing the antibody, which matrices are in the form of shaped articles, e.g., films, or microcapsules. Examples of sustained-release matrices include polyesters, hydrogels (for example, poly(2-hydroxyethyl-methacrylate), or poly(vinyl-alcohol)), polylactides (U.S. Pat. No. 3,773,919), copolymers of L-glutamic acid and γ ethyl-L-glutamate, non-degradable ethylene-vinyl acetate, degradable lactic acid-glycolic acid copolymers such as the LUPRON DEPOT® (injectable microspheres composed of lactic acid-glycolic acid copolymer and leuprolide acetate), and poly-D-(−)-3-hydroxybutyric acid. While polymers such as ethylene-vinyl acetate and lactic acid-glycolic acid enable release of molecules for over 100 days, certain hydrogels release proteins for shorter time periods. Such materials can also be obtained commercially (e.g., Alza Corp.; Nova Pharm., Inc.). Liposomal suspensions (including liposomes targeted to infected cells with monoclonal antibodies) can also be used as pharmaceutically acceptable carriers. These preparations can be prepared according to methods known to those skilled in the art.

Oral or parenteral compositions may be formulated in dosage unit form for ease of administration and uniformity of dosage. Dosage unit form as used herein refers to physically discrete units suited as unitary dosages for the subject to be treated; each unit containing a predetermined quantity of active compound calculated to produce the desired therapeutic effect in association with the required pharmaceutical carrier. The specification for the dosage unit forms disclosed here are dictated by and directly dependent on the unique characteristics of the active compound and the particular therapeutic effect to be achieved, and the limitations inherent in the art of compounding such an active compound for the treatment of individuals.

The pharmaceutical compositions or dosage units can be included in a container, pack, or dispenser together with instructions for administration.

The formulation can also contain more than one active compound as necessary for the particular indication being treated, preferably those with complementary activities that do not adversely affect each other. Alternatively, or in addition, the composition can comprise an agent that enhances its function, such as, for example, an immunostimulatory agent, chemotherapeutic agent, cytokine, antibody, or growth-inhibitory agent. Such molecules are suitably present in combination in amounts that are effective for the purpose intended.

A "pharmaceutical formulation," "formulation," or "pharmaceutical composition" refers to a drug product that includes at least one active agent and may further include at least one pharmaceutically acceptable excipient, carrier, buffer, stabilizer, or other material well-known to those skilled in the art. For example, a typical injectable pharmaceutical formulation includes a parenterally acceptable aqueous solution which is pyrogen-free and has suitable pH, isotonicity, and stability. Pharmaceutical compositions can have diagnostic, therapeutic, or research utility in various species, such as for example in human patients or subjects. In at least one embodiment, a pharmaceutical composition comprises a bromodomain inhibitor and a chemotherapeutic agent such as temozolomide, protein-bound paclitaxel, or romidepsin. For example, a bromodomain inhibitor may be 4-[2-(cyclopropylmethylamino)-5-methylsulfonylphenyl]-2-methylisoquinolin-1-one. The agents and compositions described herein can be formulated by any conventional manner using one or more pharmaceutically acceptable carriers or excipients as described in accepted literature. See, e.g., REMINGTON: SCIENCE & PRACTICE OF PHARMACY, 22nd Ed. (Lloyd (Ed.), Pharmaceutical Press, London, UK, 2012). Such formulations contain a therapeutically effective amount of an active agent(s) described herein, preferably in purified form, together with a suitable amount of carrier so as to provide the form for proper administration to the subject.

A pharmaceutical formulation can include a therapeutically effective amount of at least one active agent. Such effective amounts can be readily determined by one of ordinary skill in the art based, in part, on the effect of the administered dosage form, or the combinatorial effect of an agent and one or more additional active agents, if more than one agent is used. A therapeutically effective amount of an active agent can also vary according to factors such as the disease state, age, sex, and weight of the individual, and the ability of the agent (and one or more additional active agents) to elicit a desired response in the individual, e.g., amelioration of at least one condition parameter. For example, a therapeutically effective amount of a dosage form can inhibit (lessen the severity of or eliminate the occurrence of), prevent a particular disorder, or lessen any one of the symptoms of a particular disorder known in the art or described herein. A therapeutically effective amount may also be one in which any toxic or detrimental effects of the active agent or dosage form are outweighed by the therapeutically beneficial effects.

Pharmaceutical compositions are administered in a manner appropriate to the condition treated (see below). An appropriate dose and suitable duration and frequency of dose administration can be determined based on the condition of the subject, the type and severity of the subject's disease, the particular form of the active compound, and the method of administration. In general, an appropriate dose and treatment regimen provides active composition(s) in an amount sufficient to provide therapeutic or prophylactic benefit (e.g., an improved clinical outcome, such as more frequent complete or partial remissions, or longer disease-free or overall survival, or a lessening of symptom severity, see below). Optimal doses are generally determined using experimental models or clinical trials, then adjusted for the body mass, weight, or blood volume of the subject.

Accordingly, the dose of the pharmaceutical composition comprising at least one substituted pyridine derivative KDM4(i) compound may differ depending upon the condition of the subject (e.g., human patient), such as stage of the disease, general health status, age, and other factors.

As noted, the KDM4(i) compounds as disclosed here may be administered in combination therapy, i.e., combined with other agents, e.g., therapeutic agents, that are useful for treating pathological conditions or disorders, such as various forms of cancer, autoimmune disorders and inflammatory diseases. The term "in combination" in this context means that the agents are given substantially contemporaneously, either simultaneously or sequentially. If given sequentially, at the onset of administration of the second compound, the first of the two compounds is preferably still detectable at effective concentrations at the site of treatment.

For example, the combination therapy can include one or more antibodies disclosed here coformulated with, or coadministered with, one or more additional therapeutic agents, e.g., one or more cytokine and growth factor inhibitors, immunosuppressants, anti-inflammatory agents, metabolic inhibitors, enzyme inhibitors, or cytotoxic or cytostatic agents. Such combination therapies may advantageously utilize lower dosages of the administered therapeutic agents, thus avoiding possible toxicities or complications associated with the various monotherapies. For example, a therapeutic KDM4(i) compound disclosed here may be used in combination with an antibody and further include those agents that interfere at different stages in an inflammatory response. One or more KDM4(i) compounds described herein may be coformulated with, or coadministered with, one or more additional agents such as other chemotherapeutic agents, or biologics such as vaccines, immunotoxins, cytokine or growth factor antagonists (e.g., soluble receptors, peptide inhibitors, small molecules, ligand fusions); antibodies or antigen binding portions thereof (e.g., antibodies that bind to tumor markers, cytokines or growth factors or their receptors); and anti-inflammatory cytokines or agonists thereof.

In at least one embodiment, a KDM4(i) compound can be co-formulated or co-administered with at least one additional chemotherapeutic agent. The chemotherapeutic agent may be a bromodomain inhibitor (see, e.g., WO 2015058160; Patent Pub. No. US 20150111885; U.S. Pat. No. 9,034,900), an alkylating agent, or a mitotic inhibitor.

Accordingly, an active agent (i.e., KDM4(i) compound) can be administered to a subject as a monotherapy, or as a combination therapy with another active agent in a combination dosage form, or as an additional treatment, e.g., another treatment for the same, an associated, or an additional disorder. For example, a KDM4(i) compound can be combined with a chemotherapeutic agent, such as a bromodomain inhibitor, romidepsin, temozolomide, protein-bound paclitaxel, and the like, in the same formulation, or in a different formulation administered simultaneously or sequentially. Additionally, combination therapy can include administering to the subject (e.g., a human patient) one or more agents (e.g., antibiotics, anti-coagulants, anti-hypertensives, or anti-inflammatory drugs) that provide a therapeutic benefit to subject. In another example, combination therapy can include administering to the subject a KDM4(i) compound and one or more additional agents that provide therapeutic benefit to a subject who has cancer, such as triple-negative or refractory breast cancer. Similarly, in another example, combination therapy can include administering to the subject a KDM4(i) compound, protein-bound paclitaxel, or a combination comprising a KDM4(i) compound and paclitaxel, and one or more additional agents that provide therapeutic benefit to a subject who has cancer. In other embodiments, an active agent is administered first in time and an additional active agent(s) is administered second in time. In some embodiments, one or more additional active agents are administered at the same time, but using different drug delivery devices or delivery modes, for example, providing for combination therapy comprising administration of a KDM4(i) compound and temozolomide, or comprising a KDM4(i) compound and paclitaxel, or comprising a KDM4(i) compound and romidepsin. In at least one embodiment, the KDM4(i) compound is Compound I.

Cancers that may be treated with therapy including administration of KDM4(i) compounds include carcinoma, sarcoma, germ cell tumor, lymphoma or leukemia, blastoma, or other cancers. Carcinomas include epithelial and glandular neoplasms, transitional cell carcinoma, adenoid cystic carcinoma, insulinoma, hepatocellular carcinoma, cholangiocarcinoma, carcinoid tumor of appendix, linitis plastica, larynx carcinoma, hypopharynx carcinoma, mouth cancer, hypopharyngeal cancer, salivary gland carcinoma, tongue carcinoma, gastric carcinoma, prolactinoma, oncocytoma, hepatocellular carcinoma, kidney parenchyma carcinoma, papillary renal carcinoma, gall bladder carcinoma, bronchial carcinoma, Grawitz tumor, carcinoma of unknown primary site, multiple endocrine adenomas, endometrioid adenoma, adnexal and skin appendage neoplasms, mucoepidermoid neoplasms, cystic, mucinous and serous neoplasms, cystadenoma, pseudomyxoma peritonei, ductal, lobular and medullary neoplasms, acinar cell neoplasms, complex epithelial neoplasms, Warthin's tumor, thymoma, specialized gonadal neoplasms, sex cord stromal tumor, solid tumor labial carcinoma, granulosa cell tumor, arrhenoblastoma, Sertoli Leydig cell tumor, glomus tumors, paraganglioma, pheochromocytoma, glomus tumor, melanocytic nevus. Sarcomas include Askin's tumor, botryodies, Ewing's sarcoma, Kaposi's sarcoma, malignant hemangio endothelioma, malignant schwannoma, osteosarcoma, soft tissue sarcomas (including alveolar soft part sarcoma, angiosarcoma, cystosarcoma phyllodes, dermatofibrosarcoma, desmoid tumor, desmoplastic small round cell tumor, epithelioid sarcoma, extraskeletal chondrosarcoma, extraskeletal osteosarcoma, hemangiopericytoma, hemangiosarcoma, lymphangiosarcoma, lympho-sarcoma, malignant fibrous histiocytoma, neurofibrosarcoma, and synovial sarcoma). Lymphoma and leukemia include acute lymphoblastic leukemia, acute myeloid leukemia, hairy cell leukemia, multiple myeloma, chronic myelogenous leukemia; chronic myeloproliferative disorders; chronic lymphocytic leukemia/small lymphocytic lymphoma, B-cell prolymphocytic leukemia, lympho-plasmacytic lymphoma (such as Waldenstrom macroglobulinemia), splenic marginal zone lymphoma, plasma cell myeloma, plasmacytoma, monoclonal immunoglobulin deposition diseases, heavy chain diseases, extranodal marginal zone B-cell lymphoma, also called malt lymphoma, nodal marginal zone B-cell lymphoma, Burkitt's lymphoma, non-Hodgkin lymphoma (including diffuse large B-cell lymphoma, follicular lymphoma, Mycosis fungoides and the Sezary syndrome, mantle cell lymphoma, diffuse large B-cell lymphoma, primary effusion lymphoma, intravascular large B-cell lymphoma, hepatosplenic T-cell lymphoma, extranodal NK-/T-cell lymphoma), mediastinal (thymic) large B-cell lymphoma, T-cell prolymphocytic leukemia, T-cell large granular lymphocytic leukemia, aggressive NK-cell leukemia, adult T-cell leukemia/lymphoma, enteropathy-type T-cell lymphoma, blastic NK-cell lymphoma, cutaneous T-cell lymphoma; primary cutaneous CD30-positive T-cell lymphoproliferative disorders, primary cutaneous anaplastic large cell lymphoma, lymphomatoid papulosis, angioimmunoblastic T-cell lymphoma, peripheral T-cell lymphoma, unspecified, anaplastic large cell lymphoma, classical Hodgkin lymphomas (nodular sclerosis, mixed cellularity, lymphocyte-rich, lymphocyte depleted or not depleted, nodular lymphocyte-predominant Hodgkin lymphoma), HIV-related lymphoma (e.g., primary effusion lymphoma). Germ cell tumors include without limitation germinoma, dysgerminoma, nongerminomatous germ cell tumor, endodermal sinus turmor, extracranial germ cell tumor; extragonadal germ cell tumor, teratoma, polyembryoma, and gonadoblastoma. Blastomas include ependymoblastoma, esthesioneuroblastoma, and nephroblastoma.

Other cancers that may be treated with therapies that include administration of KDM4(i) compounds include lung cancers such as non-small cell lung cancer and small cell lung cancer (including small cell carcinoma (oat cell cancer), mixed small cell/large cell carcinoma, and combined small cell carcinoma), liver cancer, gastric cancer, glioblastoma, head and neck squamous cell carcinoma, myeloma, adrenocortical carcinoma; thyroid cancer (medullary and papillary thyroid carcinoma), renal carcinoma, cervix carcinoma, uterine corpus carcinoma, endometrium carcinoma, chorion carcinoma, testis carcinoma, urinary carcinoma, melanoma, basalioma, teratoma, choroidea melanoma, craniopharyngeoma, osteosarcoma, myosarcoma, and plasmocytoma, anal cancer; appendix cancer; atypical teratoid/rhabdoid tumor; bladder cancer; brain tumor (including brain stem glioma, central nervous system atypical teratoid/rhabdoid tumor, central nervous system embryonal tumors, craniopharyngioma, ependymoma, medulloepithelioma, pineal parenchymal tumors of intermediate differentiation, supratentorial primitive neuroectodermal tumors and pineoblastoma); breast cancer; bronchial tumors; cancer of unknown primary site; carcinoid tumor; central nervous system atypical teratoid/rhabdoid tumor; central nervous system embryonal tumors; childhood cancers; endocrine pancreas islet cell tumors; endometrial cancer; extrahepatic bile duct cancer; gallbladder cancer; gastric (stomach) cancer; gastrointestinal carcinoid tumor; gastro-intestinal stromal cell tumor; gastrointestinal stromal tumor (GIST); gestational trophoblastic tumor; head and neck cancer; heart cancer; intraocular melanoma; islet cell tumors; Langerhans cell histiocytosis; laryngeal cancer; lip cancer; liver cancer; malignant fibrous histiocytoma bone cancer; medulloepithelioma; Merkel cell carcinoma; metastatic squamous neck cancer with occult primary; multiple endocrine neoplasia syndromes; multiple myeloma; multiple myeloma/plasma cell neoplasm; myelodysplastic syndromes; myeloproliferative neoplasms; nasal cavity cancer; naso-pharyngeal cancer; oral cavity cancer; oropharyngeal cancer; osteosarcoma; other brain and spinal cord tumors; ovarian epithelial cancer; ovarian germ cell tumor; ovarian low malignant potential tumor; papillomatosis; paranasal sinus cancer; parathyroid cancer; pelvic cancer; penile cancer; pineal parenchymal tumors of intermediate differentiation; pineoblastoma; pituitary tumor; plasma cell neoplasm/multiple myeloma; pleuropulmonary blastoma; primary central nervous system (CNS) lymphoma; rectal cancer; renal cancer; respiratory tract cancer; small intestine cancer; squamous neck cancer; supratentorial primitive neuroectodermal tumors; thymic carcinoma; thymoma; thyroid cancer; transitional cell cancer; transitional cell cancer of the renal pelvis and ureter; trophoblastic tumor; ureter cancer; urethral cancer; uterine sarcoma; vaginal cancer; vulvar cancer.

Specific examples of cancers associated with hard tumors that may be treated with substituted pyridine derivative KDM4(i) compounds include breast cancer, fibrosarcoma, myxosarcoma, liposarcoma, chondrosarcoma, osteogenic sarcoma, chordoma, angiosarcoma, endotheliosarcoma, lymphangiosarcoma, lymphangioendotheliosarcoma, synovioma, mesothelioma, Ewing's tumor, leiomyosarcoma, rhabdomyosarcoma, colon cancer, colorectal cancer, kidney cancer, pancreatic cancers (such as glucagonoma, gastrinoma, pancreatic neuroendocrine tumor (VIPoma)), bone cancer, ovarian cancer, prostate cancer, esophageal cancer, stomach cancer, oral cancer, nasal cancer, throat cancer, squamous cell carcinoma, basal cell carcinoma, adenocarcinoma, sweat gland carcinoma, sebaceous gland carcinoma, papillary carcinoma, papillary adeno-carcinomas, cystadenocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, uterine cancer, testicular cancer, bladder carcinoma, epithelial carcinoma, glioma, brain tumors (such as glioblastoma, glioblastoma multiforme, astrocytoma, meningioma, medulloblastoma and peripheral neuroectodermal tumors), craniopharyngioma, ependymoma, pinealoma, hemangioblastoma, acoustic neuroma, oligodendroglioma, meningioma, skin cancer, melanoma (malignant melanoma, nodular melanoma, dysplastic nevus, lentigo maligna melanoma, superficial spreading melanoma, and malignant acral lentiginous melanoma), neuroblastoma, and retinoblastoma. In particular, KDM4(i) compounds may be useful in treating EGFR-pathway-associated cancers.

Chemotherapeutic agents are often characterized by functionality, chemical structure, and relationship to another drug. Chemotherapeutic agents include, for example: alkylating agents (e.g., azacitidine, nitrogen mustards: mechlorethamine, chlorambucil, cyclophosphamide (Cytoxan®), ifosfamide, bendamustine (Levact®) and melphalan; nitrosoureas: streptozocin, carmustine (BCNU), lomustine, and bischloroethylnitrosurea; alkyl sulfonates: busulfan, triazines: dacarbazine (DTIC) and temozolomide (Temodar®); ethylenimines: thiotepa and altretamine (hexamethylmelamine); platinum drugs (such as cisplatin, carboplatin, satraplatin (JM-216), CI-973, and oxalaplatin); antimetabolites (e.g., 5-fluorouracil (5-FU), 6-mercaptopurine (6-MP), capecita-bine (Xeloda®), cytarabine (Ara-C®), azacitidine, decitabine (Dacogen®, 5-aza-2'-deoxy-cytidine, a cytidine analog and hypomethylating agent), floxuridine, fludarabine, gemcitabine (Gemzar®), hydroxyurea, methotrexate, and pemetrexed (Alimta®); anthracyclines (e.g., daunorubicin (daunomycin, rubidomycin, or cerubidine), doxorubicin (Adriamycin®), epirubicin, idarubicin, actinomycin-D, bleomycin; mitomycin-C, and mitoxantrone (which also acts as a topo-isomerase II inhibitor)); topoisomerase inhibitors (e.g., topoisomerase I inhibitors: topotecan, irinotecan (CPT-11); topoisomerase II inhibitors: etoposide (VP-16), camptothecin, teniposide, and mitoxantrone); mitotic inhibitors (e.g., taxanes: paclitaxel (Taxol®) and docetaxel (Taxotere®)); epothilones: ixabepilone (Ixempra®); vinca alkaloids such as: vinblastine (Velban®), vincristine (Oncovin®), and vinorelbine (Navelbine®); estramustine (Emcyt®); purine or pyrimidine antagonists such as 6-mercaptopurine, 5-fluorouracil, cytarabine, clofarabine, and gemcitabine; cell maturing agents (e.g., arsenic trioxide and tretinoin); DNA repair enzyme inhibitors (e.g., podo-phyllotoxines, etoposide, irinotecan, topotecan, and teniposide);

enzymes that prevent cell survival (e.g., asparaginase and pegaspargase); corticosteroids (e.g., prednisone, methylprednisolone (SOLUMEDROL®), and dexamethasone (DECADRON®)); HDAC inhibitors (e.g., romidepsin (ISTODAX®), vorinostat (ZOLINZA®)); other antimetabolites such as L-asparaginase (ELSPA®), 2-deoxy-D-glucose, procarbazine (MATULANE®), and bortezomib (VELCADE®); other cytotoxic agents (e.g., estramustine phosphate, prednimustine, and procarbazine); hormones (e.g., tamoxifen, leuprolide, flutamide, and megestrol; hormone agonists or antagonists, partial agonists, or partial antagonists); monoclonal antibodies (e.g., gemtuzumab ozogamicin (MYLOTARG®), inotuzumab ozogamicin (CMC-544), alemtuzumab, rituximab, and yttrium-90-ibritumomab tiuxetan); immuno-modulators (e.g., thalidomide and lenalidomide); kinase inhibitors such as Bcr-Abl kinase inhibitors (e.g., AP23464, AZD0530, CGP76030, PD180970, SKI-606, imatinib, dasatinib (BMS354825), nilotinib (AMN107), and VX680/MK-0467 (Aurora kinase inhibitor)).

Additional anticancer therapies that may be combined with BET inhibitor therapy include surgery, radiotherapy (e.g., gamma-radiation, neutron bean radiotherapy, electron beam radiotherapy, proton therapy, brachytherapy, and systemic radioactive isotopes), endocrine therapy, biological response modifiers (e.g., interferons, interleukins, and tumor necrosis factor), hyperthermia and cryotherapy, and agents to attenuate any adverse effects (e.g., anti-emetics).

Reference to a chemotherapeutic agent herein applies to the chemotherapeutic agent or its derivatives and accordingly the invention contemplates and includes either of these embodiments (agent; agent or derivative(s)). "Derivatives" or "analogs" of a chemotherapeutic agent or other chemical moiety include, but are not limited to, compounds that are structurally similar to the chemotherapeutic agent or moiety or are in the same general chemical class as the chemotherapeutic agent or moiety. In some embodiments, the derivative or analog of the chemotherapeutic agent or moiety retains similar chemical or physical property (including, for example, functionality) of the chemotherapeutic agent or moiety.

Administration of a pharmaceutical composition comprising a KDM4(i) compound may replace or augment a previously or currently administered therapy. For example, upon treating with one pharmaceutical formulation, administration of an additional active agent(s) can cease or be diminished, e.g., be administered at lower concentrations or with longer intervals between administrations. In some embodiments, administration of a previous therapy can be maintained. In some embodiments, a previous therapy is maintained until the level of an active agent reaches a level sufficient to provide a therapeutic effect. Accordingly, two therapies can be administered in combination, sequentially, or simultaneously. Moreover, administration of a KDM4(i) in combination with an additional active agent may provide a synergistic therapeutic result. Combined therapy provided may be administered at once or multiple times at intervals of time. It is understood that the precise dosage and duration of treatment may vary with the age, weight, and condition of the patient being treated, and may be determined empirically using known testing protocols or by extrapolation from in vivo or in vitro test or diagnostic data. It is further understood that for any particular individual, specific dosage regimens should be adjusted over time according to the individual need and the professional judgment of the person administering or supervising the administration of the formulations.

The terms "subject" or "patient" as used herein refer to any subject, particularly a mammalian subject, for whom diagnosis, prognosis, or therapy of a cancer, such as a breast cancer, particularly triple-negative breast cancer is relevant. The terms "subject" or "patient" may include any human or nonhuman animal as context indicates.

As used herein, "treat," "treatment," "treating," "palliating," "ameliorating," or "treatment of" are used interchangeably and refer, in general, therapeutic benefit or prophylactic benefit, e.g., reducing the potential for disease, reducing the occurrence of disease, or reducing the severity of disease. For example, treating can refer to the ability of a therapy when administered to a subject, to prevent further tumor growth or malignancy, or to cure or to alleviate at least partially a disease symptom, sign, or cause. These terms refer to an approach for obtaining beneficial or desired results including but not limited to therapeutic benefit or a prophylactic benefit.

"Therapeutic benefit" generally means eradication or amelioration of the underlying disorder being treated. A therapeutic benefit may also be achieved with the eradication or amelioration of one or more of the physiological symptoms associated with the underlying disorder such that an improvement is observed in the patient, notwithstanding that the patient is still afflicted with the underlying disorder. Accordingly, a therapeutic benefit is not necessarily a cure for a particular cancer, but rather encompasses a result that most typically includes alleviation; increased survival; elimination of a tumor; reduction of a symptom associated with a cancer; prevention or alleviation of a secondary disease, disorder, or condition resulting from the occurrence of a cancer; or prevention of metastasis. For prophylactic benefit, compositions may be administered to a patient at risk of developing a particular disease, or to a patient reporting one or more of the physiological symptoms of a disease, even though a diagnosis of this disease has not been made.

Accordingly, "therapeutic agent" as used herein refers to any therapeutically active substance that is administered to a subject to produce a desired, usually beneficial, effect. The term therapeutic agent includes, e.g., classical low molecular weight therapeutic agents commonly referred to as small molecule drugs; and biologics including, but not limited to, antibodies or functionally active portions thereof, peptides, lipids, protein drugs, protein conjugate drugs, fusion proteins, enzymes, nucleic acids, ribozymes, genetic material, viruses, bacteria, eukaryotic cells, and vaccines. A therapeutic agent can also be a pro-drug. A therapeutic agent can also be a radioactive isotope. A therapeutic agent can be an agent activated by a form of energy such as light or ultrasonic energy, or activated by other circulating molecules that can be administered systemically or locally. In addition, the therapeutic agent can be pharmaceutically formulated.

EXAMPLES

Example 1: Breast Cancer Stem-Cell Lines

Patient breast cancer tumor material was obtained from the pathology department of the University Medical Centre Freiburg with patient consent (Ethics vote 307/13). All primary tumors were from subjects who had received chemotherapy before tissue collection and were classified as triple-negative. All surgeries were conducted by the Department of Obstetrics and Gynecology at the University Medical Centre Freiburg. Tumor tissue specimens for engraftment and paraffin embedding were obtained simultaneously through pathologists from the tumor bank of the Comprehensive Cancer Centre Freiburg. Written informed consent was obtained from all patients before inclusion in studies described herein.

Primary breast cancer stem cells (BCSC) lines were isolated by mechanical dissociation of the tumor material and enzymatic digestion in 5 mL Dulbecco's PBS buffer (DPBS) (GIBCO® media, Thermo Fisher Scientific Inc., Waltham, Mass., US) supplemented with 6 U DNAse I (MACHERY-NAGEL GmbH & Co. KG, Duren, DE) and 1 mg LIBERASE™ (Roche Diagnostics GmbH, Mannheim, DE) for 1 hr at 37° C. Afterwards, the digest medium was diluted with 10 ml DPBS and filtered through a cell strainer (40 μm, Becton Dickenson, Carlsbad, Cal., US), and remaining tissue clumps smashed with a piston from a 2 mL syringe. Following centrifugation at 200 g for 5 min, the supernatant was discarded and the cell pellet washed once with MEBM medium (GIBCO). If red blood cells were visible in the pellet, 1 mL ACK Lysis buffer (GIBCO) was added to the cell pellet. After 1 min incubation at room temp, up to 6 mL MEBM was added and the preparation centrifuged at 200 g for 5 min. After the supernatant was discarded, the pellet was resuspended in 1 mL MEBM and filtered through a 40 μm strainer. Following centrifugation at 200 g for 5 min, the supernatant was discarded and remaining cell pellet taken up in mammary stem-cell (MSC, see below) medium. Cells were counted in a Neubauer chamber (hemocytometer), then plated in a 24-well low attachment plate (CORNING®, Corning, N.Y., US) at $2\times10^4$ cells per well in an ice-cold 1:1 mix of MSC medium and MATRIGEL® matrix (CORNING, #354230). After solidification of MATRIGEL at 37° C. for 30 min, each well was topped with 500 μL MSC medium. The cells were cultured at 37° C. under low-oxygen conditions (3% $O_2$, 5% $CO_2$, 92% $N_2$). When cells proliferated stably in 3D, they were cultured in 2D culture for cell expansion.

The basis of the MSC (mammary stem-cell) medium described herein is the mammary epithelial basal medium (GIBCO, #31331-028), supplemented with B27® serum-free cell culture supplement (GIBCO, #17504-044), amphotericin B (SIGMA-ALDRICH, #A2942), and penicillin-streptomycin (GIBCO, #15140122). This medium was further supplemented with epidermal growth factor (f.c. 20 ng/mL, #AF-100-15, PeproTech, Rocky Hill, N.J., US), heparin (f.c. 4 μg/mL, Sigma-Aldrich #H3149), fibroblast growth factor (f.c. 20 ng/ml, PeproTech #AF-100-18B), gentamicin (f.c. 35 μg/ml, GIBCO #15750-045), and Rho kinase inhibitor (f.c. 500 nM, CALBIOCHEM® #555550, Merck KGaA, Darmstadt, DE) to complete the MSC medium.

To culture the BCSCs as spheres in a 3D environment, $2\times10^4$ cells per well of a 24-well low-attachment plate were seeded in 100 μL of a 1:1 mixture of MATRIGEL:MSC medium. After solidification of the MATRIGEL at 37° C. for 30 min, the dish was topped up with 500 μL MSC medium. Cells were grown under low oxygen conditions as described above. 1 mL MSC medium was added after 2 days. Cells were split weekly using CORNING Dispase for residual MATRIGEL dissolution and ACCUTASE® cell detachment solution (Innovative Cell Technologies, Inc., San Diego, Cal., US) for sphere dissociation. Cells were counted via Neubauer chamber.

To expand the BCSCs in a 2D environment, $4\times10^5$ cells per 10 cm culture dish were seeded in 2 mL MSC medium containing 2% MATRIGEL (ice-cold). After solidification of the MATRIGEL at 37° C. for 30 min, the dish was topped up with 8 mL MSC medium. Cells were grown under low oxygen conditions as described above. Medium was changed after 3 days. Cells were split weekly using ACCUTASE for detachment and counting before reseeding.

High titer adenoviral preparations were obtained from Vector BioLabs (Malvern, Pa., US). Adenoviral particles were added (in MSC medium) to a multiplicity of infection (MOI) of 300 for BCSC1 cells, and a MOI of 150 for BCSC2 cells.

Example 2: I Vitro Assays

For the cancer stem-cell spheroid assay in methylcellulose, cells were detached by ACCUTASE solution and counted. $3\times10^3$ single BCSC1 and $1\times10^3$ single BCSC2 cells were seeded into individual wells of 96-well ultra-low attachment plates (CORNING, #3474) in serum-free MSC medium containing 1% methylcellulose (Sigma-Aldrich, #M0512). After 7 days, all spheres bigger than four cells were counted for sphere-forming-capacity and spheres over 50 μm diameter were counted for both KDM4(i)-treated and control cells.

For the cancer stem-cell spheroid assay in MATRIGEL matrix, cells were detached by ACCUTASE solution and counted. $1\text{-}10^3$ as triplicates and $4\times10^4$ single BCSC1 and single BCSC2 cells were seeded in 50% MATRIGEL into individual wells of 96-well ultra-low attachment plates in MSC medium. Concentrations of KDM4(i) are as indicated in the figures. After 7 days, spheres over 50 μm diameter were counted for both KDM4(i)-treated and control cells in the wells with $1\text{-}10^3$ cells. The wells with $4\times10^4$ cells were split as described and counted; from these $4\times10^4$ cells, $1\times10^3$ single BCSC1 and single BCSC2 cells were seeded in triplicates as described herein to assess secondary sphere formation without inhibitor present.

For dose-response assays, cells were detached by ACCUTASE solution dissociation and counted. The wells of a black 384-well plate (Greiner Bio-One, Monroe, N.C., US) were coated with 10 μL of MSC medium containing 2% MATRIGEL (354230, Corning). After incubation at 37° C. for 30 min to solidify the MATRIGEL, $1\times10^3$ single cells were seeded per 384-well in 40 μL medium. After 24 hr under normal culture conditions, the KDM4(i) inhibitor (Compound I, Celgene Quanticel Research, Inc.) was added in 50 μL to each well to the final indicated concentrations. Following 96 hr of incubation under normal culture conditions, the cells were washed once with PBS and fixed with ice-cold methanol for at least 15 min at −20° C. After another washing step with PBS, cells were stained with DAPI (Sigma-Aldrich) and read-out with the ScanR microscope-based imaging platform (Olympus Deutschland GmbH, Hamburg, DE). Total DAPI cell nuclear counts per well were determined.

For the cell proliferation assays, BCSCs tagged with a stable NLS-mCherry fluorescent signal (nuclear localization peptide) were used for this assay. Cells were detached by ACCUTASE dissociation and counted. Each well of a black 384-well plate (Greiner) was coated with 10 μL of MSC medium containing 2% MATRIGEL. After incubation at 37° C. for 30 min to solidify the MATRIGEL, $1\times10^3$ single cells/well were seeded in 40 μL medium. After 24 hr normal culture, the KDM4(i) was added in 50 μL to each well to the final indicated concentrations. Afterwards, the first readout with the ScanR microscope-based imaging platform (Olympus) was started, assessing mCherry-fluorescent cell nuclei in nine sectors of each well under 60% humidity and 5% $CO_2$. This readout was repeated every 24 hr for 7 days. Analysis was done with the ScanR software (Olympus).

For microarray analysis, total RNA was isolated from patient material, xenografts and cells using the GeneMATRIX Universal RNA Purification Kit (Roboklon GmbH, Berlin, DE) according to manufacturer instruction. Isolated RNAs were processed with the AMBION™ WT Expression kit (Thermo-Fisher) as described by the manufacturer and hybridized to ILLUMINA® HT-12 v.4 Expression Bead Chips following standard protocol (Illumina, Inc., San Diego, Cal. US). Expression data were processed and quantile normalized using the R/Bioconductor Beadarray package (PMID: 17586828) v2.22. See Dunning et al., *Beadarray: R classes & methods for Illumina bead-based data,* 23 Bioinformatics 2183 (2007). Only probesets mapping to an EntrezID via the Bioconductor package illuminaHumanv4.db (v1.26) were considered for further downstream analysis. In case of multiple probesets matching the same EntrezID, the probeset having the respective highest interquartile range across all samples were selected. The dendrogram (see figures) depicts a complete-linkage hierarchical clustering based on the Euclidean distance between the samples.

Chromatin immunoprecipitation (ChIP) KDM4(i) assays were performed essentially as described. Metzger et al., *LSD1 demethylates repressive histone marks to promote androgen receptor-dependent transcription,* 437 Nature 436 (2005). BCSC1 cells were cultured for 18 hr in the absence or presence of $5\times10^{-10}$ M KDM4(i). Three days before harvesting, cells were infected with adenovirus expressing either shRNA against KDM4A or scrambled control shRNA (Ad-GFP-U6-hKDM4AshRNA and Ad-U6-RNAi-GFP, Vector Biolabs) according to manufacturer instructions. Immunoprecipitation was performed with specific antibodies, anti-KDM4A (Schuele Lab. #5766, lot 5766), anti-H3K9me3 (#C15410056, lot A1675-001P, Diagenode), on GammaBind™ G-Sepharose™ (GE-Healthcare). Libraries were prepared from immunoprecipitated DNA according to standard methods. ChIP-seq libraries were sequenced using a HiSeq 2000 (Illumina) and mapped to the hg19 reference genome using Bowtie2 software (e.g., Johns Hopkins Univ., Baltimore, Md., US). Langmead et al., *Ultrafast & memory-efficient alignment of short DNA sequences to the human genome,* 10 Genome Biol. R25 (2009). Data were further analyzed using the peak finding algorithm MACS 1.41 (Model-based Analysis of ChIP-Seq) (e.g., Nat'l Center Biotechnol. Info., U.S. Nat'l Library Med.) using input as control. Zhang et al., *Model-based analysis of ChIP-Seq (MACS),* 9 Genome Biol. (2008). All peaks with FDR greater than 1% were excluded from further analysis. The uniquely mapped reads were used to generate the genome-wide intensity profiles, which were visualized using the Integrative Genomics Viewer (IGV) genome browser (e.g., Broad Inst., Cambridge, Mass. US). Thorvaldsdottir et al., *Integrative Genomics Viewer (IGV): high-performance genomics data visualization and exploration,* 14 Brief Bioinform. 178 (2013). HOMER software (e.g., Univ. Calif. San Diego) was used to annotate peaks, to calculate overlaps between different peak files, and for motif searches. Heinz et al., *Simple combinations of lineage-determining transcription factors prime cis-regulatoy elements required for macrophage and B cell identities,* 38 Mol. Cell 576 (2010). The genomic features (promoter, exon, intron, 3'UTR, and intergenic regions) were defined and calculated using Reference Sequence (RefSeq) database (e.g., Nat'l Center for Biotechnol. Info., U.S. Nat'l Library Med.) and HOMER software.

To examine the effect of KDM4 inhibition on cell cycle progression and apoptosis or necrosis, BCSC lines 1 and 2 were treated with 50 nM KDM4(i) for different time points (24 hr, 48 hr, 72 hr, and 96 hr). Following drug exposure, $4\times10^5$ cells were collected and stained with 50 µL propidium iodide (PI) using the PI/RNase solution (Cell Signaling Technol. #4087), according to manufacturer instruction. Cells were analyzed using BD LSR Fortessa and BD FACS Diva Software (Becton Dickinson). The percentage of cells in subG1 G0/G1, S and G2/M phases were determined from $1\times10^5$ ungated cells using FlowJo software v6.

To analyze the expression of established cancer stem-cell markers, cells were detached and counted as described above. $1\times10^5$ cells were washed with FACS buffer (PBS+1% BSA) and stained for 20 min at room temp in the dark with the following antibodies diluted in FACS buffer: anti-CD24 (eBioscience, 46-0247; 1:100), anti-CD44 (eBioscience, 12-0441-81; 1:1000), anti-EpCAM (eBioscience, 660 50-9326; 1:100), and anti-CD49f (eBioscience, 46-0495; 1:200). Cells were analyzed using BD LSR Fortessa and BD FACS Diva Software (Becton Dickinson).

Apoptosis was detected using a FITC Annexin V Apoptosis Detection Kit I (BD Bioscience) according to manufacturer instruction. In brief, cells were collected with 0.05% trypsin-EDTA solution, washed, and diluted to $1\times10^6$ cells per ml in 1×Binding Buffer. Staining was performed for 15 min at room temp in the dark by adding 5 µL FITC-coupled antibody solution and 5 µL PI to the cells in 100 µL binding buffer. Afterwards, 400 µL binding buffer was added, and cells were analyzed using a BD LSR Fortessa and BD FACS Diva Software (Becton Dickinson). A total of $1\times10^5$ cells were counted. Analysis was performed with FlowJo software v6.

Example 3: In Vivo Tumorigenicity Assay in NOD/SCID Mice Bearing Orthotopic BC Xenografts All mouse handling and experiments were performed in accordance of German Animal Welfare regulations and approved by the local authorities (animal protocol G13/114).

NOD/SCID females (4-5 weeks old) were anesthetized using an isoflurane inhalator. A small sagittal incision (no longer than 1.0 cm) on the shaved and sterilized abdomen allowed access to the mammary glands #4 on both sides. Tumor cells were mixed with $1\times10^6$ irradiated fibroblasts (newborn human foreskin fibroblasts (NuFF), p11, Global-Stem, GSC-3002) each, and suspended in a 1:1 mixture of Matrigel:MSC medium. The volume of each transplant was 40 µL per gland, containing defined numbers of BCSCs and $1\times10^6$ fibroblasts. The transplant was injected into the mammary fat pad of the #4 gland on both sides of the animal using a 1 mL syringe with a fine needle. Each transplant was localized distal to the lymph node in the gland. Surgical incisions were sealed by suturing with a 5/0 thread (Ethicon, Z995). Animals were monitored twice weekly for animal weight and tumor growth, which was determined by caliper. Tumor volumes were calculated using the formula: $4/3\times\pi\times r^3$.

Tumor size was monitored using ultrasound measurements gathered using a small animal high resolution ultrasound system (Vevo3100) and transducer (MX550D) with 40 MHz (VisualSonics, Toronto, Canada). For 3D tumor modelling, the transducer was moved along the tumor automatically with a step size of 0.076 mm. Representative pictures showed qualitative tumor differences as visualized with Vevo LAB v.1.7.1 at beginning and end of treatment.

For in vivo treatment, KDM4(i) was solved immediately before treatment in a vehicle consisting of 50% polyethylene glycol (SIGMA) and 50% DPBS (pH=9, Gibco) with sonication (diagenode bioruptor) until a clear solution was formed. When tumors reached a palpable size of 2 mm in diameter, mice were randomly assigned to different groups (n=8, each group). The inhibitor was administered daily to NOD/SCID mice via oral gavage at 10 mg/kg. Control animals received vehicle only. Animals were monitored twice weekly for body weight and tumor growth, which was determined by caliper.

Regarding immunohistochemistry, tissue specimens were immediately formalin fixed (10%). After formalin fixation and paraffin embedding 2 µm thick sections were cut and mounted onto cover slips. All cover slips were stored for two days at 58° C. in a drying chamber, subsequently deparaffinized using xylene and hydrated with ethanol. Human and corresponding engrafted tumor tissue was stained using ready to use antibodies for the estrogen-receptor protein (monoclonal rabbit anti-human estrogen receptor a, clone EP1, code IR084) progesterone-receptor protein (monoclonal mouse anti-human progesterone receptor, clone PgR 636, code IR068), HER2 (polyclonal rabbit anti-human c-erbB-2 oncoprotein, code A0485), Ki-67 (monoclonal mouse anti-human Ki-67 antigen, clone MIB-1, code IR626), Vimentin (monoclonal mouse anti-Vimentin, clone V9, code IR630), E-Cadherin (monoclonal mouse anti-human E-Cadherin, clone NCH-38, code IR059) and for cytokeratin 8/18 (monoclonal rabbit anti-human cytokeratin 8/18, clone EP17/EP30, code IR094). For the (host-dependent) horseradish-based peroxidase detection ENVISION® Flex Peroxidase-Blocking Reagent (DAKO, SM801), ENVISION® Flex+Rabbit (LINKER) (DAKO, K8019) or ENVISION® Flex+Mouse (LINKER) (DAKO, K8021) and ENVISION® Flex/HRP (DAKO, SM802) were used. Counterstaining was performed with hemalum before adding a coverslip. As internal positive control, patient-derived physiological mammary gland was used for ER, PR, Ki-67 (nuclear staining), cytokeratin 8/18, and E-Cadherin (membranous cytoplasmic staining). The mammary gland-surrounding myoepithelial layer was used as internal control for Vimentin. For HER2, tissue specimens from HER2 positive breast cancer patients (Score 3 according to Ref[20]) were carried for every HER2 staining session as external positive control. Triple-negative breast cancer was defined as ER, PR and HER2 negative (score <2) breast cancer. Goldhirsch et al., *Personalizing the treatment of women with early breast cancer: highlights of the St Gallen Int'l Expert Consensus on Primary Therapy of Early Breast Cancer* 2013, 24 Ann. Oncol. 2206 (2013).

RNA was isolated as described. Metzger et al., *Assembly of methylated KDM1A and CHD1 drives androgen receptor-dependent transcription and translocation*, 23 Nat. Str'l Mol. Biol. 132 (2016). Quantitative RT-PCR using the Abgene SYBR Green PCR kit (Invitrogen) was used according to supplier protocol, using HPRT for normalization and primer sequences for HPRT Id. Primers for VCAN, PRR5, ATF4, EGR1, FST, EGFR, RUNX1 are shown in the following table:

| Primer | Primer Sequences | SEQ ID NO: |
|---|---|---|
| VCAN | 5'-ACTGTGGATGGGGTTGTGTT-3' | NO: 1 |
|  | 5'-CTGCGTCACACTGCTCAAAT-3' | NO: 2 |
| PRR5 | 5'-CGGGACAAGATTCGCTTCTA-3' | NO: 3 |
|  | 5'-AGCGCATCCTCTAGCTTCAC-3' | NO: 4 |
| ATF4 | 5'-CCAACAACAGCAAGGAGGAT-3' | NO: 5 |
|  | 5'-GTGTCATCCAACGTGGTCAG-3' | NO: 6 |
| EGR1 | 5'-TGACCGCAGAGTCTTTTCCT-3' | NO: 7 |
|  | 5'-CACAAGGTGTTGCCACTGTT-3' | NO: 8 |
| FST | 5'-GGAAAACCTACCGCAATGAA-3' | NO: 9 |
|  | 5'-GAGCTGCCTGGACAGAAAAC-3' | NO: 10 |
| EGFR | 5'-CCAACCAAGCTCTCTTGAGG-3' | NO: 11 |
|  | 5'-GCTTTCGGAGATGTTGCTTC-3 | NO: 12 |
| RUNX1 | 5'-CACTGCCTTTAACCCTCAGC-3' | NO: 13 |
|  | 5'-ACAGAAGGAGAGGCAATGGA-3' | NO: 14 |

Before harvesting for RNA sequencing (RNA-seq), BCSC1 cells were cultured for 18 hr in the absence or presence of $5 \times 10^{-10}$ M KDM4(i) as indicated. RNA samples were sequenced by the standard Illumina protocol to create raw sequence files (.fastq files) at the sequencing core facility of the DKFZ. These reads were aligned to the hg19 build of the human genome using TopHat version 2. The aligned reads were counted with the Homer software (analyze RNA) and DEG's were identified using EdgeR and DESeq version 1.8.3. Data are deposited under GSE.

Example 4: Chemical Synthesis of Substituted Pyrimidine Derivatives

Unless otherwise noted, reagents and solvents were used as received from commercial suppliers. Anhydrous solvents and oven-dried glassware were used for synthetic transformations sensitive to moisture and/or oxygen. Yields were not optimized. Reaction times are approximate and were not optimized. Column chromatography and thin layer chromatography (TLC) were performed on silica gel unless otherwise noted. Spectra are given in ppm (δ) and coupling constants, J are reported in Hertz. For proton spectra, the solvent peak was used as the reference peak. Chemical synthesis of 3-({[6-[methyl(phenyl)amino]-1,2,3,4-tetrahydronaphthalen-1-yl] methyl}amino) pyridine-4-carboxylic acid (Compound I) can be carried out, for example, based on the method described in U.S. Pat. No. 9,447,046. Briefly, Compound I can be prepared according to the following preparations:

Preparation 1a.
6-bromo-1,2,3,4-tetrahydronaphthalen-1-one

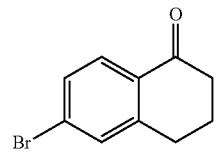 [SMILES: O=C1CCCc2cc(Br)ccc21]

A solution of $NaNO_2$ (2.35 g, 34 mmol) in water (10 mL) was added dropwise to the solution of 6-amino-1,2,3,4-tetrahydronaphthalen-1-one (5.0 g, 31 mmol) in 25% HBr (16 mL) at 0° C. The suspension was then transferred to a stirred mixture of CuBr (8.9 g, 62 mmol) in 48% HBr (30 mL) at 0° C. The resulting mixture was allowed to warm to room temp and stirred for 1 hr. The mixture was extracted with EtOAc, dried ($Na_2SO_4$), and concentrated. The residue was purified by silica gel chromatography (0%-60% EtOAc/Hex) to give 5.6 g (80/6) of the title compound as a light yellow oil. $^1$H NMR (400 MHz, CDCl3): δ 2.10-2.16 (2H, m), 2.64 (2H, t, J=6.4 Hz), 2.94 (2H, t, J=6.0 Hz), 7.42 (1H, s), 7.44 (1H, s), 7.87 (1H, d, J=8.9 Hz). [M+H] calculated for $C_{10}H_9BrO$: 225, 227; found: 225, 227.

Preparation 1b: 6-[methyl(phenyl)amino]-1,2,3,4-tetrahydronaphthalen-1-one

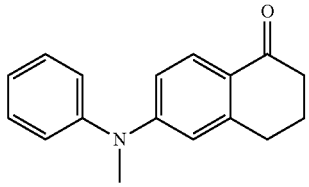 [SMILES: CN(c1ccccc1)c1ccc2c(c1)CCCC2=O]

To a solution of 6-bromo-1,2,3,4-tetrahydronaphthalen-1-one (2.0 g, 8.9 mmol) in toluene (20 mL) was added N-methylaniline (960 mg, 8.9 mmol), $Cs_2CO_3$ (4.4 g, 13.4 mmol), BINAP (310 mg, 0.5 mmol) and $Pd(OAc)_2$ (110 mg, 0.5 mmol). The mixture was stirred overnight at 100° C. under $N_2$. The mixture was filtered and concentrated, and the residue was purified by silica gel chromatography (30%-80% EtOAc/Hex) to give 1.52 g (68%) of the title compound as a light brown oil. [M+H] calculated for $C_{17}H17NO$: 252; found: 252.

Preparation 1c: 5-(aminomethyl)-N-methyl-N-phenyl-7,8-dihydronaphthalen-2-amine, hydrochloride

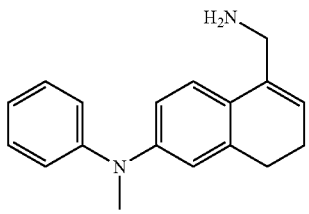 [SMILES: CN(c1ccccc1)c1ccc2c(c1)CCC=C2CN]

To a solution of Preparation 1b (1.52 g, 6.0 mmol) and ZnI2 (150 mg) in toluene (20 mL) was added TMSCN (1.2 g, 12 mmol) at room temp. The mixture was heated at 60° C. for 2 hr, then cooled to room temp and diluted with addition of THF (20 mL). A solution of LAH (5 mL, 2.4 M in THF, 12 mmol) was added slowly at room temp, and the solution stirred for 0.5 hr. The reaction was quenched with the addition of EtOAc (10 mL), and then water (1 mL) and aqueous 1 M NaOH (1 mL). The solution was dried ($Na_2SO_4$) and concentrated to give 1.52 g (89%) of the crude 1-(aminomethyl)-6-[methyl(phenyl)amino]-1,2,3,4-tetrahydro-naphthalen-1-ol as a white solid.

Into a solution of this intermediate (1.52 g, 5.4 mmol) in methanol (20 mL) was bubbled dry HCl gas for 2 min while cooled to maintain the rxn temp at ≤30° C. The mixture was then stirred at room temp for 1 hr. The methanol was evaporated under reduced pressure to give 1.4 g (98%) of the title compound as the HCl salt. [M+H] calculated for $C_{18}H_{20}N_2$: 265; found 265.

Preparation 1d: 5-(aminomethyl)-N-methyl-N-phenyl-5,6,7,8-tetrahydronaphthalen-2-amine

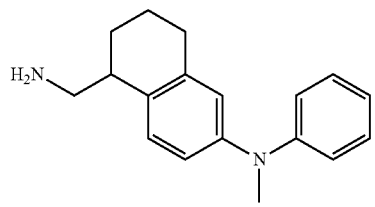 [SMILES: CN(c1ccccc1)c1ccc2c(c1)CCCC2CN]

To a solution of Preparation 1c (1.4 g, 5.3 mmol) in MeOH (30 mL) and conc. HCl (three drops) was added 10% Pd/C (200 mg) at room temp under $N_2$. The suspension was stirred at room temp for 16 hr under hydrogen at 50 psi. The reaction mixture was filtered through celite, adjusted to pH about 8-9 with sat. $Na_2CO_3$, dried ($Na_2SO_4$), and concentrated to give 830 mg (59/6) of the title compound as a yellow oil. [M+H] calculated for $C_{18}H_{22}N_2$: 267; found: 267.

Preparation 1e: methyl 3-[({6-[methyl(phenyl)amino]-1,2,3,4-tetrahydronaphthalen-1-yl}methyl)amino]pyridine-4-carboxylate

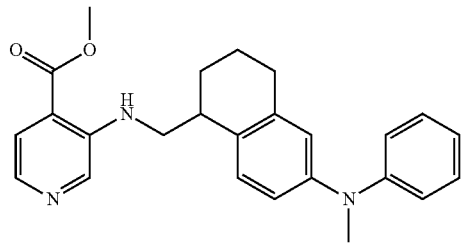 [SMILES: COC(=O)c1ccncc1NCC1CCCc2cc(N(C)c3ccccc3)ccc21]

To a solution of Preparation 1d (500 mg, 1.88 mmol) in DMA (12 mL) was added methyl 3-fluoroisonicotinate (300 mg, 1.93 mmol). The reaction mixture was stirred at 170° C. for 1 hr in a microwave, then poured into water and extracted with EtOAc. Organics were washed with brine, dried ($Na_2SO_4$), and concentrated. The residue was purified by silica gel chromatography (20%-80% EtOAc/Hex) to give 200 mg (26%) of the title compound as a yellow oil. [M+H] calculated for $C_{25}H_{27}N_3O_2$: 402; found: 402.

Preparation 1f: methyl 3-({[(1 S)-6-[methyl(phenyl)amino]-1,2,3,4-tetrahydronaphthalen-1-yl]methyl amino)pyridine-4-carboxylate

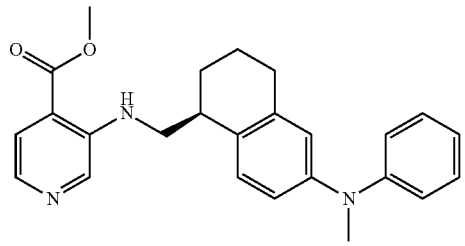 [SMILES: COC(=O)c1ccncc1NC[C@H]1CCCc2cc(N(C)c3ccccc3)ccc21]

Preparation 2f: methyl 3-({[(1R)-6-[methyl(phenyl)amino]-1,2,3,4-tetrahydronaphthalen-1-yl]methyl}amino)pyridine-4-carboxylate

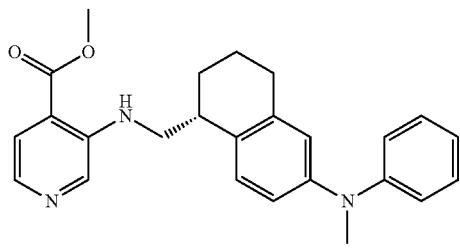 [SMILES: COC(=O)c1ccncc1NC[C@@H]1CCCc2cc(N(C)c3ccccc3)ccc21]

Preparation 1e (200 mg) was separated by chiral HPLC (Column: Chiralcel IA, 250 mm*4.6 mm 5 μm; Mobile phase: Hex:EtOH=85:15; F: 1.0 mL/min; W: 230 nm; T=30° C.) to give 95 mg (47%) of Preparation 1f (6.54 min) and 92 mg (46%) of Preparation 2f (7.91 min), each as a yellow oil.

Preparation 1g: 3-({[(1S)-6-[methyl(phenyl)amino]-1,2,3,4-tetrahydronaphthalen-1-yl]methyl}amino)pyridine-4-carboxylic acid

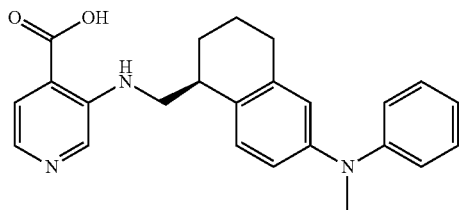 [SMILES: CN(c1ccccc1)c1ccc2c(c1)CCC[C@@H]2CNc1cnccc1C(=O)O]

To a solution of Preparation 1f (95 mg, 0.24 mmol) in THF (6 mL) and $H_2O$ (2 mL) was added $LiOH \cdot H_2O$ (31 mg, 0.72 mmol) at room temp, and the reaction mixture was stirred overnight. The reaction mixture was concentrated to remove THF, and the residue was diluted with water and acidified to pH about 3-4 with 1.0 N aqueous HCl solution. The precipitate was collected by filtration and washed with EtOAc/ether. The solid was dried under vacuum to give 52 mg (56%) of the title compound as a yellow solid. $^1$H NMR (400 MHz, DMSO-d6): δ 1.64-1.67 (1H, m), 1.77-1.84 (3H, m), 2.65-2.68 (2H, d, J=5.6 Hz), 3.04-3.07 (O m), 3.21 (3H, s), 3.41-3.47 (1H, m), 3.56-3.60 (1H, m), 6.78-6.92 (5H, m), 7.21-7.25 (3H, m), 7.55 (1H, d, J=5.2 Hz), 7.82 (1H, d, J=5.2 Hz), 8.36 (1H, s). [M+H] Calculated for $C_{24}H_{25}N_3O_2$: 388; found: 388.

Preparation 2g: 3-({[(1R)-6-[methyl(phenyl)amino]-1,2,3,4-tetrahydronaphthalen-1-yl]methyl}amino)pyridine-4-carboxylic acid (Compound I)

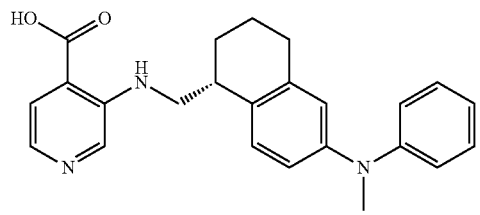 [SMILES: CN(c1ccccc1)c1ccc2c(c1)CCC[C@H]2CNc1cnccc1C(=O)O]

The title compound was prepared in 53% yield from Preparation 2f according to the procedure for Preparation 1g. $^1$H NMR (400 MHz, DMSO-d6): δ 1.64-1.68 (1H, m), 1.77-1.84 (3H, m), 2.65-2.68 (2H, d, J=5.6 Hz), 3.04-3.07 (1H, m), 3.21 (3H, s), 3.41-3.47 (1H, m), 3.56-3.60 (1H, m), 6.78-6.92 (5H, m), 7.21-7.25 (3H, m), 7.56 (1H, d, J=4.8 Hz), 7.82 (1H, d, J=5.2 Hz), 8.36 (1H, s). [M+H] calculated for $C_{24}H_{25}N_3O_2$: 388; found: 388.

---

We claim:

1. A method of treating cancer associated with lysine demethylase 4 (KDM4) activity in a patient in need thereof, the method comprising administering to the patient 3-([[(4R)-7-[methyl[4-propan-2-yl)phenyl]amino]-3,4-dihydro-2H-1-benzopyran-4-yl]methyl]amino)pyridine-4-carboxylic acid, or a pharmaceutically acceptable salt thereof, represented by the structure:

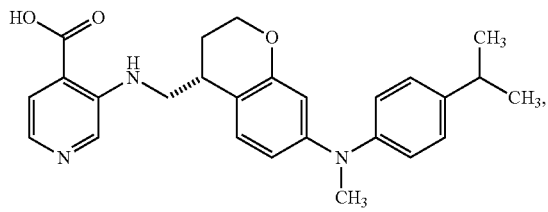 [SMILES: CC(C)c1ccc(N(C)c2ccc3c(c2)OCC[C@H]3CNc2cnccc2C(=O)O)cc1]

wherein the KDM4-associated cancer is Burkitt's lymphoma.

2. A method of treating cancer associated with lysine demethylase 4 (KDM4) activity in a patient in need thereof, the method comprising administering to the patient a pharmaceutical composition comprising at least one pharmaceutically acceptable excipient and 3-([[(4R)-7-[methyl[4-propan-2-yl)phenyl]amino]-3,4-dihydro-2H-1-benzopyran-4-yl]methyl]amino)pyridine-4-carboxylic acid, or a pharmaceutically acceptable salt thereof, represented by the structure:

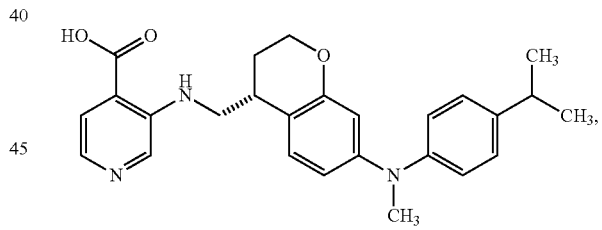

wherein the KDM4-associated cancer is Burkitt's lymphoma.

* * * * *